(12) United States Patent
Narushima

(10) Patent No.: US 12,475,540 B2
(45) Date of Patent: *Nov. 18, 2025

(54) INFORMATION PROCESSING DEVICE AND INFORMATION PROCESSING METHOD

(71) Applicant: MICWARE CO., LTD., Kobe (JP)

(72) Inventor: Kenji Narushima, Kobe (JP)

(73) Assignee: MICWARE CO., LTD., Kobe (JP)

( * ) Notice: Subject to any disclaimer, the term of this patent is extended or adjusted under 35 U.S.C. 154(b) by 1 day.

This patent is subject to a terminal disclaimer.

(21) Appl. No.: 19/023,338

(22) Filed: Jan. 16, 2025

(65) Prior Publication Data
US 2025/0157004 A1 May 15, 2025

Related U.S. Application Data

(60) Division of application No. 18/969,255, filed on Dec. 5, 2024, which is a continuation of application No. PCT/JP2022/032068, filed on Aug. 25, 2022.

(51) Int. Cl.
G06T 5/50 (2006.01)
G06T 7/70 (2017.01)

(52) U.S. Cl.
CPC ............... G06T 5/50 (2013.01); G06T 7/70 (2017.01); G06T 2207/20221 (2013.01)

(58) Field of Classification Search
CPC .... G06T 5/50; G06T 7/70; G06T 2207/20221
See application file for complete search history.

(56) References Cited

U.S. PATENT DOCUMENTS

2010/0020185 A1 1/2010 Sako et al.
2016/0005435 A1* 1/2016 Campbell ............ H04N 9/8211
386/240

(Continued)

FOREIGN PATENT DOCUMENTS

JP 2003-153253 A 5/2003
JP 2008-154192 A 7/2008

(Continued)

OTHER PUBLICATIONS

Japanese decision to grant a patent dated Dec. 25, 2024.

*Primary Examiner* — Daniel F Hajnik
*Assistant Examiner* — Jed-Justin Imperial
(74) *Attorney, Agent, or Firm* — Yokoi & Co., U.S.A.; Toshiyuki Yokoi

(57) ABSTRACT

An information processing device includes: a video obtainer configured to obtain two or more videos captured by and transmitted from each of two or more mobile terminals associated with an attribute value set including one or more environment information which includes a positional information for identifying a capturing position or a time information for identifying a capturing time; a video generator configured to generate a combined video by combining the two or more videos associated with different time information from each other in a time series manner or a merged video by merging a part of the two or more videos associated with different positional information from each other in a spatial manner among the two or more videos obtained by the video obtainer; and a video transmitter configured to transmit the combined video or the merged video generated by the video generator.

5 Claims, 25 Drawing Sheets

(56) References Cited

U.S. PATENT DOCUMENTS

| | | |
|---|---|---|
| 2018/0330610 A1 | 11/2018 | Wu |
| 2021/0158632 A1 | 5/2021 | Nishiyama et al. |
| 2021/0285785 A1* | 9/2021 | Hashimoto ............... G06T 7/70 |

FOREIGN PATENT DOCUMENTS

| | | |
|---|---|---|
| JP | 2012-129961 A | 7/2012 |
| JP | 2016-38703 A | 3/2016 |
| JP | 2016-134859 A | 7/2016 |
| JP | 2021-10081 A | 1/2021 |
| JP | 2021-48597 A | 3/2021 |
| JP | 2021-64886 A | 4/2021 |
| JP | 2021-83034 A | 5/2021 |
| KR | 10-2115098 B | 5/2020 |

\* cited by examiner

Fig. 22

| ID | terminal identifier (right holder identifier) | video information | | | | | | | | | | |
|---|---|---|---|---|---|---|---|---|---|---|---|---|
| | | frame identifier | video attribute value | | | | | | | movement information | registration flag | availability flag |
| | | | environment information | | | | tag | | | | | |
| | | | positional information | time information | weather information | temperature information | ... | accident | traffic jam | dangerous driving | ... | | | |
| 1 | U001 | F1001 | $(x_{11}, y_{11})$ | $t_{11}$ | sunny | 30 | ... | — | — | — | ... | 1 | 0 | 1 |
| | | F1002 | $(x_{12}, y_{12})$ | $t_{12}$ | sunny | 31 | ... | 1 | 1 | — | ... | | | |
| | | ... | ... | ... | ... | ... | ... | ... | ... | ... | ... | | | |
| 2 | U003 | F3001 | $(x_{31}, y_{31})$ | $t_{31}$ | snowy | -1 | ... | — | 1 | — | ... | 0 | 1 | 1,2 |
| | | F3002 | $(x_{32}, y_{32})$ | $t_{32}$ | snowy | -3 | ... | 1 | — | — | ... | | | |
| | | ... | ... | ... | ... | ... | ... | ... | ... | ... | ... | | | |
| ... | ... | ... | | | | | | | | | | ... | ... | ... |

Fig. 23

| ID | video identifier (NFT identifier) | access information | right holder identifier | right registered date | video information ||||||||||
|---|---|---|---|---|---|---|---|---|---|---|---|---|---|
| | | | | | frame identifier | video attribute value |||||||| availability flag |
| | | | | | | environment information |||| tag ||| |
| | | | | | | positional information | time information | weather information | temperature information | ... | accident | traffic jam | dangerous driving | ... |
| 1 | NFT01 | address 01 | U001 | 2022/4/25 | F1001 | $(x_{11}, y_{11})$ | $t_{11}$ | sunny | 30 | ... | — | 1 | — | ... | 1 |
| | | | | | F1002 | $(x_{12}, y_{12})$ | $t_{12}$ | sunny | 31 | ... | 1 | 1 | — | ... | |
| | | | | | ... | ... | ... | ... | ... | ... | ... | ... | ... | ... | |
| 2 | NFT02 | address 02 | U002 | 2022/4/25 | F2001 | $(x_{21}, y_{21})$ | $t_{21}$ | snowy | 21 | ... | — | — | — | ... | 1,2 |
| | | | U101 | 2022/5/18 | F2002 | $(x_{22}, y_{22})$ | $t_{22}$ | snowy | 20 | ... | — | — | — | ... | |
| | | | | | ... | ... | ... | ... | ... | ... | ... | ... | ... | ... | |
| ... | ... | ... | ... | ... | ... | ... | ... | ... | ... | ... | ... | ... | ... | ... | ... |

INFORMATION PROCESSING DEVICE AND INFORMATION PROCESSING METHOD

CROSS-REFERENCE TO RELATED APPLICATIONS

This Application is a divisional application claiming the benefit of priority of the co-pending U.S. Utility Non-Provisional Patent application Ser. No. 18/969,255 with a filing date of Dec. 5, 2024, which is a Continuation application of the prior International Patent Application No. PCT/JP2022/032068, with an international filing date of Aug. 25, 2022, which designated the United States, the entire disclosures of all applications are expressly incorporated by reference in their entirety herein.

TECHNICAL FIELD

The present invention relates to an information processing device and the like for processing videos captured by each of two or more mobile terminals.

BACKGROUND OF THE INVENTION

Conventionally, an image display system for enabling a user to see an eyesight view of others (view seen from a movable body of others) is available. In the above described image display system, a plurality of videos captured by a plurality of mobile bodies and transmitted by the plurality of mobile bodies can be outputted to one screen (shown in Patent Document 1).

PRIOR ART

Patent Documents

[Patent Document 1] Japanese Patent Publication No. 2008-154192 (e.g., paragraph [0140], FIG. 24)

SUMMARY OF THE INVENTION

Problem to be Solved by the Invention

However, the user can merely see the videos captured by each of the plurality of mobile bodies on one screen in the conventional technology. It is impossible to generate and provide one useful video using the videos captured by each of two or more mobile terminals.

Means for Solving the Problems

An information processing device of the first aspect of the present invention includes: a video obtainer configured to obtain two or more videos captured by each of two or more mobile terminals and transmitted from each of the two or more mobile terminals, each of the two or more videos being associated with an attribute value set including one or more environment information which includes a positional information for identifying a capturing position or a time information for identifying a capturing time; a video generator configured to generate a combined video by combining the two or more videos associated with different time information from each other in a time series manner among the two or more videos obtained by the video obtainer or a merged video by merging a part of the two or more videos associated with different positional information from each other in a spatial manner among the two or more videos obtained by the video obtainer; and a video transmitter configured to transmit the combined video or the merged video generated by the video generator.

The above described configuration allows to generate and provide one useful video using the videos captured by each of two or more mobile terminals.

An information processing device of the second aspect of the present invention is the information processing device according to the first aspect, wherein the video obtainer is configured to sequentially obtain the two or more videos associated with the positional information satisfying a first positional condition, and the video generator is configured to generate the combined video by combining the two or more videos obtained by the video obtainer in the order of the time associated with the two or more videos.

The above described configuration allows to generate and provide one useful video combined in a time series manner using the videos captured by each of two or more mobile terminals.

An information processing device of the third aspect of the present invention is the information processing device according to the second aspect, wherein an inquiry receiver configured to receive an inquiry including the positional information from a user terminal is further provided, and the video obtainer is configured to obtain the two or more videos associated with the positional information satisfying the first positional condition using the positional information received by the inquiry receiver.

The above described configuration allows to generate and provide one useful video combined in a time series manner using the videos captured by each of two or more mobile terminals.

An information processing device of the fourth aspect of the present invention is the information processing device according to the second aspect, wherein an inquiry receiver configured to sequentially receive two or more positional information transmitted from the mobile terminals is further provided, each of the two or more positional information being the positional information, and the video obtainer is configured to sequentially obtain the two or more videos associated with the two or more positional information satisfying the first positional condition using the two or more positional information received by the inquiry receiver.

The above described configuration allows to generate and provide one useful video combined in a time series manner using the two or more videos associated with the two or more positional information transmitted from an object terminal. Consequently, an object person holding the moving object terminal can be watched, for example.

An information processing device of the fifth aspect of the present invention is the information processing device according to the second aspect, wherein an inquiry receiver configured to receive an inquiry including the positional information for identifying a destination set in a navigation terminal is further provided, and the video obtainer is configured to sequentially obtain the two or more videos associated with the positional information satisfying the first positional condition using the positional information received by the inquiry receiver.

The above described configuration allows to generate and provide one useful video combined in a time series manner using the two or more videos associated with the destination set in a navigation terminal.

An information processing device of the sixth aspect of the present invention is the information processing device according to the first aspect, wherein an inquiry receiver configured to receive an inquiry including a route information which includes two or more target positional information is further provided, and the video obtainer is configured to obtain the two or more videos associated with the two or more positional information satisfying the first positional condition using the two or more target positional information included in the route information, each of the two or more positional information being the positional information.

The above described configuration allows to generate and provide one useful video combined in the order of the route using the two or more videos included in the route information.

An information processing device of the seventh aspect of the present invention is the information processing device according to the sixth aspect, wherein the route information includes a target time information associated with each of the two or more positional information, and the video obtainer is configured to obtain the two or more videos associated with the two or more positional information satisfying the first positional condition using the two or more target positional information and the target time information included in the route information.

The above described configuration allows to generate and provide one useful video combined in the order of the route and the order of the time using the two or more videos included in the route information.

An information processing device of the eighth aspect of the present invention is the information processing device according to the first aspect, wherein the video obtainer is configured to obtain the two or more videos associated with the positional information satisfying a second positional condition and the time information satisfying a time condition, and the video generator is configured to generate a frame using a part or an entire of frames included in each of the two or more videos obtained by the video obtainer and generate the combined video or the merged video by combining the frame in a time series manner.

The above described configuration allows to generate and provide one useful video by merging (combining) the videos captured by each of the two or more mobile terminals in a spatial manner.

An information processing device of the ninth aspect of the present invention is the information processing device according to eighth aspect, wherein each of the two or more videos is a video capturing a parking lot, and the video generator is configured to generate the frame by composing an overhead frame generated by combining the frames included in the two or more videos captured by each of the two or more mobile terminals installed in each of two or more moving bodies in a spatial manner and generate the combined video or the merged video.

The above described configuration allows to grasp the parking situation in the parking lot.

An information processing device of the tenth aspect of the present invention is the information processing device according to any one of first to ninth aspects, wherein each of the two or more videos is associated with a right holder identifier for identifying a right holder of each of the two or more videos, and a right holder processor is further provided for performing a right holder process which is a process related to the right holder identified by the right holder identifier which is associated with the combined video or the merged video generated by the video generator.

The above described configuration allows to perform an appropriate process about the right holder of the video.

An information processing device of the eleventh aspect of the present invention is the information processing device according to the tenth aspect, wherein the right holder identifier associated with the combined video or the merged video is the right holder identifier associated with each of the two or more videos which are a source of the combined video or the merged video, and the right holder processor includes a rewarding unit for performing a rewarding process which is a process of providing a reward to the right holder identified by the right holder identifier associated with each of the two or more videos which are the source of the combined video or the merged video.

The above described configuration allows to provide the reward to the right holder of the videos captured by the mobile terminals.

An information processing device of the twelfth aspect of the present invention is the information processing device according to the eleventh aspect, wherein the rewarding unit is configured to perform a process of obtaining a video attribute value associated with each of the two or more videos which are the source of the combined video or the merged video transmitted by the video transmitter, determining the reward to each of the two or more right holders using the video attribute value and provide the reward, each of the two or more right holders being the right holder.

The above described configuration allows to provide an appropriate reward to the right holder of the videos captured by the mobile terminals.

An information processing device of the thirteenth aspect of the present invention is the information processing device according to the tenth aspect, wherein the right holder processor includes a first preserver configured to perform a first preservation process which is a process of storing the combined video or the merged video obtained by the video obtainer while being associated with the attribute value set which is associated with the two or more videos which are the source of the combined video or the merged video.

The above described configuration allows to preserve the combined video or the merged video generated by two or more videos.

An information processing device of the fourteenth aspect of the present invention is the information processing device according to the tenth aspect, wherein the right holder processor includes a second preserver configured to perform a second preservation process which is a process of storing the combined video or the merged video obtained by the video obtainer while being associated with the right holder identifier which is associated with each of the two or more videos which are the source of the combined video or the merged video.

The above described configuration allows to set an appropriate right holder as the right holder of the combined video or the merged video generated by the two or more videos.

An information processing device of the fifteenth aspect of the present invention is the information processing device according to the tenth aspect, wherein an inquiry receiver configured to receive an inquiry related to an environment information which is an information of an environment where the mobile terminals captured the two or more videos from the user terminal is further provided, and the video obtainer is configured to obtain the two or more videos corresponding to the inquiry received by the inquiry receiver, and the right holder processor includes a third preserver configured to accumulate the combined video or the merged video obtained by the video obtainer while being associated with the right holder identifier for identifying a user of the user terminal.

The above described configuration allows to set a right holder requiring the combined video or the merged video as the right holder of the combined video or the merged video generated by the two or more videos.

An information processing device of the sixteenth aspect of the present invention is the information processing device according to any one of the thirteenth to fifteenth aspects, wherein the right holder processor includes a fourth pre-server configured to perform a fourth preservation process which is a process of storing a preservation information including an access information for accessing the combined video or the merged video in a blockchain.

The above described configuration allows to preserve management information of the video requiring the preservation.

Effects of the Invention

The information processing device of the present invention allows to generate and provide one useful video by combining the videos captured by each of the two or more mobile terminals.

BRIEF DESCRIPTION OF DRAWINGS

FIG. 22 is a drawing showing a terminal management table in the first embodiment.

FIG. 23 is a drawing showing a registered video management table in the first embodiment.

DETAILED DESCRIPTION OF THE INVENTION

Figure 1:
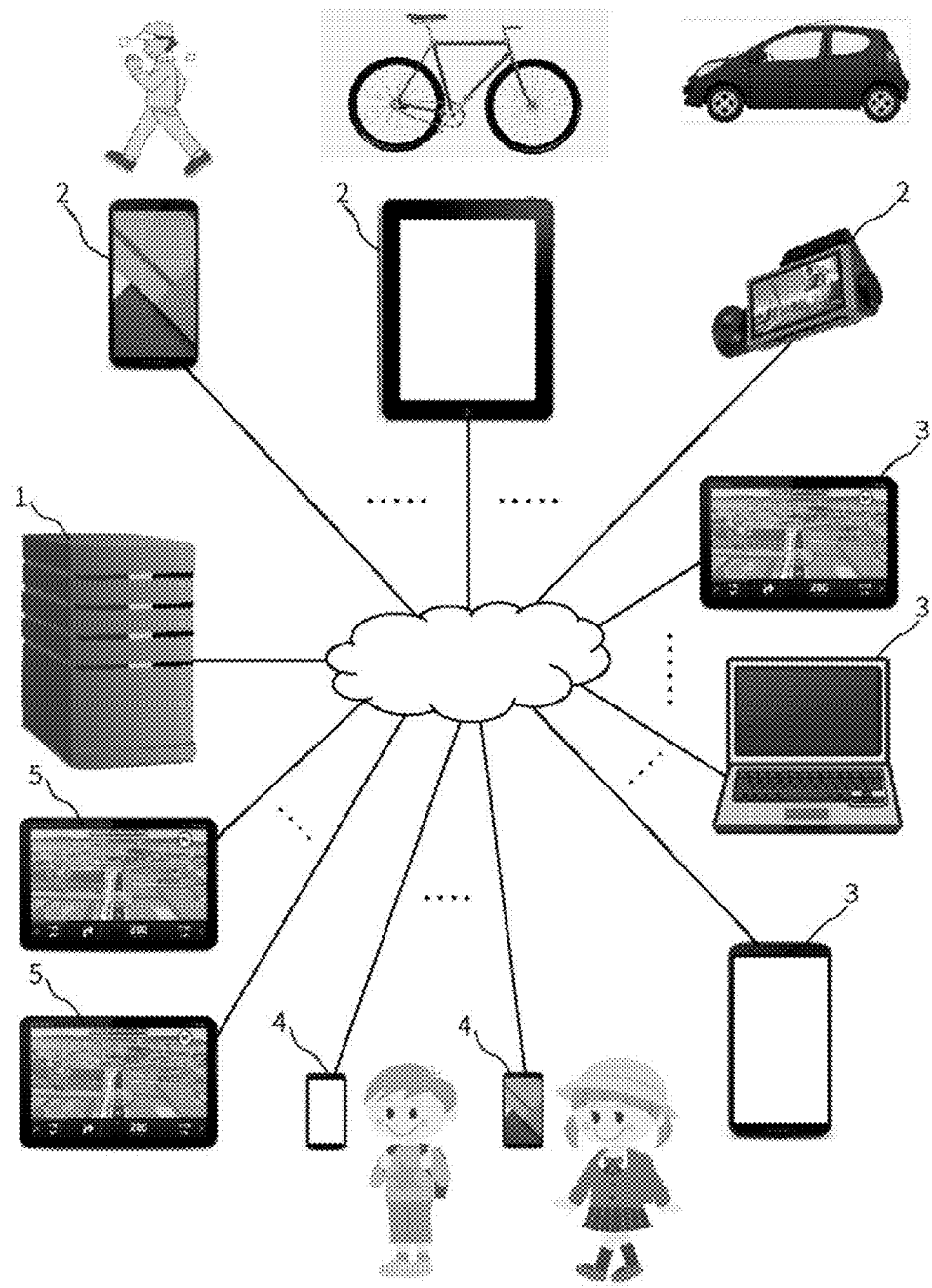
FIG. 1 is a schematic diagram of an information system A in the first embodiment.

Hereafter, embodiments of an information processing device and other configurations will be explained with reference to the drawings. The repeated explanation of the components denoted with the same reference numerals may be omitted in the embodiments since the operations are the same.

First Embodiment

The present embodiment explains an information processing device configured to generate one video combined in a time series manner or one video merged (combined) in a spatial manner using two or more videos obtained in a capturing device in each of two or more mobile bodies. Note that an inquiry for selecting two or more videos is, for example, an inquiry using a positional information specified in a user terminal, an inquiry using two or more positional information received from an object terminal to be watched, an inquiry using a destination set in a navigation terminal and an inquiry using a route information.

The present embodiment also explains an information processing device for performing a right holder process which is a process related to a right holder of one video (combined video or merged video) to be outputted. The right holder process is, for example, the later-described rewarding process and later-described various preservation processes.

The present embodiment also explains an information processing device configured to automatically receive videos satisfying a preservation condition from the mobile terminal and accumulate them.

The present embodiment also explains an information processing device for managing videos to which one or more tags obtained by an analysis or the like of the videos is applied. Although the process of applying the tags is performed by the information processing device or the mobile terminal, the process can be also performed by the other devices.

The present embodiment also explains an information processing device configured to perform a process for the user of the mobile terminal or the user who requires the video when the video required by the user cannot be transmitted although the video exists. Note that the case where the video cannot be transmitted is when the power of the mobile terminal is turned off, for example.

The present embodiment also explains an information processing device configured to receive movement information indicating a start of a movement from the mobile terminal and utilize the movement information.

The present embodiment also explains a mobile terminal configured to transmit the movement information to the information processing device.

The present embodiment also explains a mobile terminal configured to transmit a latest attribute value set of the captured video to the information processing device when the movement is finished.

The present embodiment also explains a mobile terminal configured to obtain one or more tags by an analysis or the like of the video and associate the tags to the video.

In the present embodiment, the fact that information X is associated with the information Y means that the information Y can be obtained from the information X or that the information X can be obtained from the information Y. The information X may be associated with the information Y in any manner. The information X and the information Y may be linked with each other or may be in the same buffer. The information X may be included in the information Y. The information Y may be included in the information X.

FIG. 1 is a schematic diagram of an information system A in the present embodiment. The information system A includes an information processing devices 1, one, two or more mobile terminals 2, one, two or more user terminals 3, one, two or more object terminals 4 and one, two or more navigation terminals 5.

The information processing device 1 is a server configured to provide one video (combined video or merged video) to the user terminals 3 using the videos transmitted from each of the two or more mobile terminals 2. The information processing device 1 is a so-called server, for example. The information processing device 1 may be a cloud server or an application service provider (ASP) server, for example. The type of the information processing device 1 is not limited. The information processing device 1 may be a device generating a blockchain.

Note that the videos here are images captured with the mobile terminals 2. Each of the videos is normally a set (assembly) of two or more still images. However, it is also possible to consider that each of the videos may be a single still image. The interval of the capturing time between two or more still images included in the video is not limited. The video includes 60 frames per second or 30 frames per second, for example. However, the video may be a set of two or more still images captured at an interval equal to or longer than a predetermined time (e.g., one minute) or a set of two or more still images captured when a predetermined condition is satisfied.

The mobile terminal 2 is installed in a movable body to capture videos. The mobile terminal 2 is, for example, a drive recorder, a smartphone, a tablet terminal or a camera with a communication function. The installation normally means the condition where something is fastened. However, it is also possible to consider that the installation includes the situation where something is contacted or held. The mobile terminal 2 may include a drive means such as an engine or a transportation means such as wheels.

The movable body is an object that is movable. The movable device is, for example, a ground movable device, a marine movable device, an undersea movable device, an aeronautical movable device, a space movable device or a living thing.

The ground movable device is, for example, an automobile, a vehicle (e.g., rickshaw or toy car) movable by manpower, a railroad vehicle (e.g., train or steam locomotive), a vehicle in an amusement park, or a vehicle for business use in a factory and other facilities. The ground movable body is not necessarily the movable body on which a person rides. For example, the ground movable device may be various robots for business use or for amusement (e.g. so-called radio controlled car). Note that the automobile is, for example, a passenger car, a truck, a bus, a taxi or a motorcycle.

The marine movable device is, for example, various ships, a jet ski bike, a surfboard, a rowing boat, a float or a raft.

The undersea movable device is, for example, a submarine, an underwater robot or a diving equipment such as an aqualung.

The aeronautical movable device is, for example, various airplanes, a helicopter, a glider, a parachute, a balloon or a kite.

The space movable device is, for example, a rocket, a spacecraft or an artificial satellite.

The living thing is, for example, a human or the movable body other than the human. The movable body other than the human is, for example, birds, mammals, reptiles, amphibians, fishes, insects or other various living things.

The user terminal 3 is a terminal used by a user. The user is a person who views the video or a person who requires video. The user terminal 3 may have the function of the mobile terminal 2. Namely, the user terminal 3 may be a terminal of the user who provides the video. The user terminal 3 may be the later described navigation terminal 5.

The object terminal 4 is the terminal for transmitting the positional information. The object terminal 4 is, for example, the terminal equipped with the object to be watched. The object to be watched is, for example, a living thing or a thing. The living thing is, for example, a human. The human is, for example, a child or an aged person. The thing as the object to be watched is, for example, the thing (e.g., automobile) for preventing theft.

The mobile terminal 2, the user terminal 3 and the object terminal 4 are, for example, smartphones, tablet terminals, so-called personal computers, or navigation terminals. The type of the mobile terminal 2, the user terminal 3 and the object terminal 4 are not limited.

The navigation terminal 5 is so-called a navigation terminal. The navigation terminal 5 is the terminal equipped with the ground movable body or possessed by the human.

The information processing device 1 and each of the one or more mobile terminals 2 can generally communicate with each other through a network such as the Internet. The information processing device 1 and each of the one or more user terminals 3 can generally communicate with each other through a network such as the Internet. The information processing device 1 and each of the one or more object terminals 4 can generally communicate with each other through a network such as the Internet. The information processing device 1 and each of the one or more navigation terminals 5 can generally communicate with each other through a network such as the Internet.

Figure 2:
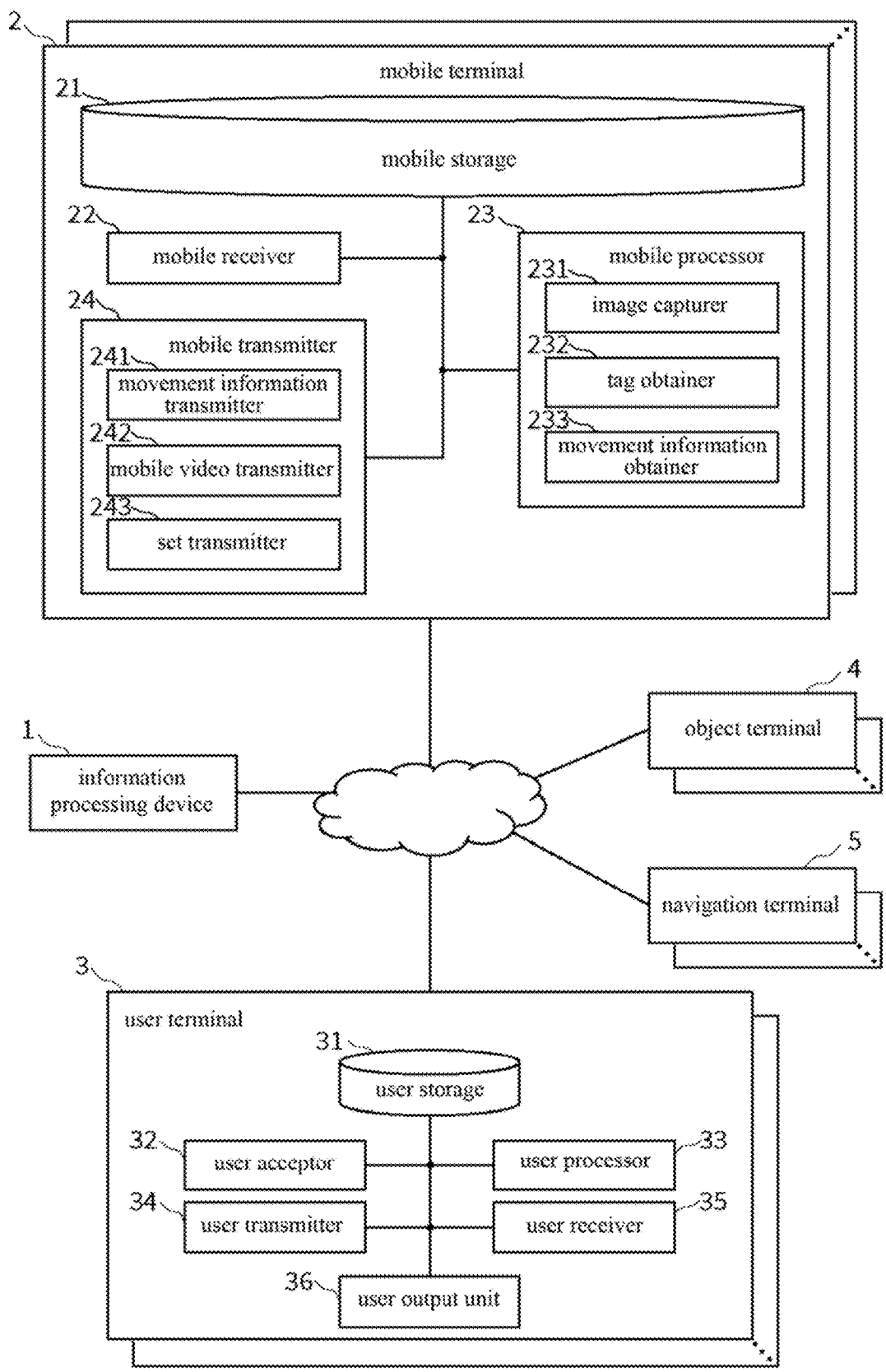
FIG. 2 is a block diagram of the information system A in the first embodiment.
Figure 3:
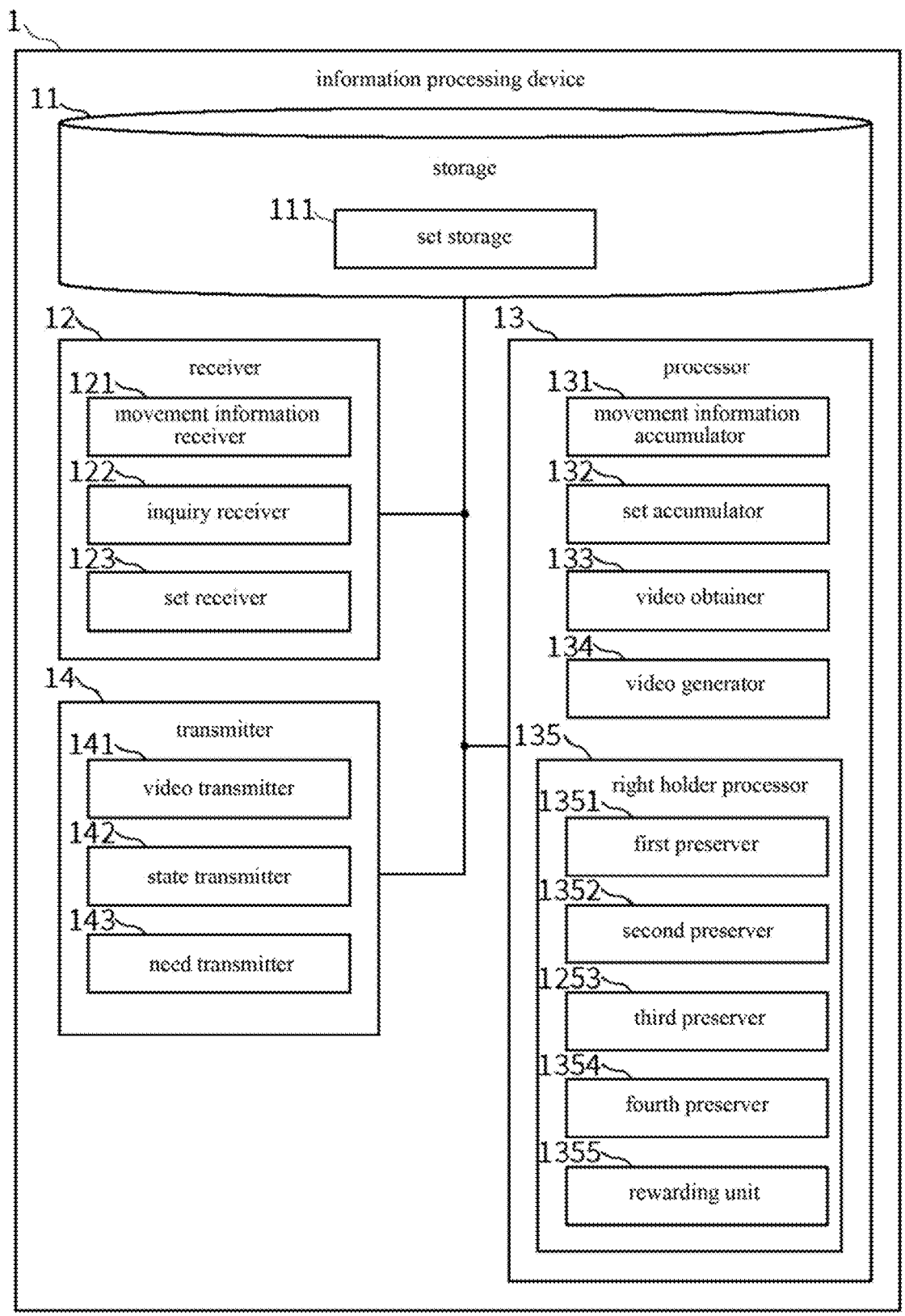
FIG. 3 is a block diagram of an information processing device 1 in the first embodiment.

FIG. 2 is a block diagram of the information system A in the present embodiment. FIG. 3 is a block diagram of the information processing device 1.

The information processing device 1 includes a storage (storage unit) 11, a receiver (reception unit) 12, a processor (processing unit) 13 and a transmitter (transmission unit) 14. The storage 11 includes a set storage (set storage unit) 111. The receiver 12 includes a movement information receiver (movement information reception unit) 121, an inquiry receiver (inquiry reception unit) 122 and a set receiver (set reception unit) 123. The processor 13 includes a movement information accumulator (movement information accumulation unit) 131, a set accumulator (set accumulation unit) 132, a video obtainer (video obtaining unit) 133, a video generator (video generation unit) 134 and a right holder processor (right holder processing unit) 135. The right holder processor 135 includes a first preserver (first preservation unit) 1351, a second preserver (second preservation unit) 1352, a third preserver (third preservation unit) 1353, a fourth preserver (fourth preservation unit) 1354 and a rewarding unit 1355. The transmitter (transmission unit) 14 includes a video transmitter (video transmission unit) 141, a state transmitter (state transmission unit) 142 and a need transmitter (need transmission unit) 143.

The mobile terminal 2 includes a mobile storage (mobile storage unit) 21, a mobile receiver (mobile reception unit) 22, a mobile processor (mobile processing unit) 23 and a mobile transmitter (mobile transmission unit) 24. The mobile processor 23 includes an image capturer (image capturing unit) 231, a tag obtainer (tag obtaining unit) 232 and a movement information obtainer (movement information obtaining unit) 233. The mobile transmitter 24 includes a movement information transmitter (movement information transmission unit) 241, a mobile video transmitter (mobile video transmission unit) 242 and a set transmitter (set transmission unit) 243.

The user terminal 3 includes a user storage (user storage unit) 31, a user acceptor (user acceptance unit) 32, a user processor (user processing unit) 33, a user transmitter (user transmission unit) 34, a user receiver (user reception unit) 35 and a user output unit 36.

The storage 11 included in the information processing device 1 stores various kinds of information. The various kinds of information is, for example, the later-described terminal information, the later-described attribute value set, the later-described movement information, the videos and the management information.

The management information is the information used for watching the object person to be watched. The management information includes a user identifier for transmitting the videos to the user terminal 3 of the person who watches the object person and an object person identifier for identifying the object terminal 4 of the object person.

The set storage 111 accumulates one, two or more terminal information. The terminal information is the information related to the mobile terminal 2. The terminal information includes the information of the videos possessed by the current mobile terminal 2. The terminal information includes a terminal identifier and an attribute value set. The terminal information may be associated with the videos. The terminal identifier may be included in the attribute value set.

The terminal identifier is the information for identifying the mobile terminal 2. The terminal identifier may be a right holder identifier for identifying the right holder which is a user of the mobile terminal 2. The terminal identifier is, for example, an identification (ID) of the mobile terminal 2, a name of the mobile terminal 2 or a media access control (MAC) address of the mobile terminal 2.

The right holder is a person having any right about the video. The right holder is, for example, an owner of the video, a copyright holder of the video or an owner of the mobile terminal 2 capturing the video. The right holder is an initial right holder of the video. Although the right holder is normally the owner of the mobile terminal 2, the right holder may be any person who has the right of the video captured by the mobile terminal 2.

The right holder identifier is an identifier of the right holder of the video. The right holder identifier may be the terminal identifier. The right holder identifier is, for example, an identification (ID) of the right holder, a name of the right holder, a mail address of the right holder or a telephone number of the right holder.

The attribute value set is a set of one, two or more video attribute values. The video attribute value is an attribute value of the video. The video attribute value is, for example, an environment information. The video attribute value is, for example, a tag. The video attribute value may be the later-described movable body attribute value.

The environment information is the information about the environment where the video is captured. The environment information is, for example, a positional information, a time information, a weather information, a temperature information or a season information. The positional information is the information for identifying a capturing position. The capturing position is a location of the camera capturing the video. The positional information is, for example, a set of a latitude and a longitude or a set of a latitude, a longitude and an altitude.

The positional information may be an area identifier identifying an area on a map, a road identifier identifying an address or a road, or a traffic-lane identifier identifying a traffic lane on a road. The time information is the information for identifying the time when the video is captured. The time when the video is captured may be the time around the time when the video is captured. The accuracy is not required for the time when the video is captured. The time information is, for example, a time, a set of year, month, day and hour, a set of year, month, day, hour and minute, a set of year, month, day, hour, minute and second, a set of year, month and day or a set of month and day. Namely, the time information may indicate the time with any granularity. The weather information is the information for identifying the weather at the time when and at the location where the video is captured. The weather information is, for example, "sunny," "rainy," "snowy" or "cloudy." The temperature information is the information for identifying an outside temperature at the time when and at the location where the video is captured. The temperature information is, for example, "25 degrees" or "30 degrees or higher." The season information is the information for identifying the season when the video is captured and at the location where the video is captured. The season information is, for example, "spring," "summer," "early summer" or "winter."

The tag is the information for identifying the properties of the video. The tag is, for example, the information resulting from the analysis of the video. The tag is, for example, the information resulting from the analysis of one, two or more movable body attribute values. The tag is, for example, the information resulting from the analysis of two or more movable body attribute values in time series.

The movable body attribute value is an attribute value about the movable body. The movable body attribute value is the information about the movement and is obtainable during the movement of the movable body, for example. The movable body attribute value is, for example, the information indicating the use of CAN (Controller Area Network) data or an airbag. The CAN data is, for example, the speed, the revolutions per minute of the engine or the state of a brake. The tag is, for example, "accident," "traffic jam," "dangerous driving," "overspeed" or a name (e.g., "human," "bear" or a name of a celebrity) of the object shown in the video.

The receiver 12 receives various information and instructions from the mobile terminal 2, the user terminal 3, the object terminal 4 or the navigation terminal 5. The various information and instructions are, for example, the movement information, the positional information, the inquiry, the attribute value set or the video.

The video received by the receiver 12 is preferably associated with the right holder identifier for identifying the right holder of the video. The video received by the receiver 12 is associated with one, two or more video attribute values, for example.

The video received by the receiver 12 is the video capturing a parking lot, for example. However, the place where the receiver 12 receives the video is not limited.

The movement information receiver 121 receives the movement information from the mobile terminal 2 when the movement of the mobile terminal 2 is started. The start is preferably the moment immediately after the start of movement. However, the start may be a predetermined time (e.g., one minute) after the start of movement.

The movement information is the information for identifying the movement of the mobile terminal 2. The information for identifying the movement may be the information for identifying the start of the movement. The movement here may be upcoming movement or ongoing movement. The movement information is, for example, a movement start flag or a terminal identifier. The movement start flag is the information for indicating the start of the movement. The terminal identifier is an identifier of the mobile terminal 2 which starts moving. Note that the terminal identifier may be the same as the right holder identifier.

The inquiry receiver 122 receives the inquiry about the environment information from the user terminal 3. The inquiry about the environment information includes the environment information as a condition. The inquiry is a request for the video captured by the mobile terminal 2. The inquiry is, for example, in a structured query language (SQL). However, the format and the data structure of the inquiry are not limited.

The inquiry receiver 122 receives the inquiry including the positional information from the user terminal 3, for example.

The inquiry receiver 122 sequentially receives each of two or more positional information from the object terminal 4, for example. The inquiry receiver 122 may receive each of two or more positional information from the object terminal 4 or receive the positional information from the user terminal 3 or the like which receives the positional information from the object terminal 4.

The inquiry receiver 122 receives the inquiry including the positional information for identifying the destination set in the navigation terminal 5, for example. For example, the inquiry receiver 122 may receive the positional information from the navigation terminal 5, or receive it from the user terminal 3 which receives it from the navigation terminal 5, or receive the positional information from the user terminal 3 or the like from which the positional information is transmitted to the navigation terminal 5 for setting the destination.

The inquiry receiver 122 receives the inquiry including a route information which includes two or more positional information, for example. The inquiry receiver 122 receives the inquiry including the route information from the user terminal 3 or the navigation terminal 5, for example.

The inquiry receiver 122 receives the inquiry related to the environment information which relates to the environment where the mobile terminal 2 captures the video from the user terminal 3.

Note that the route information included in the inquiry is, for example, the information for identifying the route where the user who watches the video moves or the route information set in the navigation terminal 5 or the user terminal 3 having a navigation function. The route information preferably includes the time information associated with each of two or more positional information. The time information is, for example, the information for identifying the time when the user is located at the position identified by the positional information. Note that the distance (interval) between each of two or more positional information included in the route information is not limited.

The set receiver 123 receives the attribute value set from the mobile terminal 2. The set receiver 123 preferably receives the attribute value set from the mobile terminal 2 when the movement of the mobile terminal 2 is finished. The attribute value set here is the information for identifying the video accumulated in the mobile terminal 2.

The processor 13 performs various processes. For example, the various processes are performed by the movement information accumulator 131, the set accumulator 132, the video obtainer 133, the video generator 134 and the right holder processor 135.

The movement information accumulator 131 accumulates the movement information received by the movement information receiver 121 while being associated with the mobile terminal 2. The process of associating with the mobile terminal 2 is, for example, the process of associating with the right holder identifier or the terminal identifier.

The set accumulator 132 accumulates the attribute value set received by the set receiver 123 in the set storage 111. The set accumulator 132 normally accumulates the attribute value set while being associated with the mobile terminal 2 from which the attribute value set is transmitted. The process of associating with the mobile terminal 2 is, for example, the process of associating with the right holder identifier or the terminal identifier.

The video obtainer 133 obtains the video captured by each of two or more mobile terminals 2. The above described video is associated with the attribute value set. The attribute value set includes one or more environment information. The one or more environment information preferably includes the positional information for identifying the capturing position where the video is captured or the time information for identifying the capturing time when the video is captured. The video is preferably associated with the right holder identifier.

The video obtainer 133 sequentially obtains two or more videos associated with the positional information satisfying the first positional condition.

The video obtainer 133 obtains two or more videos corresponding to the inquiry received by the inquiry receiver 122, for example.

The video obtainer 133 obtains two or more videos associated with the positional information satisfying the first positional condition using the positional information received by the inquiry receiver 122, for example.

The video obtainer 133 sequentially obtains two or more videos associated with the positional information satisfying the first positional condition sequentially using two or more positional information received by the inquiry receiver 122, for example.

The video obtainer 133 sequentially obtains two or more videos associated with the positional information satisfying the first positional condition using the positional information received by the inquiry receiver 122, for example.

The video obtainer 133 obtains two or more videos associated with the positional information satisfying each of two or more first positional condition using each of two or more positional information included in the route information, for example.

The video obtainer 133 obtains two or more videos associated with the positional information satisfying the first positional condition using each of two or more positional information and the time information included in the route information, for example.

The video obtainer 133 obtains two or more videos associated with the positional information satisfying the second positional condition and associated with the time information satisfying the time condition, for example.

The first positional condition is the condition related to the positional information. The first positional condition is the positional information having an approximate relationship with the position identified by the target positional information. The approximate relationship means being close. For example, the distance is within a threshold value, the distance is less than a threshold value, the moving time is within a threshold value or the moving time is less than a threshold value. Note that the target positional information is, for example, the positional information included in the inquiry or the received positional information.

The first positional condition may include other conditions than the positional information. The first positional condition may be the conditions related to the positional information and the time information. The first positional condition is, for example, the condition that the position information and the time information are associated with the position information and the time information satisfying the approximate relationship with respect to the set of the target positional information and the target time information. The position information and the time information satisfying the approximate relationship with respect to the set of the target positional information and the target time information are, for example, the positional information indicating the position having the distance within a threshold value, the distance less than a threshold value, the moving time within a threshold value or the moving time less than a threshold value with respect to the target positional information and the time information having the time difference within a threshold value or the time difference less than a threshold value with respect to the target time information. The first positional condition may be the conditions related to the positional information and a traveling direction of the moving body. The first positional condition may be the conditions related to the positional information and a direction (orientation) of the camera.

The second positional condition is the positional information having an approximate relationship with a reference position or a reference region of a comparison. The approximate relationship here is that the distance is within a threshold value, the distance is less than a threshold value or the position is within the reference region.

The video obtainer 133 obtains, for example, the video which is captured by each of two or more mobile terminals 2, associated with the attribute value set and the right holder identifier and transmitted from the mobile terminals 2. The video obtainer 133 preferably obtains the video satisfying an accumulation condition.

Note that the accumulation condition is the condition for accumulating the video. The accumulation condition is, for example, the condition that the inquiry satisfies a specific condition. The accumulation condition is, for example, the condition that the later-described preservation condition is satisfied.

Note that the device storing the video to be obtained may be the mobile terminal 2, the information processing device 1 or another device which is not illustrated. Another device may be, for example, a device generating a blockchain.

The video obtainer 133 obtains one, two or more videos corresponding to the inquiry from the mobile terminal 2 when the inquiry receiver 122 receives the inquiry, for example. For example, the video obtainer 133 obtains, from the mobile terminal 2, one or more videos paired with the attribute value set satisfying the conditions related to the environment information included in the inquiry.

For example, the video obtainer 133 transmits the inquiry to one or more mobile terminals 2 and receives one or more videos corresponding to the inquiry from one or more mobile terminals 2. The above described process is referred to as an unregistered video search process. The unregistered video search process is the process of obtaining the video satisfying a predetermined condition from unregistered videos stored in the mobile terminals 2. For example, the unregistered video search process is the process of obtaining the video corresponding to the inquiry from unregistered videos stored in the mobile terminal 2.

For example, the video obtainer 133 obtains the video corresponding the inquiry among the videos captured by one or more mobile terminals 2 corresponding to the movement information. The video obtainer 133 transmits the inquiry to one or more mobile terminals 2 corresponding to the movement information and receives the videos responding to the inquiry from the mobile terminals 2. Note that the mobile terminals 2 corresponding to the movement information are the mobile terminal 2 during the movement and the mobile terminals 2 capable of transmitting the videos.

When the inquiry receiver 122 receives the inquiry, for example, the video obtainer 133 determines one or more attribute value sets corresponding to the inquiry and obtains the video corresponding to the attribute value sets from the storage 11.

For example, the video obtainer 133 refers to the set storage 111, determines one or more videos corresponding to the inquiry and obtains the one or more videos from the mobile terminals 2.

The process of referring to the set storage 111 and determining the video corresponding to the inquiry is the process of determining the attribute value set corresponding to the inquiry among one or more attribute value sets included in the set storage 111. The above described process is referred to as a registered video search process. The registered video search process is the process of searching the video satisfying a predetermined condition from registered videos. The registered video search process is, for example, the process of searching the video corresponding to the inquiry from the registered videos. Note that the registered video is the video on which the later-described first preservation process or second preservation process is performed.

For example, the video obtainer 133 refers to the set storage 111, determines the video corresponding to the inquiry, determines whether or not the video is transmittable from the mobile terminal 2 and obtains the video from the mobile terminal 2 only when the video is transmittable.

For example, the video obtainer 133 attempts to communicate with the mobile terminal 2 and determines that the video is transmittable from the mobile terminal 2 when the video obtainer 133 can receive the information from the mobile terminal 2. For example, the video obtainer 133 determines whether or not the movement information corresponding to the mobile terminal 2 is stored in the storage 11 and determines that the video is transmittable from the mobile terminal 2 when the movement information is stored in the storage 11. The state that the video is transmittable is, for example, the state that the power of the mobile terminal 2 or the movable body corresponding to the mobile terminal 2 is turned on (e.g., the engine of a car as the movable body is turned on). The video obtainer 133 may determine whether or not the video is transmittable with any method.

For example, the video obtainer 133 obtains the video associated with the attribute value set satisfying the preservation condition from the corresponding mobile terminal 2. The above described process enables to obtain the video automatically.

The preservation condition is the condition for accumulating the video. The preservation condition is the condition related to the attribute value set.

The preservation condition is preferably the condition related to one or more tags. The preservation condition is, for example, the condition that the attribute value set includes the tag indicating "accident," the condition that the attribute value set includes the tag indicating "traffic jam" or the condition that the attribute value set includes the tag indicating a specific location. The tag indicating the specific location is, for example, a name of a specific parking lot, a specific place name, a name of a specific scenic beauty or a specific landscape.

The preservation condition is the condition that the video corresponds to the attribute value set satisfying a predetermined condition among the attribute value sets corresponding to one or more videos stored in a predetermined device or an area (e.g., storage 11). The predetermined condition is, for example, the condition that the attribute value included in the attribute value set is not included in the attribute value sets corresponding to one or more videos stored in a predetermined device or a predetermined area.

The video obtainer 133 may obtain a processed image obtained by processing the video captured by the mobile terminal 2, for example. The processed image is, for example, an around view image. The around view image is the image projected on an around view monitor. The around view image is the image viewing the area including the moving body from right above.

The video generator 134 generates one video (combined video or merged video) using two or more videos obtained by the video obtainer 133. The operation of generating one video may be the operation of sequentially providing a part of the video viewed as one video from the user to the video transmitter 141.

The video generator 134 combines each of two or more videos having different time information from each other obtained by the video obtainer 133 in a time series manner and generates one video (combined video), for example. The operation of combining two or more videos in a time series manner and generating one video (combined video) may be the operation of sequentially providing two or more videos to the video transmitter 141. Namely, it is enough if the video is viewed as one video for the user when the operation of combining two or more videos in a time series manner and generating one video is performed.

The video generator 134 combines each of two or more videos obtained by the video obtainer 133 in the order of the time associated with the video to form one video, for example. For example, the video generator 134 obtains a part of each of two or more videos obtained by the video obtainer 133, sequentially combines a part of the each of the videos and generates one video. The operation of combining each of two or more videos in a time series manner is normally the operation of sequentially combining a part of the videos captured by each of two or more mobile terminals 2. The operation of sequentially connecting a part of the videos may be the operation of sequentially providing a part of the videos to the video transmitter 141. The operation of connecting the videos in the order of the time associated with the video is the operation of connecting the videos in the order of the time indicated in the time information associated with the video or the operation of sequentially connecting the videos in the order of the time when the video is received.

For example, the video generator 134 generates one video (merged video) by merging a part of each of two or more videos having different positional information associated with each of two or more videos obtained by the video obtainer 133 in a spatial manner. For example, the video generator 134 generates one frame using a part or an entire of frames included in each of two or more videos obtained by the video obtainer 133 and generate one video by combining the frames in a time series manner.

For example, the video generator 134 generates one video by processing each of two or more videos obtained by the video obtainer 133. For example, the video generator 134 generates one frame by connecting an overhead frame formed by composing the frames included in the video captured by each of two or more mobile terminal 2 provided on each of two or more moving bodies in a spatial manner. Thus, one video is generated.

For example, the video generator 134 composes two or more around view images to generate the around view image of a wide area.

The right holder processor 135 performs the right holder process. The right holder process is the process about the right holder identified by the right holder identifier associated with one video generated by the video generator 134. The right holder processor 135 performs, for example, the right holder process which is the process performed in response to the transmission of the video from the video transmitter 141 and the process about the right holder identified by the right holder identifier associated with the video. The right holder process is, for example, the later-described first preservation process, the later-described second preservation process, the later-described third preservation process, the later-described fourth preservation process and the later-described rewarding process. Note that the video transmitted by the video transmitter 141 is the video generated by the video generator 134.

Note that the right holder identifier associated with one video is, for example, the right holder identifier associated with each of two or more videos which are the source of one video (combined video or merged video) or an identifier of the user who request the one video.

For example, the right holder processor 135 accumulates the videos obtained by the video obtainer 133 while being associated with the right holder identifier. The right holder processor 135 preferably accumulates only the videos obtained by the video obtainer 133 as the video satisfying the accumulation condition. It is preferable that the right holder processor 135 does not accumulate the video not satisfying the accumulation condition.

For example, when the video obtainer 133 determines that the mobile terminal 2 holding the video corresponding to the inquiry is in the state of being unable to transmit the video, the right holder processor 135 obtains a state information about this state.

The state information is the information about the state in which the video is not transmittable. For example, the state information indicates the state of the mobile terminal 2 possessing the video. The state information is, for example, "the video is stored in the mobile terminal 2 but not currently transmittable" or "the video is stored in the mobile terminal of Mr. or Ms. X but not currently transmittable." The state information is, for example, the information indicating that the power of the mobile terminal 2 is turned off or the information indicating that the power of the mobile terminal 2 is turned on.

For example, when the video obtainer 133 determines that the mobile terminal 2 holding the video corresponding to the inquiry is in the state of being unable to transmit the video, the right holder processor 135 obtains need information.

The need information is the information indicating that there is a need for the video. The need information is, for example, "your video XXX is requested by another user" or "your video XXX is requested by another user for X yen."

The first preserver 1351 performs the first preservation process of accumulating one vided (combined video or merged video) generated by the video generator 134 while being associated with each of two or more videos which are the source of the one video. The first preserver 1351 may perform the first preservation process of accumulating the video obtained from the mobile terminal 2 while being associated with the attribute value set associated with the video.

The second preserver 1352 performs the second preservation process of accumulating one video generated by the video generator 134 while being associated with the right holder identifier corresponding to each of two or more videos which are the source of the one video.

Note that the first preserver 1351 or the second preserver 1352 may accumulate one video generated by the video generator 134 while being associated with the attribute value set associated with each of two or more videos which are the source of the one video and associated with the right holder identifier corresponding to each of two or more videos which are the source of the one video.

The third preserver 1353 accumulates one video generated by the video generator 134 while being associated with the right holder identifier for identifying the user of the user terminal 3. Note that the user of the user terminal 3 here is the person viewing one video (combined video or merged video). The user terminal 3 here is, for example, the terminal transmitting the inquiry.

The destination in which one video is accumulated is, for example, the storage 11. However, one video may be accumulated in the other devices (e.g., device generating a blockchain).

The fourth preserver 1354 performs the fourth preservation process of accumulating a preservation information including an access information for accessing one video which is accumulated. The process of accumulating the videos and the fourth preservation process of the preservation information corresponding to the video may be performed in any order.

The fourth preserver 1354 performs the fourth preservation process of accumulating the preservation information generated by the video generator 134 including the access information for accessing one video which is accumulated in a blockchain.

Note that the fourth preserver 1354 preferably accumulates the preservation information in a blockchain. Namely, the fourth preserver 1354 preferably accumulates the preservation information in a distributed ledger in a blockchain. The fourth preserver 1354 preferably registers the preservation information as an NFT (non-fungible token). The fourth preserver 1354 preferably registers the preservation information in a distributed file system in an IPFS (Inter Planetary File System) network.

The preservation information is the information for retaining the originality of the video. The preservation information is, in other words, the headline information of the video. The preservation information is, for example, access information and one or more video attribute values. The preservation information preferably includes one or more right holder identifiers, for example. When the preservation information includes two or more right holder identifiers, the video may be shared by right holders or the two and more right holder identifiers may be right holder history information. The right holder history information is a set of right holder identifiers and information indicating the history of right holder changes. The fourth preservation process guarantees the originality of the preservation information of the registered video. The guarantee of the originality of the preservation information also guarantees the originality of the video corresponding to the preservation information. Note that the access information is the information for accessing the video. The access information is the information for identifying the destination in which the video is accumulated. The access information is, for example, URL and URI.

The preservation information preferably includes the information (also referred to a flag) indicating whether or not the video can be provided to a third party. The flag is, for example, the information indicating that the video is viewable by a third party, that the video may be for sale or that the video is neither viewable nor for sale.

The rewarding unit 1355 performs the rewarding process for each of right holders identified by the right holder identifier associated with each of two or more videos which are the source of one video generated by the video generator 134.

The rewarding process is a process of providing a reward. The rewarding process is, for example, the process of increasing points managed in a manner paired with each of one, two or more right holder identifiers associated with the video. The rewarding process is, for example, the process of paying money to the right holder identified by each of one, two or more right holder identifiers associated with the video. For example, the rewarding process is the process of transmitting the video or other contents to the user terminal 3 of the right holder identified by each of one, two or more right holder identifiers associated with the video. The rewarding process may be any processes of providing a merit to the right holder identified by each of one, two or more right holder identifiers associated with the video. The content of the rewarding process is not limited. The reward may be provided in any form, including money, points, products, and contents. The content of the reward is not limited.

The rewarding unit 1355 preferably obtains one, two or more video attribute values associated with each of two or more videos which are the source of one video transmitted by the video transmitter 141, determines the reward to each of two or more right holders using one or more video attribute values and performs the rewarding process which is the process of providing the reward.

Here, one or more video attribute values are, for example, the data amount of the video, the time of the video, the number of frames of the video and the resolution of the video.

The rewarding unit 1355 preferably obtains a reward amount corresponding to a service identifier for identifying the service performed on the target video and performs the rewarding process which is the process of providing the reward corresponding to the reward amount. Note that the service identifier is, for example, "viewing" and "purchasing." In the above described case, the storage 11 stores the reward amount corresponding to the service identifier or the information for determining the reward amount corresponding to the service identifier.

For example, the rewarding unit 1355 obtains the reward amount and performs the rewarding process which is the process of providing the reward corresponding to the reward amount using one, two or more information of one, two or more video attribute value and the service identifier. In the above described case, an arithmetic expression or a table corresponding to each of two or more service identifiers is stored in the storage 11, for example. The arithmetic expression is the expression for calculating the reward amount using one, two or more video attribute values as parameters. The table includes two or more correspondence information for managing the reward amount corresponding to one, two or more video attribute values. The rewarding unit 1355 normally performs the process of causing the user that has enjoyed the service relevant to the target video to pay the reward.

The process of causing the user to pay the reward is, for example, the process of causing the user to pay the obtained reward amount. The process of causing the user to pay the reward is, for example, the process of causing the user to pay the obtained reward amount and the profit obtained by the managing company of the information processing device 1. The process of causing the user to pay the reward is, for example, the process of reducing the points corresponding to the user receiving the service or the settlement process using the credit card number of the corresponding user.

The transmitter 14 transmits various information and instructions to the mobile terminal 2, the user terminal 3 or the navigation terminal 5. The various information and instructions are, for example, the videos, the inquiries, the state information and the need information.

The video transmitter 141 transmits one video (combined video or merged video) generated by the video generator 134. The video transmitter 141 transmits one video to the user terminal 3. The video transmitter 141 preferably transmits the video when the inquiry is received. The video transmitter 141 transmits the video to the user terminal 3 or the navigation terminal 5, for example. The operation of transmitting one video may be the operation of the video transmitter 141 to sequentially transmit a part of the received one video.

The video transmitter 141 transmits the video obtained by the video obtainer 133 to the user terminal 3, for example.

When the video is not transmittable, the state transmitter 142 transmits the state information about the state to the user terminal 3. The state transmitter 142 transmits the state information obtained by the right holder processor 135 to the user terminal 3.

Note that whether the video is not transmittable is determined by the video obtainer 133, for example.

When it is determined that the video is not transmittable, the need transmitter 143 transmits the need information to the user corresponding the video for informing that there is a need for the video. The need transmitter 143 transmits, for example, the need information obtained by the right holder processor 135 to the user corresponding to the video. The operation of transmitting the need information to the user corresponding to the video is, for example, the operation of transmitting the need information to the mail address paired with the right holder identifier corresponding to the video by an e-mail. The operation of transmitting the need information to the user corresponding to the video is, for example, the operation of transmitting the need information to the phone number paired with the right holder identifier corresponding to the video by a short message. The operation of transmitting the need information to the user corresponding to the video is, for example, the operation of transmitting the need information to the mobile terminal 2 paired with the right holder identifier corresponding to the video. The user corresponding to the video is typically the right holder of the video.

The mobile storage 21 included in the mobile terminal 2 stores various kinds of information. The various information is, for example, the video, the attribute value set, the right holder identifier, the movement information indicating the start of movement, a pair of an attribute value tag condition and a tag, a pair of a video tag condition and a tag, one or more preservation conditions, or one or more obtaining information. The mobile storage 21 normally stores one or more pairs of an attribute value tag condition and a tag. The mobile storage 21 normally stores one or more pairs of a video tag condition and a tag.

For example, one or more video attribute values included in the attribute value set are associated with one or more still images (also referred to as fields or frames) included in the video. The one or more video attribute values may be associated with all still images, associated with a part of the still images or associated with two or more still images.

The attribute value tag condition is the condition for obtaining the tag based on one, two or more movable body attribute values. The attribute value tag condition is the condition for one or more movable body attribute values. The attribute value tag condition is, for example, "a brake is suddenly applied," "the degree of deacceleration (acceleration) per unit time is lower than or equal to a threshold value (a brake is suddenly applied)," "an air bag is activated," "driving at a first speed or lower lasts for a second duration or longer (being in a traffic jam) or "the positional information corresponds to a specific name." The tag paired with the attribute value tag condition is, for example, "abnormal driving," "accident," "traffic jam," or "specific location."

The video tag condition is the condition for the video. The video tag condition is based on the analysis result of the video. The video tag condition is, for example, "there is a still image of two or more automobiles colliding with each other (accident)," "there is a frame of two or more automobiles with a distance of 0 (automobiles are contacted)," "the number of automobiles within a predetermined distance is greater than or equal to a first threshold value for a duration longer than or equal to a second threshold value (traffic jam)" or "the cumulative value per unit time of a change in the distance between the center of gravity of the preceding car and the traffic lane is greater than or equal to a threshold value (erratic driving of the preceding car). The tag paired with the video tag condition is, for example, "accident," "traffic jam" or "abnormal driving."

The preservation condition is the condition for preserving the video. The preservation condition is the condition for the attribute value set. The preservation condition is, for example, "the air bag is activated (accident occurs)" or "a specific tag is applied to the video (the specific tag is, for example "accident" or "dangerous driving")." The preservation condition is associated with, for example, the obtaining information. The obtaining information is the information for specifying the video to be obtained. The obtaining information is the information for specifying the video to be obtained when the preservation condition is satisfied. The above described preservation condition is, for example, "(1) the number of the automobiles in the screen is greater than or equal to a first threshold value & (2) the travelling speed of the automobile is lower than or equal to a second threshold value & the duration time of (1) (2) is longer than or equal to a third threshold value (traffic jam is continued)."

The mobile receiver 22 receives various information. The various information is, for example, the inquiry, the need information and the video captured by other mobile terminals 2.

The mobile processor 23 performs various processes. The various processes are, for example, processes performed by the image capturer 231, the tag obtainer 232 or the movement information obtainer 233. The mobile processor 23 transforms the data structure of the information received by the mobile receiver 22 for output.

The mobile processor 23 detects, for example, the start of movement. The detection of the start of movement is the detection of, for example, turning on of the mobile terminal 2 or turning on of the engine of the movable body.

The mobile processor 23 detects, for example, the end of movement. The detection of the end of movement is the detection of, for example, turning off of the mobile terminal 2 or turning off of the engine of the movable body.

The mobile processor 23 determines, for example, the attribute value set responding to the inquiry received by the mobile receiver 22 and obtains the video paired with the attribute value set from the mobile storage 21.

The mobile processor 23 obtains, for example, the video of movement from the start to the end of the movement. The mobile processor 23 obtains, for example, the video of movement from the start to the end of the movement while being associated with the attribute value set obtained during the movement.

The mobile processor 23 obtains, for example, the attribute value set during video capturing. The mobile processor 23 accumulates the obtained attribute value set into the mobile storage 21. For example, the mobile processor 23 associates the obtained attribute value set with the video. The operation of associating with the video is normally the operation of associating with the frames in the video. The attribute value set and the frames are preferably synchronized temporally.

The attribute value set is, for example, one or more environment information. The environment information is, for example, the positional information, the time information, the weather information, the temperature information or the season information.

The mobile processor 23 obtains, for example, the positional information. The mobile processor 23 having the function of a GPS receiver obtains, for example, the positional information. The mobile processor 23 obtains, for example, the positional information continuously, at predetermined intervals, or when an obtaining condition is satisfied. The obtaining condition is the condition for obtaining the information. The obtaining condition is, for example, the detection of an accident, the detection of a traffic jam, or the change in weather information.

The mobile processor 23 obtains, for example, the time information from a not-illustrated clock during video capturing. The mobile processor 23 obtains, for example, the time information continuously, at predetermined intervals, or when the obtaining condition is satisfied.

The mobile processor 23 obtains, for example, the time information from a not-illustrated clock during video capturing, and obtains the season information corresponding to the time information.

The mobile processor 23 obtains, for example, the weather information during video capturing. The mobile processor 23 obtains, for example, the weather information corresponding to the positional information from a not-illustrated server. The mobile processor 23 obtains, for example, the weather information continuously, at predetermined intervals, or when the obtaining condition is satisfied.

The mobile processor 23 obtains, for example, the temperature information during video capturing. The mobile processor 23 obtains, for example, the temperature information corresponding to the positional information from a not-illustrated server. The mobile processor 23 obtains, for example, the temperature information from a temperature sensor installed in the movable body. The mobile processor 23 obtains, for example, the temperature information continuously, at predetermined intervals, or when the obtaining condition is satisfied.

The mobile processor 23 determines, for example, whether or not the obtained attribute value set satisfies the preservation condition. The mobile processor 23 determines, for example, whether or not the obtained time-series attribute value set satisfies the preservation condition. For example, when the attribute value set satisfies the preservation condition, the mobile processor 23 obtains the video corresponding to the attribute value set. For example, when the attribute value set satisfies the preservation condition, the mobile processor 23 obtains the video corresponding to the preservation condition. For example, when the attribute value set satisfies the preservation condition, the mobile processor 23 obtains the obtaining information paired with the preservation condition and obtains the video based on the obtaining information.

The mobile processor 23 preferably includes, for example, a microphone to obtain sound information and accumulates the sound information while being associated with the video obtained by the image capturer 231. Note that the above described function is, for example, the function of a drive recorder.

The image capturer 231 captures the video. For example, the image capturer 231 starts to capture the video after the start of the movement is detected. For example, the image capturer 231 preferably continues the capturing until the end of movement is detected.

The image capturer 231 preferably accumulates the captured video in the mobile storage 21. The image capturer 231 preferably overwrites the area storing old video with new video when the storage capacity of the mobile storage 21 for accumulating the video is limited. Namely, the mobile storage 21 preferably has a ring buffer structure.

The tag obtainer 232 obtains one or more tags corresponding to the video captured by the image capturer 231 and associates the one or more tags with the video.

For example, the tag obtainer 232 analyzes the video obtained by the image capturer 231 and obtains one or more tags associated with the video.

The tag obtainer 232 obtains, for example, one or more tags using one, two or more movable body attribute values obtained when the video is captured by the image capturer 231. The movable body attribute value is, for example, CAN data.

The tag obtainer 232, for example, determines one or more still images satisfying the video tag condition and obtains the tag paired with the video tag condition. The tag obtainer 232 may associate the tag with one or more still images. Note that the still images are frames included in the video.

For example, when the video tag conditions are "the number of automobiles at a front-rear interval within a threshold value is greater than or equal to a threshold value and the speed of the automobiles is lower than or equal to a threshold" and the tag paired with the video tag condition is "traffic jam," the tag obtainer 232 analyzes the frames included in the video, identifies two or more automobiles and obtains the interval between each pair of the two or more automobiles. The tag obtainer 232 obtains the number of automobiles at the interval within the threshold value. The tag obtainer 232 obtains the movement distance of one automobile in two or more frames and the frame rate, and obtains the speed of the automobile. The tag obtainer 232 determines whether or not the video tag condition is satisfied using the number of automobiles at the interval within the threshold value and the speed of the automobile. When the video tag condition is satisfied, the tag obtainer 232 obtains the tag of "traffic jam" paired with the video tag condition. The tag obtainer 232 may associate the tag of "traffic jam" with the frame analyzed in the video.

For example, the tag obtainer 232 determines one or more movable body attribute values satisfying the attribute value tag condition and obtains the tag paired with the attribute value tag condition. The tag obtainer 232 may associate the tag with the video paired with the one or more movable body attribute values.

For example, when the attribute value tag condition is "the travel at the speed lower than 30 km lasts for 10 minutes or longer and the rate of the travel duration at the speed lower than 30 km is 80% or higher" and the tag paired with the attribute value tag condition is "traffic jam," the tag obtainer 232 detects the CAN data satisfying the attribute value tag condition using the history of the speed included in the CAN data associated with each field included in the video, obtains the tag of "traffic jam" paired with the attribute value tag condition, and associates the tag with the field associated with the CAN data piece. The CAN data associated with each field included in the video is the CAN data obtained at the same time as when the image of the field is captured.

The movement information obtainer 233 detects the movement of the mobile terminal 2 and obtains the movement information when the movement is started, for example. The movement information obtainer 233 obtains, for example, the movement information that is the right holder identifier of the mobile storage 21. The movement information obtainer 233 obtains, for example, the movement information of the mobile storage 21. The movement information is, for example, the right holder identifier or the information indicating "start of movement."

The mobile transmitter 24 transmits various information to the information processing device 1. The various information is, for example, the movement information, the video or the attribute value set.

The movement information transmitter 241 normally transmits the movement information identifying the movement of the mobile terminal 2 to the information processing device 1 when the movement is started. The movement information transmitter 241 transmits the movement information obtained by the movement information obtainer 233 to the information processing device 1.

The mobile video transmitter 242 transmits the video captured by the image capturer 231 to the information processing device 1. The timing of transmitting the video by the mobile video transmitter 242 is not limited. For example, the mobile video transmitter 242 transmits the video to the information processing device 1 after the mobile processor 23 obtains the video paired with the attribute value set corresponding to the received inquiry. For example, when the end of the movement is detected, the mobile video transmitter 242 transmits the video accumulated after the detection of the start of the movement to the information processing device 1. For example, when the preservation condition is determined to be satisfied, the mobile video transmitter 242 transmits the video corresponding to the determination to the information processing device 1.

It is preferred that the mobile transmitter 24 does not transmit the sound information obtained by the mobile processor 23 even when the video captured by the image capturer 231 is transmitted to the information processing device 1. This is because the sound information may be, for example, the sound information of the driver or the passenger of the movable body. If the above described sound information is transmitted to the information processing device 1 and provided to the user terminal 3, the privacy of the driver or the passenger may be violated. The above described situation is not appropriate.

The set transmitter 243 transmits the attribute value set in the mobile storage 21 to the information processing device 1. The set transmitter 243 transmits the attribute value set in the mobile storage 21 to the information processing device 1 when the movement of the mobile terminal 2 is finished, for example. The set transmitter 243 may transmit the attribute value set to the information processing device 1 immediately after the set transmitter 243 obtains the attribute value set. Namely, the timing of transmitting the attribute value set by the set transmitter 243 is not limited.

The user storage 31 included in the user terminal 3 stores various information. The various information is, for example, the user identifier and the video.

The user acceptor 32 accepts various instructions and information. The various instructions and information are, for example, inquiries and purchase instructions.

Note that the purchase instruction is the instruction for purchasing the video. The purchase instruction is associated with the user identifier. The purchase instruction normally includes the information identifying the video. The purchase instruction includes, for example, a video identifier. The purchase instruction includes, for example, an inquiry. The purchase instruction includes, for example, a purchase condition. The purchase condition is, for example, a purchase price. The purchase condition includes, for example, the information identifying a right period.

The various instructions and information may be input in any manner, such as with a touch panel, a keyboard, a mouse or a menu screen.

The user processor 33 performs various processes. The various processes are, for example, the processes related to the data structure for transmitting various instructions and information received by the user reception 32. The various processes are, for example, the processes for transforming the structure of the information received by the user receiver 35.

The user transmitter 34 transmits various instructions and information to the information processing device 1. The various instructions and information are, for example, the inquiry, the purchase instruction, the positional information received from the object terminal 4 and the route information received from the navigation terminal 5.

The user receiver 35 receives various information and instructions. The various information and instructions are, for example, the inquiry, the video and the state information.

The user output unit 36 outputs various information. The various information is, for example, the videos and the state information.

Here, the output is the concept including the operation of displaying on a display, the operation of projecting with a projector, the operation of printing with a printer, the operation of outputting sound, the operation of transmitting to an external device, the operation of accumulating into a recording medium, and the operation of delivering a processed result to another processor or another program.

The object terminal 4 obtains the positional information for identifying the position of the object terminal 4 and transmits the positional information. The object terminal 4 transmits, for example, the positional information to the information processing device 1 or the user terminal 3. The object terminal 4 preferably transmits the positional information paired with the object person identifier. The object person identifier is the information for identifying the object to be watched. The object person identifier is, for example, an identification (ID), a name, a telephone number, a mail address or a MAC address of the object terminal 4. The object terminal 4 obtains the positional information by a GPS receiver, for example. However, the method of obtaining the positional information is not limited.

The navigation terminal 5 includes the functions of a conventionally known navigation terminal. The navigation terminal 5 receives the input of the destination, obtains a current position, and obtains the route information from the current position to the destination. The navigation terminal 5 transmits, for example, the received destination. The navigation terminal 5 transmits, for example, the obtained route information. The destination or the route information is transmitted to the information processing device 1 or the user terminal 3, for example. The navigation terminal 5 may receive the destination from the user terminal 3 and obtain the route information from the current position to the destination.

The storage 11, the set storage 111, the mobile storage 21 and the user storage 31 are preferably a nonvolatile recording medium. However, these storages may be a volatile recording medium.

The process of storing the information in the storage 11 or the like is not limited. For example, the information may be stored in the storage 11 or the like via a recording medium, the information transmitted via a communication line or the like may be stored in the storage 11 or the like, or the information inputted by an input device may be stored in the storage 11 or the like.

The receiver 12, the movement information receiver 121, the inquiry receiver 122, the set receiver 123, the mobile receiver 22 and the user receiver 35 are normally implemented by a wireless or wired communication means. However, these receivers may be implemented by a means for receiving a broadcast.

The processor 13, the movement information accumulator 131, the set accumulator 132, the video obtainer 133, the video generator 134, the right holder processor 135, the first preserver 1351, the second preserver 1352, the third preserver 1353, the fourth preserver 1354, the rewarding unit 1355, the mobile processor 23, the tag obtainer 232, the movement information obtainer 233 and the user processor 33 may normally be implemented by a processor, a memory or the like.

The processing procedure of the processor 13 or the like is normally implemented by a software and the software is stored in a recording medium such as a read-only memory (ROM). However, the processing procedure may be implemented by a hardware (dedicated circuit). Note that the processor is a central processing unit (CPU), a microprocessor unit (MPU), a graphical processing unit (GPU) or the like. The type of the processor is not limited.

Note that the video obtainer 133 and the right holder processor 135 may be implemented by a wireless or wired communication means.

The transmitter 14, the video transmitter 141, the state transmitter 142, the need transmitter 143, the mobile transmitter 24, the movement information transmitter 241, the mobile video transmitter 242, the set transmitter 243 and the user transmitter 34 are normally implemented by implemented by a wireless or wired communication means. However, these transmitters may be implemented by a broadcasting means.

The image capturer 231 is implemented by a camera. Note that the camera is, for example, a charge-coupled device (CCD) camera, a complementary metal-oxide semiconductor (CMOS) camera, a three-dimensional (3D) camera, a laser imaging detection and ranging (LiDAR) camera or an omnidirectional camera. However, the type of the cameras is not limited.

The user acceptor 32 may be implemented by a device driver of an input device such as a touch panel and a keyboard or a control software of a menu screen, for example.

The user output device 36 may or may not include an output device such as a display or a speaker. The user output unit 36 may be implemented by a driver software of an output device or implemented by a driver software of an output device and the output device.

Then, the operation example of the information system A will be explained. First, the operation example of the information processing device 1 will be explained using the flowchart in FIG. 4.

(Step S401) The movement information receiver 121 determines whether or not the movement information associated with the right holder identifier is received from the mobile terminal 2. When the movement information is received, the processing proceeds to Step S402. When the movement information is not received, the processing proceeds to Step S403.

(Step S402) The movement information receiver 121 accumulates the movement information received in Step S401 in the storage 11 while being associated with the right holder identifier. The processing returns to Step S401. When the movement information is the right holder identifier, the movement information receiver 121 accumulates the right holder identifier.

(Step S403) The set receiver 123 determines whether or not the attribute value set associated with the right holder identifier is received from the mobile terminal 2. When the attribute value set is received, the processing proceeds to Step S404. When the attribute value set is not received, the processing proceeds to Step S406.

(Step S404) The set accumulator 132 accumulates the attribute value set received in Step S403 in the set storage 111 while being associated with the right holder identifier.

(Step S405) The processor 13 deletes the movement information associated with the right holder identifier from the storage 11. The processing returns to Step S401. Note that the operation of deleting the movement information is equivalent to the operation of "rewriting the movement information with the information indicating that the video is not transmittable."

(Step S406) The receiver 12 determines whether or not the video or the like associated with the right holder identifier is received from the mobile terminal 2. When the video or the like is received, the processing proceeds to Step S407. When the video or the like is not received, the processing proceeds to Step S410.

(Step S407) The processor 13 obtains the attribute value set corresponding to the video received in Step S406. The example of the process of obtaining the attribute value set will be explained using the flowchart in FIG. 5. Here, the process of obtaining the attribute value set may be the process of obtaining the attribute value set associated with the received video.

(Step S408) The first preserver 1351 accumulates the video received in Step S407 while being associated with the attribute value set obtained in Step S406. The first preserver 1351 accumulates the video in the storage 11, for example. However, the first preserver 1351 may accumulate the video in another device such as a device included in a blockchain. The process of accumulating the video by the first preserver 1351 is the first preservation process.

(Step S409) The fourth preserver 1354 performs the fourth preservation process. The processing returns to Step S401. The example of the fourth preservation process will be explained using the flowchart in FIG. 8.

(Step S410) The inquiry receiver 122 determines whether or not the inquiry is received. When the inquiry is received, the processing proceeds to Step S411. When the inquiry is not received, the processing proceeds to Step S414. Note that the inquiry receiver 122 normally receives the inquiry from the user terminal 3 or the navigation terminal 5. Note that the navigation terminal 5 transmitting the inquiry may be the user terminal 3.

(Step S411) The video obtainer 133 determines whether or not the received inquiry is the video retrieval in real time. When the inquiry is the video retrieval in real time, the processing proceeds to Step S412. When the inquiry is not the video retrieval in real time, the processing proceeds to Step S415. Note that the above described determination can be performed by examining the received inquiry. The video retrieval in real time is the process of retrieving the currently held video and the currently capturing video in the mobile terminal 2.

(Step S412) The video obtainer 133 determines whether or not the received inquiry requires to merge two or more videos in a spatial manner. When the received inquiry requires to merge two or more videos in a spatial manner, the processing proceeds to Step S413. When the received inquiry does not require to merge two or more videos in a spatial manner, the processing proceeds to Step S414. Note that the above described determination can be performed by examining the received inquiry.

(Step S413) The video obtainer 133, the video generator 134 or the like performs the video merging process. The processing proceeds to Step S418. The video merging process is the process of merging (combining) two or more videos in a spatial manner, obtains the merged (combined) video having one or more frames, and transmitting the merged (combined) video. The example of the video merging process will be explained using the flowchart in FIG. 9.

(Step S414) The video obtainer 133, the video generator 134 or the like performs the video combining process. The processing proceeds to Step S418. The video combining process is the process of transmitting the combined video (one video) generated by combining two or more videos in a time series manner. The example of the video combining process will be explained using the flowchart in FIG. 11.

(Step S415) The video obtainer 133 or the like performs the registered video search process. The example of the registered video search process will be explained using the flowchart in FIG. 12. Note that the video obtainer 133 here may not obtain the video in some cases.

(Step S416) The video obtainer 133 determines whether or not the video can be obtained in Step S415. When the video can be obtained, the processing proceeds to Step S417. When the video cannot be obtained, the processing proceeds to Step S418.

(Step S417) The video obtainer 133 performs the unregistered video search process. The example of the unregistered video search process will be explained using the flowcharts in FIG. 13 and FIG. 14. Note that the video obtainer 133 here may not obtain the video in some cases.

(Step S418) The right holder processor 135 performs a preservation process. The processing returns to Step S401. The example of the preservation process will be explained using the flowchart in FIG. 15.

(Step S419) The receiver 12 determines whether or not the purchase instruction is received from the user terminal 3. When the purchase instruction is received, the processing proceeds to Step S420. When the purchase instruction is not received, the processing returns to Step S401.

(Step S420) The video obtainer 133 obtains the video corresponding to the purchase instruction. Note that the video obtainer 133 obtains, for example, the video corresponding to the purchase instruction from the mobile terminal 2. The video obtainer 133 obtains, for example, the video corresponding to the purchase instruction from the registered videos. The video obtainer 133 may obtain, for example, the video corresponding to the purchase instruction from the unregistered videos.

(Step S421) The fourth preserver 1354 obtains the user identifier corresponding to the user terminal 3 transmitting the purchase instruction. Note that the user identifier functions as the right holder identifier corresponding the purchased video.

(Step S422) The fourth preserver 1354 performs the fourth preservation process using the user identifier obtained in Step S416. The example of the fourth preservation process will be explained using the flowchart in FIG. 8.

(Step S423) The rewarding unit 1355 performs the rewarding process to the original right holder of the video to be purchased. The processing returns to Step S401. The example of the rewarding process will be explained using the flowchart in FIG. 16.

Figure 4:
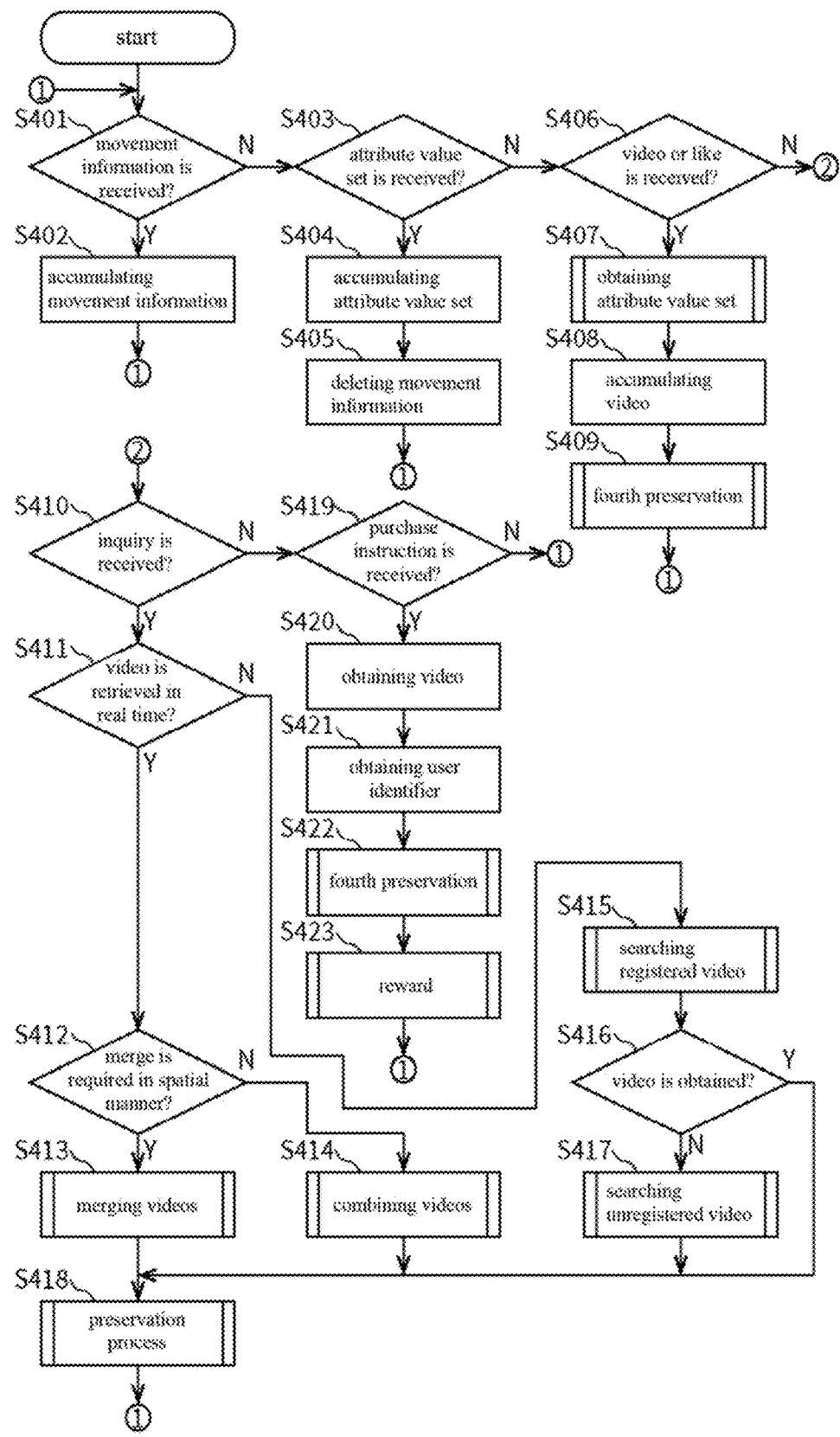
FIG. 4 is a flowchart for explaining an operation example of the information processing device 1 in the first embodiment.

In the flowchart in FIG. 4, the process ends when the power is turned off or the instruction of ending process is interrupted.

In the flowchart in FIG. 4, the receiver 12 preferably receives the positional information for identifying the current position of the mobile terminal 2 from the mobile terminal 2 while being paired with the identifier (e.g., the right holder identifier) of each of two or more mobile terminals 2 and temporarily accumulates the positional information. The frequency and the time interval for receiving the positional information and temporarily accumulating the positional information by the receiver 12 are not limited. For example, the receiver 12 continuously receives the positional information and temporarily accumulates the positional information. For example, the receiver 12 periodically receives the positional information and temporarily accumulates the positional information.

In the flowchart in FIG. 4, the receiver 12 may, for example, continuously receive the positional information from the user terminal 3, the object terminal 4 or the navigation terminal 5. In the above described case, the information processing device 1 may receive the video obtained by the mobile terminal 2 using the received positional information and transmit the video to the user terminal 3 or the navigation terminal 5, for example. Note that the frequency and the time interval for continuously receiving the positional information are not limited.

Then, the example of the process of obtaining the attribute value set in Step S407 will be explained using the flowchart in FIG. 5.

(Step S501) The mobile processor 23 or the set accumulator 132 (hereafter, referred to as the mobile processor 23 or the like) obtains one or more environment information or the like associated with the target video. Note that the target video is the video for which the video attribute value is to be obtained. The target video is, for example, the received video, the captured video or the currently capturing video. The environment information or the like may be only the environment information or the combination of the environment information and one or more movable body attribute values.

(Step S502) The mobile processor 23 or the like obtains the right holder identifier associated with the received video.

(Step S503) The mobile processor 23 or the like determines whether or not an annotation process to the video is performed. When the annotation process is performed, the processing proceeds to Step S504. When the annotation process is not performed, the processing proceeds to Step S511. It is assumed that whether or not the annotation process is performed is preliminarily determined. It is preferable that the annotation process is performed to the video by one of the information processing device 1 and the mobile terminal 2.

(Step S504) The mobile processor 23 or the like substitutes 1 for a counter i.

(Step S505) The mobile processor 23 or the like determines whether or not the i-th annotation is included in the video. When the i-th annotation is included, the processing proceeds to S506. When the i-th annotation is not included, the processing proceeds to S511. Note that the unit of the annotation is the object for obtaining the annotation. The unit of the annotation is, for example, one frame, a group of frames including a predetermined number of frames, or the video of a predetermined time (e.g., 5 seconds, 10 seconds).

(Step S506) The mobile processor 23 or the like determines whether or not to use the movable body attribute value for the annotation. When the movable body attribute value is used, the processing proceeds to Step S507. When the movable body attribute value is not used, the processing proceeds to Step S508. It is assumed that whether or not the movable body attribute value is used for the annotation is preliminarily determined.

(Step S507) The mobile processor 23 or the like performs the process of obtaining the movable body attribute value tag. The example of the process of obtaining the movable body attribute value tag will be explained using the flowchart in FIG. 6.

(Step S508) The mobile processor 23 or the like determines whether or not to use the video for the annotation. When the video is used, the processing proceeds to Step S509. When the video is not used, the processing proceeds to Step S510. It is assumed that whether or not the video is used for the annotation is preliminarily determined.

(Step S509) The mobile processor 23 or the like performs the process of obtaining a video tag. The example of the process of obtaining the video tag will be explained using the flowchart in FIG. 7.

(Step S510) The mobile processor 23 or the like increments the counter i by 1. The processing returns to Step S505.

(Step S511) The mobile processor 23 or the like generates the attribute value set including one or more environment information, one or more tags and the right holder identifier. The processing returns to the upstream process.

Figure 5:
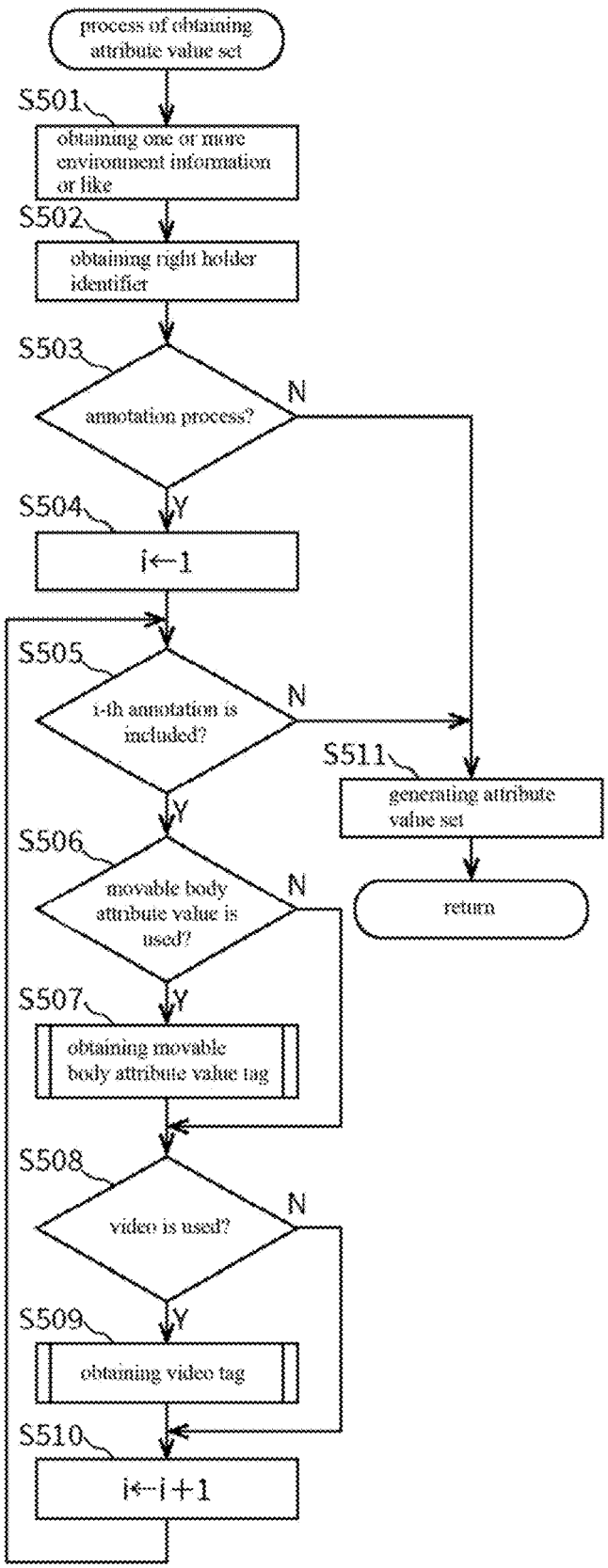
FIG. 5 is a flowchart for explaining an example of a process of obtaining an attribute value set in the first embodiment.

In the flowchart in FIG. 5, the video may be divided into two or more units for inspection, and the processes in S501 to S511 may be performed on each unit for inspection.

Figure 6:
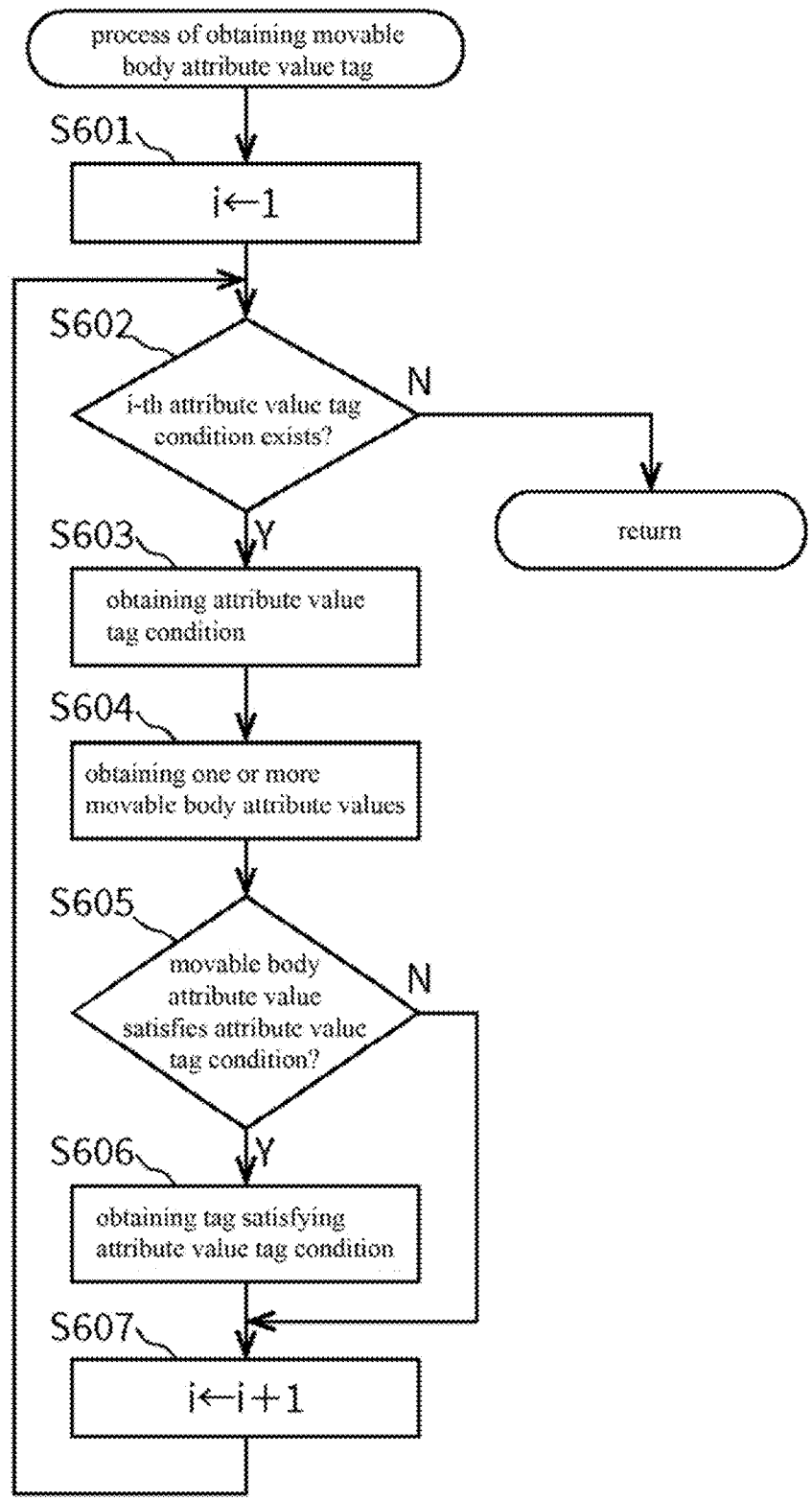
FIG. 6 is a flowchart for explaining an example of a process of obtaining a movable body attribute value tag in the first embodiment.

Then, the process of obtaining the movable body attribute value tag in Step S507 will be explained using the flowchart in FIG. 6.

(Step S601) The mobile processor 23 or the like substitutes 1 for the counter i.

(Step S602) The mobile processor 23 or the like determines whether or not the i-th attribute value tag condition exists. When the i-th attribute value tag condition exists, the processing proceeds to Step S603. When the i-th attribute value tag condition does not exist, the processing returns to the upstream process.

(Step S603) The mobile processor 23 or the like obtains the i-th attribute value tag condition.

(Step S604) The mobile processor 23 or the like obtains one or more movable body attribute values used for the determination of the i-th attribute value tag condition.

(Step S605) The mobile processor 23 or the like determines whether or not the one or more movable body attribute value obtained in Step S604 satisfies the i-th attribute value tag condition. When the attribute value tag condition is satisfied, the processing proceeds to Step S606. When the attribute value tag condition is not satisfied, the processing proceeds to Step S607.

(Step S606) The mobile processor 23 or the like obtains the tag paired with the i-th attribute value tag condition and associates the tag with the corresponding video. The operation of associating the tag with the video is normally the operation of associating the tag with the field included in the video.

(Step S607) The mobile processor 23 or the like increments the counter i by 1. The processing returns to Step S602.

Figure 7:
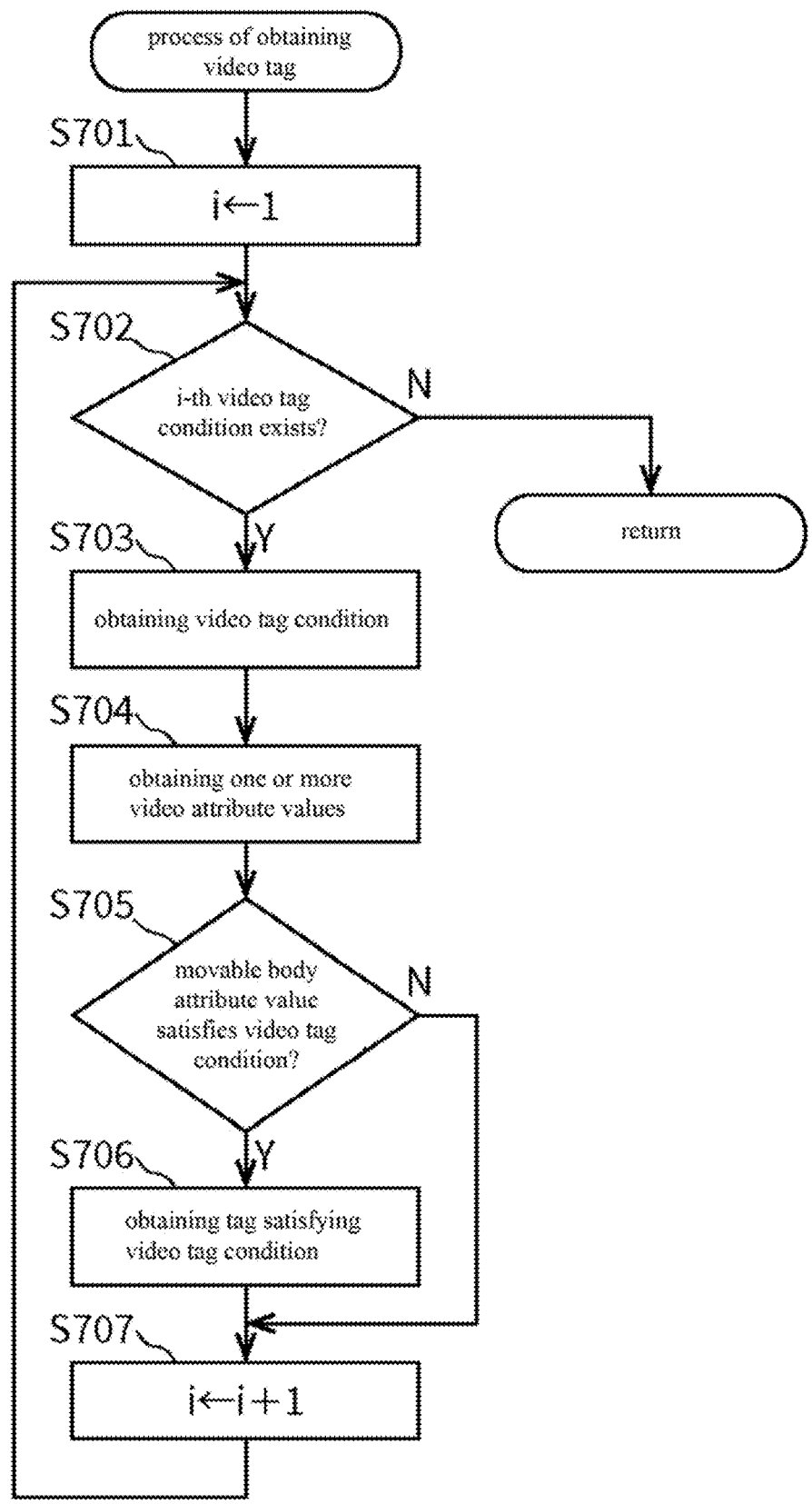
FIG. 7 is a flowchart for explaining an example of a process of obtaining a video tag in the first embodiment.

Then, the example of the process of obtaining the video tag in Step S509 will be explained using the flowchart in FIG. 7.

(Step S701) The mobile processor 23 or the like substitutes 1 for the counter i.

(Step S702) The mobile processor 23 or the like determines whether or not the i-th video tag condition exists. When the i-th video tag condition exists, the processing proceeds to Step S703. When the i-th video tag condition does not exist, the processing returns to the upstream process.

(Step S703) The mobile processor 23 or the like obtains the i-th video tag condition.

(Step S704) The mobile processor 23 or the like obtains one or more video attribute values used for determining the i-th video tag condition.

(Step S705) The mobile processor 23 or the like determines whether or not one or more movable body attribute values obtained in Step S704 satisfy the i-th attribute value tag condition. When the attribute value tag condition is satisfied, the processing proceeds to Step S706. When the attribute value tag condition is not satisfied, the processing proceeds to Step S707.

(Step S706) The mobile processor 23 or the like obtains the tag paired with the i-th attribute value tag condition and associates the tag with the corresponding video. The operation of associating the tag with the video is normally equivalent to the operation of associating the tag with the field included in the video.

(Step S707) The mobile processor 23 or the like increments the counter i by 1. The processing returns to Step S702.

Figure 8:
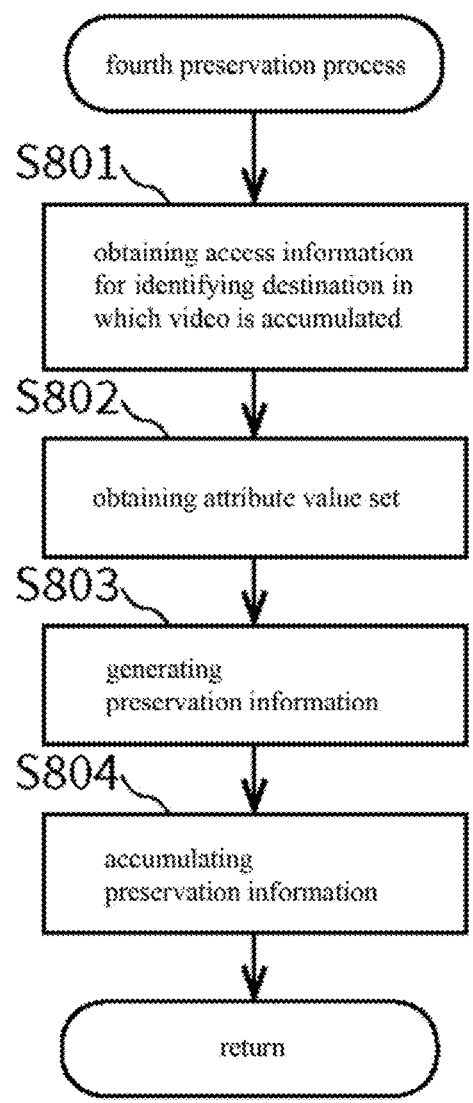
FIG. 8 is a flowchart for explaining an example of a fourth preservation process in the first embodiment.

Then, the example of the fourth preservation process in Step S409 will be explained using the flowchart in FIG. 8.

(Step S801) The fourth preserver 1354 obtains the access information for identifying the destination in which the video is accumulated. Note that the above described video is, for example, the merged video and the combined video.

(Step S802) The fourth preserver 1354 obtains the attribute value set corresponding to the accumulated video. When the accumulated video is generated by two or more original videos, the attribute value set corresponding to the video is the attribute value set of each of two or more original videos.

(Step S803) The fourth preserver 1354 generates the preservation information including the access information obtained in Step S801, the attribute value set obtained in Step S802 and the right holder identifier of the video. When new right holder identifier is obtained, the fourth preserver 1354 generates, for example, the preservation information including the new right holder identifier and the original right holder identifier.

(Step S804) The fourth preserver 1354 accumulates the preservation information generated in Step S803. The processing returns to the upstream process.

In Step S804, when the preservation information of the video corresponding to the preservation information to be accumulated is accumulated, the preservation information is overwritten on the preservation information generated in Step S803. Consequently, the change history of the right holder of the video can be managed, for example. The fourth preserver 1354 accumulates the preservation information in a blockchain, for example.

Figure 9:
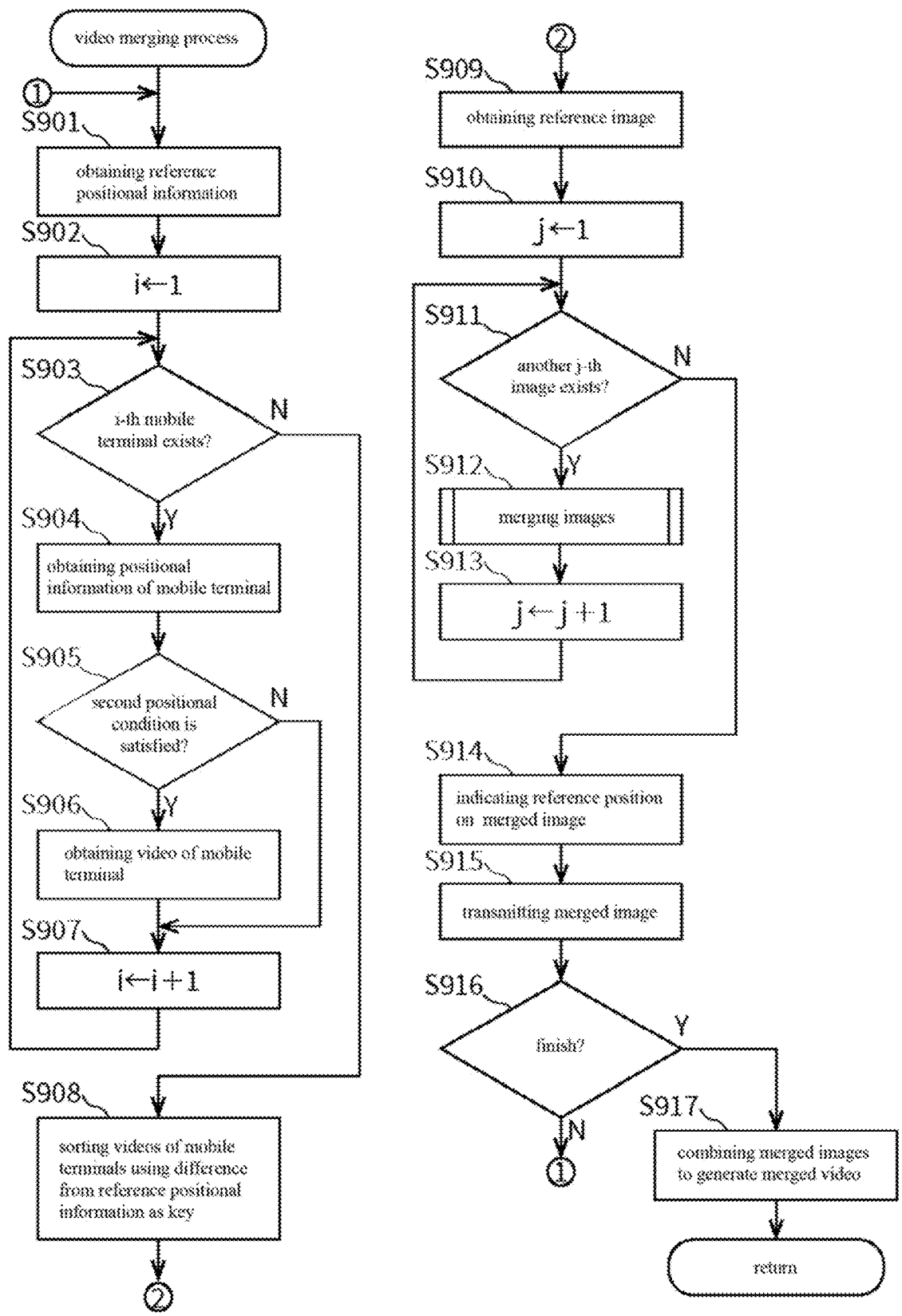
FIG. 9 is a flowchart for explaining an example of a video merging process in the first embodiment.

Then, the example of the video merging process in Step S413 will be explained using the flowchart in FIG. 9.

(Step S901) The video obtainer 133 obtains a reference positional information. The reference positional information is, for example, the positional information included in the received inquiry. The reference positional information is, for example, the positional information of the user terminal 3 or the object terminal 4. The reference positional information is, for example, one of the positional information in the route information included in the inquiry. The one of the positional information is the first (initial) positional information in the route information. The positional information is, for example, a latitude and a longitude. However, the positional information may be a location name (e.g., name of the parking lot) or a place name.

(Step S902) The video obtainer 133 substitutes 1 for the counter i.

(Step S903) The video obtainer 133 determines whether or not the i-th mobile terminal 2 capable of transmitting the video exists. When the i-th mobile terminal 2 exists, the processing proceeds to Step S904. When the i-th mobile terminal 2 does not exist, the processing proceeds to Step S908. Note that the mobile terminal 2 capable of transmitting the video is normally the mobile terminal 2 during the movement.

The mobile terminal 2 during the movement is the mobile terminal 2 corresponding to the movement information stored in the storage 11. Namely, the video obtainer 133 refers to the storage 11 and determines whether or not the i-th movement information exists.

(Step S904) The video obtainer 133 obtains the latest positional information transmitted from the i-th mobile terminal 2.

(Step S905) The video obtainer 133 determines whether or not the positional information obtained in Step S904 satisfies the second positional condition with respect to the reference positional information. When the second positional condition is satisfied, the processing proceeds to Step S906. When the second positional condition is not satisfied, the processing proceeds to Step S907.

(Step S906) The video obtainer 133 obtains the video from the i-th mobile terminal 2 and temporarily stores the video in a not-illustrated buffer while being paired with the right holder identifier of the i-th mobile terminal 2 and the positional information.

Note that the video obtainer 133 transmits the inquiry including a type identifier (e.g., "moving image," "still image" and "around view image") for identifying the type of the requesting image to the i-th mobile terminal 2 and receives the image corresponding to the inquiry from the i-th mobile terminal 2.

(Step S907) The video obtainer 133 increments the counter i by 1. The processing returns to Step S903.

(Step S908) The video generator 13 calculates a difference (distance) between each of the images temporarily stored in a not-illustrated buffer and the reference positional information. The video generator 134 sorts the videos in ascending order using the above described difference as a key.

(Step S909) The video generator 134 obtains the reference image. The reference image is the image corresponding to the reference positional information. The reference image is, for example, the image transmitted from the user terminal 3 existing at the position of the reference positional information. Note that the above described image is the image whose image type is identified by a type identifier for identifying the type of the image to be required.

(Step S910) The video generator 134 substitutes 1 for the counter j.

(Step S911) The video generator 134 determines whether or not another j-th image exists. When another j-th image exists, the processing proceeds to Step S912. When another j-th image does not exist, the processing proceeds to Step S914. Note that another image is the image sorted in Step S908.

(Step S912) The video generator 134 performs an image merging process. The example of the image merging process will be explained using the flowchart in FIG. 10.

(Step S913) The video generator 134 increments the counter j by 1. The processing returns to Step S911.

(Step S914) The video generator 134 generates the image for indicating the position indicated by the reference positional information on the merged image finally generated in Step S912, and temporarily stores the image in a not-illustrated buffer. Note that the above described image is the merged image.

(Step S915) The video transmitter 141 transmits the merged image generated in Step S914. Note that the video transmitter 141 may transmit the merged image finally generated in Step S912. The destination to transmit the merged image is normally the user terminal 3 transmitting the inquiry.

(Step S916) The video transmitter 141 determines whether or not to finish the transmission of the merged image. When the transmission of the merged image is finished, the processing proceeds to Step S917. When the transmission of the merged image is not finished, the processing returns to Step S901.

When the instruction for finishing is received from the user terminal 3 transmitting the inquiry, the video transmitter 141 determines that the transmission of the merged image will be finished.

(Step S917) The video generator 134 combines the transmitted one or two merged images in a time series manner to generate a merged video and temporarily stores the merged video in a not-illustrated buffer. The processing returns to the upstream process.

Figure 10:
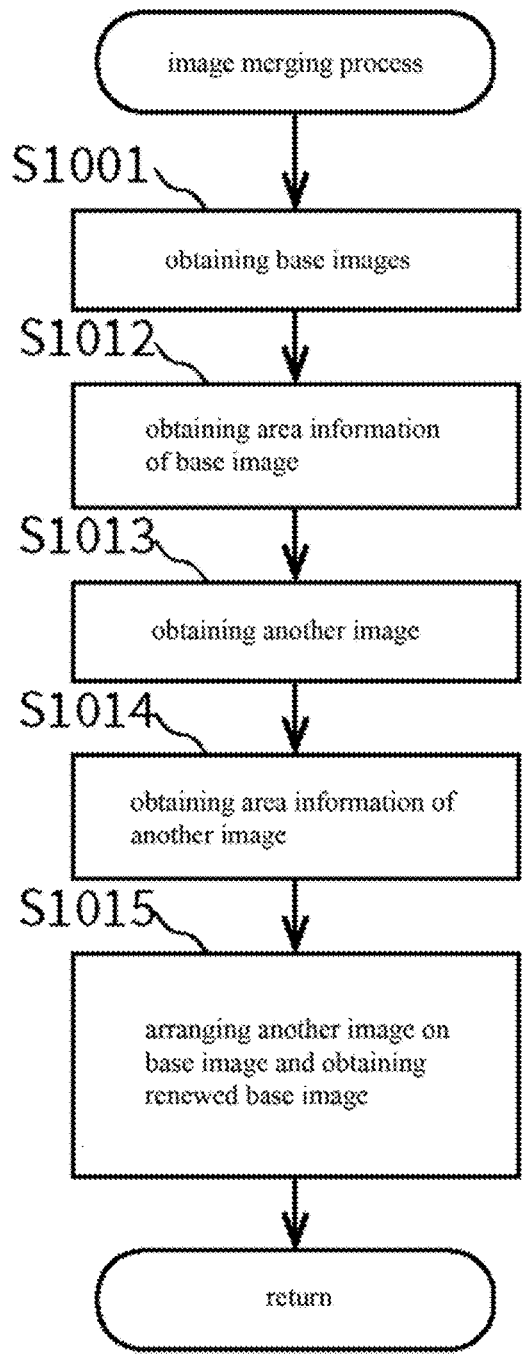
FIG. 10 is a flowchart for explaining an example of the image merging process in the first embodiment.

Then, the example of the image merging process in Step S912 will be examined using the flowchart in FIG. 10.

(Step S1001) The video generator 134 obtains base images. Note that the initial base image is the reference image obtained in Step S909. The base image is the base image existed in the previous loop of Step S911 to Step S913 and renewed in Step S1005.

(Step S1002) The video generator 134 obtains area information for identifying the area covered by the base image obtained in Step S1001. Note that the area information is, for example, a set of the positional information of the vertexes forming a polygonal shape or a set of the positional information of two points on the diagonal of a rectangular shape.

(Step S1003) The video generator 134 obtains another j-th image in Step S911.

(Step S1004) The video generator 134 obtains the area information for identifying the area covered by another image obtained in Step S1003.

(Step S1005) The video generator 134 determines the area on which another image is arranged with respect to the base image using the area information of the base image and the area information of another image, arranges another image on the area, and obtains the renewed base image. The processing returns to the upstream process.

Then, the example of the video combining process in Step S414 will be explained using the flowchart in FIG. 11.

(Step S1101) The video obtainer 133 obtains the target positional information. Note that the target positional information is normally the positional information included in the inquiry. The target positional information is, for example, the information for identifying the position near the position indicated by the positional information corresponding to the video to be obtained.

(Step S1102) The video obtainer 133 substitutes 1 for the counter i.

(Step S1103) The video obtainer 133 determines whether or not the i-th mobile terminal 2 capable of transmitting the video exists. When the i-th mobile terminal 2 exists, the processing proceeds to Step S1104. When the i-th mobile terminal 2 does not exist, the processing proceeds to Step S1114. Note that the mobile terminal 2 capable of transmitting the video is normally the mobile terminal 2 during the movement. The mobile terminal 2 during the movement is the mobile terminal 2 corresponding to the movement information stored in the storage 11.

The mobile terminal 2 during the movement is the mobile terminal 2 corresponding to the movement information stored in the storage 11. Namely, the video obtainer 133 refers to the storage 11 and determines whether or not the i-th movement information exists, for example.

(Step S1104) The video obtainer 133 obtains the latest positional information transmitted from the i-th mobile terminal 2.

(Step S1105) The video obtainer 133 determines whether or not the positional information of the i-th mobile terminal 2 satisfies the first positional condition with respect to the target positional information. When the first positional condition is satisfied, the processing proceeds to Step S1106.

When the first positional condition is not satisfied, the processing proceeds to Step S1110.

(Step S1106) The video obtainer 133 obtains the video from the i-th mobile terminal 2 and temporarily stores the video in a not-illustrated buffer while being paired with the right holder identifier of the i-th mobile terminal 2 and the positional information.

Note that the video obtainer 133 may transmit the inquiry including a type identifier (e.g., "moving image" and "still image") for identifying the type of requesting image to the i-th mobile terminal 2 and receives the image corresponding to the inquiry.

(Step S1107) The video transmitter 141 transmits the video obtained in Step S1106. The video transmitter 141 normally transmits the video to the user terminal 3 transmitting the inquiry.

(Step S1108) The video obtainer 133 obtains the target positional information. When the object terminal 4 transmitting the positional information is during the movement, for example, the target positional information obtained here is different from the positional information obtained in Step S1101. However, when the object terminal 4 is not moved or when the inquiry including one fixed positional information is received, the target positional information obtained here is same as the positional information obtained in Step S1101.

(Step S1109) The video obtainer 133 obtains the renewed positional information of the i-th mobile terminal 2. The processing returns to Step S1105.

(Step S1110) The video generator 134 determines whether or not the video obtained and transmitted by the i-th mobile terminal 2 exists. When the transmitted video exists, the processing proceeds to Step S1111. When the transmitted video does not exist, the processing proceeds to Step S1113.

(Step S1111) The video generator 134 generates the combined video including the video obtained and transmitted by the i-th mobile terminal 2 and temporarily accumulates the combined video in a not-illustrated buffer while being paired with the right holder identifier of the i-th mobile terminal 2.

In the initial process in Step S1111, the combined video is the video obtained and transmitted by the i-th mobile terminal 2. In the process in Step S1111 of the second and subsequent processes in the loop processing, the combined video is the video generated by combining the video combined in the previous processes with the video captured by the i-th mobile terminal 2 in a time series manner.

(Step S1112) The video obtainer 133 substitutes 1 for the counter i. The processing returns to Step S1103.

(Step S1113) The video obtainer 133 increments the counter i by 1. The processing returns to Step S1103.

(Step S1114) The video obtainer 133 determines whether or not to finish the video combining process. When the video combining process is finished, the processing proceeds to Step S1115. When the video combining process is not finished, the processing proceeds to Step S1116.

For example, when the next positional information included in the received inquiry does not exist or the instruction for finishing is received, the video obtainer 133 determines that the video combining process will be finished.

(Step S1115) The video obtainer 133 obtains the next target positional information. For example, the video obtainer 133 obtains the next positional information included in the route information included in the inquiry. The processing returns to Step S1103.

(Step S1116) The video generator 134 combines one, two or more combined videos generated in Step S1111 in the order when the videos are obtained, and generates the combined video to be accumulated. Then, the video generator 134 temporarily accumulates the combined video in a not-illustrated buffer while being paired with each of two or more right holder identifiers and the positional information of the original videos of the combined video. The processing returns to the upstream process.

Then, the example of the registered video search process in Step S41 will be explained using the flowchart in FIG. 12.

(Step S1201) The video obtainer 133 substitutes 1 for the counter i.

(Step S1202) The video obtainer 133 determines whether or not the i-th target positional information exists in the received inquiry. When the i-th positional information exists, the processing proceeds to Step S1203. When the i-th positional information does not exist, the processing proceeds to Step S1217.

The target positional information is the positional information used for searching the video. The target positional information is, for example, one positional information included in the received inquiry or two or more positional information included in the route information included in the received inquiry.

(Step S1203) The video obtainer 133 obtains the i-th target positional information included in the received inquiry.

(Step S1204) The video obtainer 133 obtains all of the preservation information. The video obtainer 133 obtains, for example, the preservation information in the blockchain.

(Step S1205) The video obtainer 133 substitutes 1 for the counter j.

(Step S1206) The video obtainer 133 determines whether or not the j-th preservation information exists in the preservation information obtained in Step S1204. When the j-th preservation information exists, the processing proceeds to Step S1207. When the j-th preservation information does not exist, the processing proceeds to Step S1216.

(Step S1207) The video obtainer 133 examines the j-th preservation information and determines whether or not the video corresponding to the j-th preservation information can be provided to a third party. When the video can be provided, the processing proceeds to Step S1208. When the video cannot be provided, the processing proceeds to Step S1215. The state that the video can be provided is, for example, the state that the video can be viewed, the state that the video can be sold, or the state that the video can be viewed and sold.

(Step S1208) The video obtainer 133 substitutes 1 for the counter k.

(Step S1209) The video obtainer 133 determines whether or not the k-th unit of search exists in the j-th preservation information or the video corresponding to the j-th preservation information. When the k-th unit of search exists, the processing proceeds to Step S1210. When the k-th unit of search does not exist, the processing proceeds to Step S1215.

Note that the unit of search is a volume of the video used for determining whether or not the inquiry is satisfied. The volume of the video corresponding to the unit of search is, for example, the video from the start to the end of the video capturing, the video having the duration of a predetermined period, the video until the occurrence of a predetermined event (e.g., the video recorded from when the speed as the movable body attribute value is 0 to when the speed is returned to 0 next time or the video recorded during the period from leaving a resident location such as a home parking lot to returning to the resident location) or the video recorded for a predetermined period before and after a predetermined tag (e.g., "accident" or "traffic jam") is applied. However, the unit of search is not limited.

(Step S1210) The video obtainer 133 obtains the set of the video attribute value of the k-th unit of search in the j-th preservation information.

(Step S1211) The video obtainer 133 determines whether or not the set of the video attribute value of the k-th unit of search satisfies the first positional condition with respect to the i-th target positional information. When the first positional condition is satisfied, the processing proceeds to Step S1212. When the first positional condition is not satisfied, the processing proceeds to Step S1214.

(Step S1212) The video obtainer 133 obtains the video or the like corresponding to the j-th preservation information and temporarily accumulates the video or the like in a not-illustrated buffer. The video or the like is, for example, the set of the video and the video attribute value or only the video.

(Step S1213) The video obtainer 133 increments the counter i by 1. The processing returns to Step S1202.

(Step S1214) The video obtainer 133 increments the counter k by 1. The processing returns to Step S1209.

(Step S1215) The video obtainer 133 increments the counter j by 1. The processing returns to Step S1206.

(Step S1216) The video obtainer 133 increments the counter i by 1. The processing returns to Step S1202.

(Step S1217) The video generator 134 determines whether or not two or more videos or the like are obtained in Step S1212. When two or more videos or the like are obtained, the processing proceeds to Step S1218. When only one video or the like is obtained, the processing proceeds to Step S1219.

(Step S1218) The video generator 134 combines two or more videos accumulated in a not-illustrated buffer in the order when the videos are accumulated, generates the combined video, and accumulates the combined video in a not-illustrated buffer. Note that the video generator 134 preferably accumulates the combined video in a not-illustrated buffer while being also associated with the right holder identifier and the video attribute value of the video which is the original video of the combined video.

(Step S1219) The video transmitter 141 transmits the combined video or the obtained video. The processing returns to the upstream process. The processing returns to the upstream process.

Figure 12:
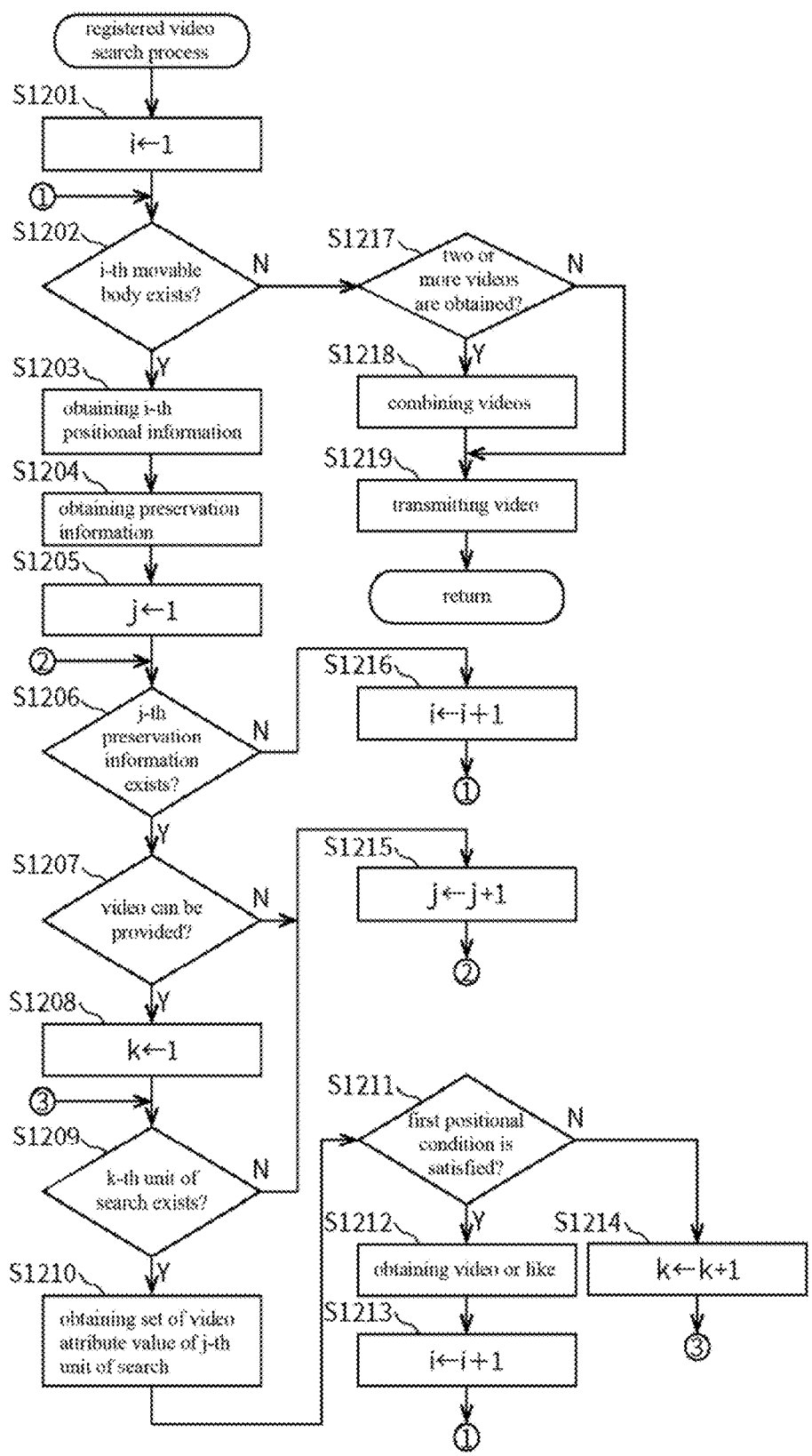
FIG. 12 is a flowchart for explaining an example of a registered video search process in the first embodiment.

In the flowchart in FIG. 12, the video transmitter 141 may transmit the video each time when the video is obtained in Step S1212. In the above described case, the process in Step S1219 is not required.

In the flowchart in FIG. 12, the video transmitter 141 normally transmits the combined video or the video to the user terminal 3 transmitting the inquiry.

Figure 13:
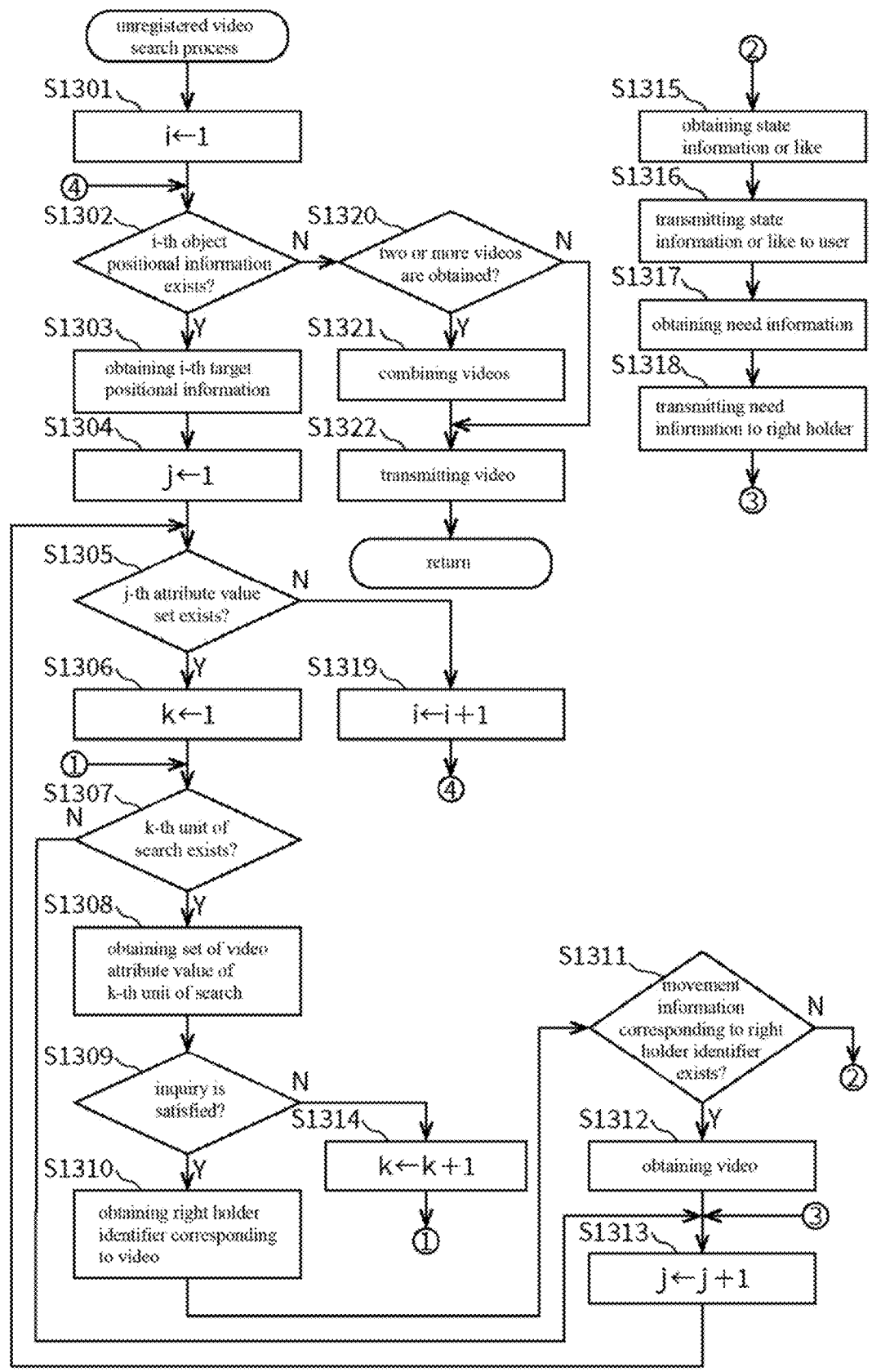
FIG. 13 is a flowchart for explaining the first example of an unregistered video search process in the first embodiment.

Then, the example of the unregistered video search process in Step S417 will be explained using the flowchart in FIG. 13. The first example of the unregistered video search process is the case when the attribute value set of the set storage 111 is used.

(Step S1301) The video obtainer 133 substitutes 1 for the counter i.

(Step S1302) The video obtainer 133 determines whether or not the i-th target positional information exists in the received inquiry. When the i-th positional information exists, the processing proceeds to Step S1303. When the i-th positional information does not exist, the processing proceeds to Step S1320.

(Step S1303) The video obtainer 133 obtains the i-th target positional information in the received inquiry.

(Step S1304) The video obtainer 133 substitutes 1 for the counter i.

(Step S1305) The video obtainer 133 determines whether or not the j-th attribute value set exists in the set storage 111. When the j-th attribute value set exists, the processing proceeds to Step S1303. When the j-th attribute value set does not exist, the processing proceeds to Step S1319.

(Step S1306) The video obtainer 133 substitutes 1 for the counter k.

(Step S1307) The video obtainer 133 determines whether or not the k-th unit of search corresponding to the j-th attribute value set exists. When the k-th unit of search exists, the processing proceeds to Step S1308. When the k-th unit of search does not exist, the processing proceeds to Step S1313.

(Step S1308) The video obtainer 133 obtains the set of the video attribute value of the k-th unit of search in the j-th attribute value set from the set storage 111.

(Step S1309) The video obtainer 133 determines whether or not the set of the video attribute value obtained in Step S1308 satisfies the inquiry. When the set of the video attribute value satisfies the inquiry, the processing proceeds to Step S1310. When the set of the video attribute value does not satisfy the inquiry, the processing proceeds to Step S1314.

(Step S1310) The video obtainer 133 obtains the right holder identifier corresponding to the video.

(Step S1311) The video obtainer 133 determines whether or not the movement information corresponding to the right holder identifier obtained in Step S1310 exists. When the movement information exists (e.g., when the power of the mobile terminal 2 is turned on), the processing proceeds to Step S1312. When the movement information does not exist (e.g., when the power of the mobile terminal 2 is turned off), the processing proceeds to Step S1315.

(Step S1312) The video obtainer 133 obtains the video corresponding to the k-th unit of search from the mobile terminal 2 corresponding to the right holder identifier obtained in Step S1310 and temporarily accumulates the video in a not-illustrated buffer. Note that the video obtainer 133 transmits the request of the video corresponding to the k-th unit of search to the mobile terminal 2 and receives the video corresponding to the request from the mobile terminal 2, for example.

(Step S1313) The video obtainer 133 increments the counter j by 1. The processing returns to Step S1305.

(Step S1314) The video obtainer 133 increments the counter k by 1. The processing returns to Step S1307.

(Step S1315) The video obtainer 133 obtains the state information or the like. Note that the state information or the like includes, for example, the state information indicating that the power of the mobile terminal 2 is turned off.

(Step S1316) The state transmitter 142 transmits the state information or the like obtained in Step S1315 to the user transmitting the inquiry.

(Step S1317) The video obtainer 133 obtains the need information.

(Step S1318) The need transmitter 143 transmits the need information obtained in Step S1317 to the right holder of the video. The processing returns to Step S1313.

(Step S1319) The video obtainer 133 increments the counter i by 1. The processing returns to Step S1302.

(Step S1320) The video generator 134 determines whether or not two or more videos can be obtained in Step S1312. When two or more videos can be obtained, the processing proceeds to Step S1321. When only one video can be obtained, the processing proceeds to Step S1322.

(Step S1321) The video generator 134 combines two or more videos accumulated in a not-illustrated buffer in Step S1312 in the order when the videos are accumulated to generate one combined video and accumulates the one combined video in a not-illustrated buffer.

(Step S1322) The video transmitter 141 transmits the combined video or the video. The processing returns to the upstream process. Note that the video transmitter 141 normally transmits the combined video or the video to the user terminal 3 transmitting the inquiry.

Figure 14:
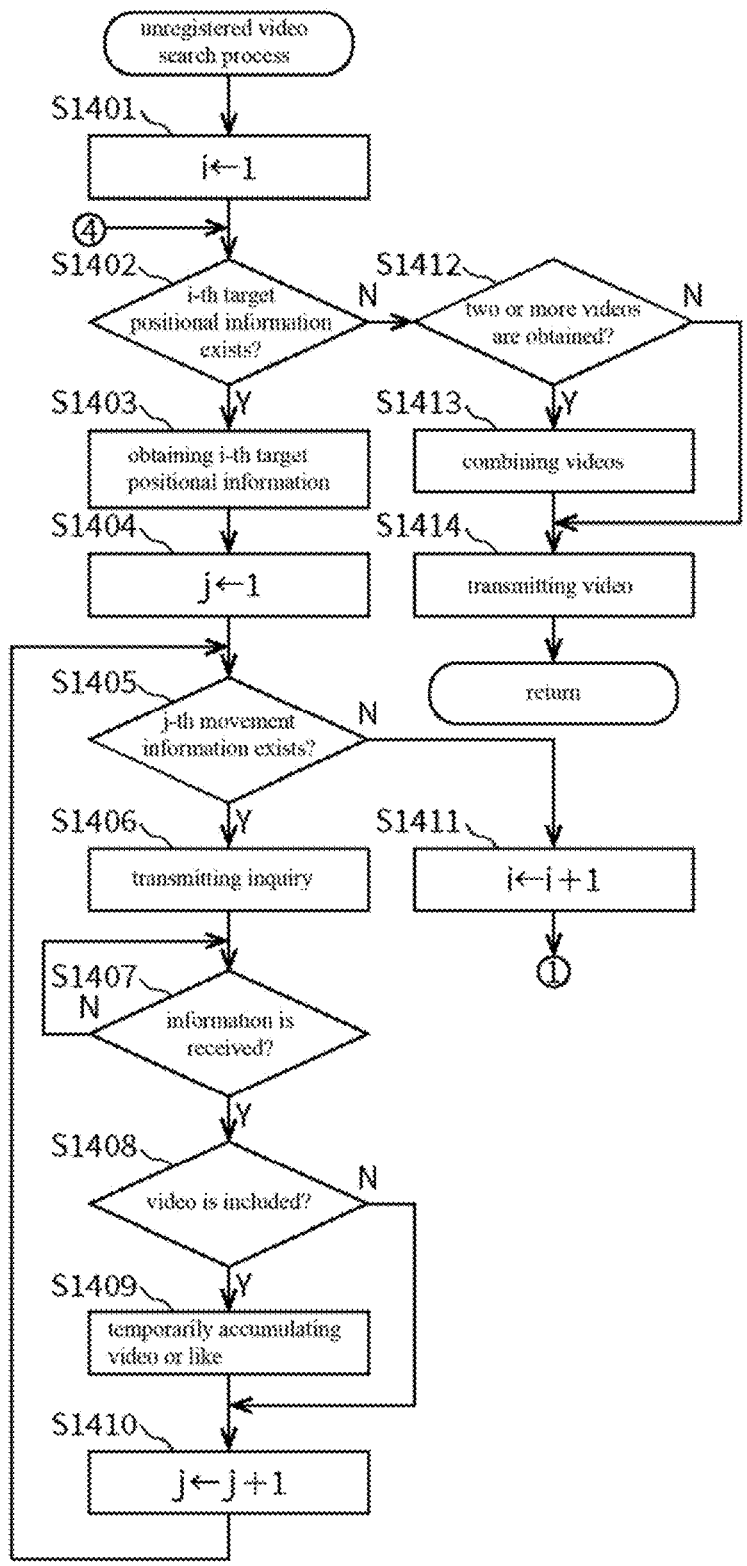
FIG. 14 is a flowchart for explaining the second example of the unregistered video search process in the first embodiment.

Then, the second example of the unregistered video search process in Step S417 will be explained using the flowchart in FIG. 14. The second example of the unregistered video search process is the case when the inquiry is transmitted to the mobile terminal 2.

(Step S1401) The video obtainer 133 substitutes 1 for the counter i.

(Step S1402) The video obtainer 133 determines whether or not the i-th target positional information exists in the received inquiry. When the i-th positional information exists, the processing proceeds to Step S1403. When the i-th positional information does not exist, the processing proceeds to Step S1412.

(Step S1403) The video obtainer 133 obtains the i-th target positional information in the received inquiry.

(Step S1404) The video obtainer 133 substitutes 1 for the counter j.

(Step S1405) The video obtainer 133 determines whether or not the j-th movement information exists in the storage 11. When the j-th movement information exists, the processing proceeds to Step S1403. When the j-th movement information does not exist, the processing returns to the upstream process.

(Step S1406) The video obtainer 133 transmits the inquiry corresponding to the j-th movement information to the mobile terminal 2.

(Step S1407) The video obtainer 133 determines whether or not the information corresponding to the j-th movement information from the mobile terminal 2. When the information is received, the processing proceeds to Step S1408. When the information is not received, the processing returns to Step S1407.

(Step S1408) The video obtainer 133 determines whether or not the video is included in the information received in Step S1407. When the video is included, the processing proceeds to Step S1409. When the video is not included, the processing proceeds to Step S1410.

(Step S1410) The video obtainer 133 temporarily accumulates the video or the like received in Step S1407 in a not-illustrated buffer.

(Step S1411) The video obtainer 133 increments the counter j by 1. The processing returns to Step S1405.

(Step S1412) The video generator 134 determines whether or not two or more videos can be accumulated in Step S1409. When two or more videos can be accumulated, the processing proceeds to Step S1413. When only one video can be accumulated, the processing proceeds to Step S1414.

(Step S1413) The video generator 134 combines two or more videos accumulated in a not-illustrated buffer in Step S1409 in the order when the videos are accumulated to generate one combined video and accumulates the one combined video in a not-illustrated buffer.

(Step S1414) The video transmitter 141 transmits the combined video or the video. The processing returns to the upstream process. Note that the video transmitter 141 normally transmits the combined video or the video to the user terminal 3 transmitting the inquiry.

Then, the example of the preservation process in Step S418 will be explained using the flowchart in FIG. 15.

(Step S1501) The right holder processor 135 accumulates the transmitted video while being associated with the attribute value set associated with each of two or more videos which are the original video of the transmitted video.

Note that the right holder processor 135 preferably accumulates the video paired with the right holder identifier for identifying each of one, two or more right holders of the video. The right holder identifier here is, for example, one or more right holder identifiers of the video which is the source of the accumulate video. The right holder identifier here is, for example, one right holder identifier for identifying the user transmitting the inquiry.

For example, the right holder processor 135 accumulates the video in the storage 11 or another devise than the information processing device 1. Another device than the information processing device 1 may be a device included in a blockchain.

(Step S1502) The fourth preserver 1354 performs the fourth preservation process. The example of the fourth preservation process is explained using the flowchart in FIG. 8.

(Step S1503) The right holder processor 135 substitutes 1 for the counter i.

(Step S1504) The right holder processor 135 determines whether or not the i-th video which is the source of the accumulated video exists. When the i-th video exists, the processing proceeds to Step S1505. When the i-th video does not exist, the processing returns to the upstream process.

(Step S1505) The rewarding unit 1355 performs the rewarding process. The example of the rewarding process will be explained using the flowchart in FIG. 16. The rewarding process here is the rewarding process to the right holder of the i-th video which is the source of the accumulated video exists.

(Step S1506) The right holder processor 135 determines whether or not to change the right holder of the i-th video which is the source of the accumulated video. When the right holder is changed, the processing proceeds to Step S1507. When the right holder is not changed, the processing proceeds to Step S1508.

Whether or not to change the right holder may be determined based on the flag associated with the i-th video, may be preliminarily determined, or may be changed when "the information indicating the change request of the right holder" is included in the inquiry.

(Step S1507) The right holder processor 135 obtains the user identifier of the user terminal 3. Note that the above described user identifier becomes a new right holder identifier.

(Step S1508) The right holder processor 135 determines whether or not the i-th video which is the source of the accumulated video has been registered. When the i-th video has been registered, the processing proceeds to Step S1511. When the i-th video has not been registered, the processing proceeds to Step S1509.

(Step S1509) The first preserver 1351 accumulates the i-th video which is the source of the accumulated video.

(Step S1510) The fourth preserver 1354 performs the fourth preservation process related to the i-th video which is the source of the accumulated video. The example of the fourth preservation process will be explained using the flowchart in FIG. 8.

(Step S1511) The right holder processor 135 increments the counter i by 1. The processing returns to Step S1504.

Figure 15:
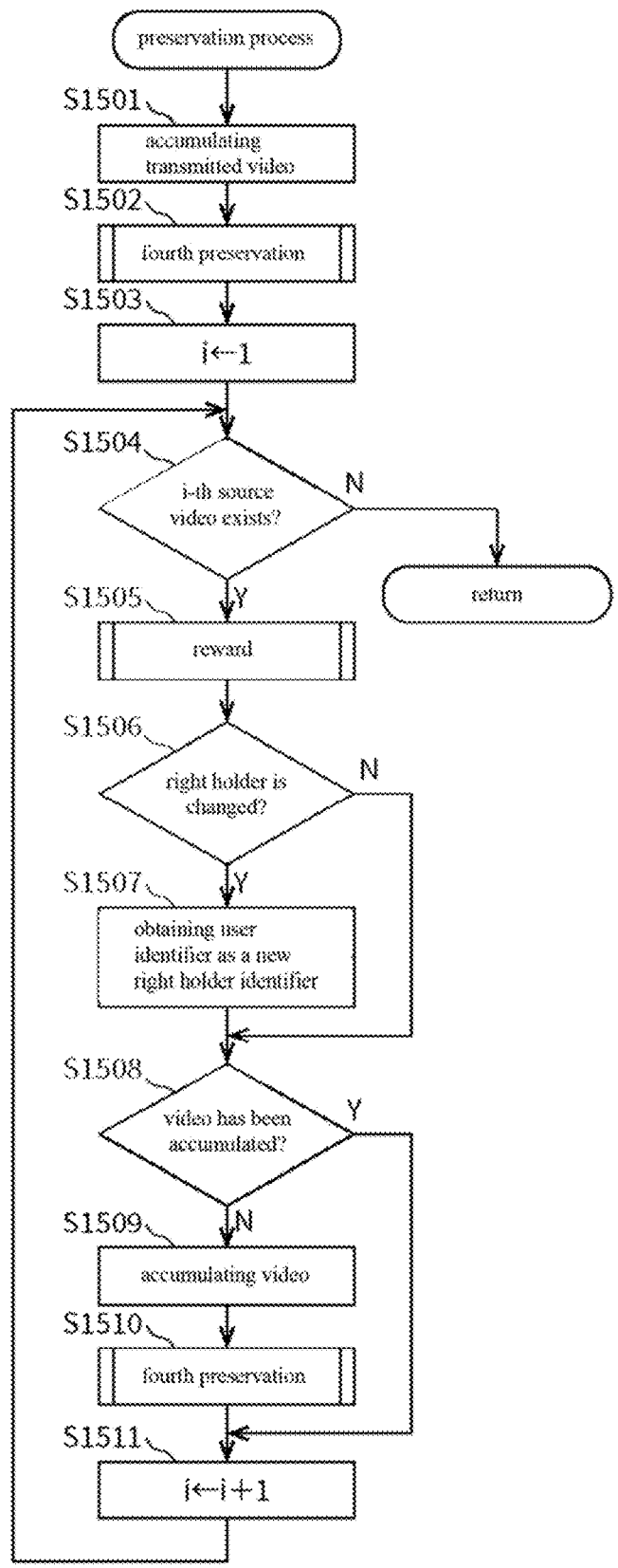
FIG. 15 is a flowchart for explaining an example of a preservation process in the first embodiment.

In the flowchart in FIG. 15, the process (Step S1509) of accumulating two or more videos which are the source of the combined video and the fourth preservation process (Step S1510) are performed when the combined video is generated. However, the above described processes can be omitted.

Then, the example of the rewarding process in Step S423 or the like will be explained using the flowchart in FIG. 16.

(Step S1601) The rewarding unit 1355 obtains one, two or more right holder identifiers of the target video. The rewarding unit 1355 may obtain the right holder identifier of the past right holder of the target video.

(Step S1602) The rewarding unit 1355 obtains the attribute value set of the target video.

(Step S1603) The rewarding unit 1355 obtains the service identifier for identifying the service performed on the target video. The service identifier is, for example, "viewing" and "purchasing."

(Step S1604) The rewarding unit 1355 obtains the reward amount using the attribute value set obtained in Step S1602 and one or more information of the service identifier obtained in Step S1603.

When two or more right holder identifiers are obtained, the rewarding unit 1355 obtains the reward amount to each of the right holder identifiers. When the history information of the right holder including two or more right holder identifiers is obtained, the rewarding unit 1355 may obtain the reward amount to each of the right holder identifiers.

For example, the rewarding unit 1355 preferably obtains the video attribute value corresponding to each of two or more videos transmitted by the video transmitter 141 which are the source of the video and determines the reward amount of each of two or more right holders using the video attribute value. For example, the rewarding unit 1355 preferably determines the reward amount so that the reward amount increases as the data amount, the time of the video or the number of the frames of the original video adopted in the video transmitted by the video transmitter 141 increases. For example, the rewarding unit 1355 preferably determines the reward amount so that the reward amount increases as the resolution of the original video adopted in the video transmitted by the video transmitter 141 increases.

(Step S1605) The rewarding unit 1355 performs the process of providing the reward to the right holder identified by the right holder identifier obtained in Step S1601 by the reward amount obtained in Step S1604.

(Step S1606) The rewarding unit 1355 performs the process of causing the user that has enjoyed the service relevant to the target video to pay the reward. The processing returns to the upstream process. Note that the target video is normally the video transmitted to the user terminal 3.

Figure 16:
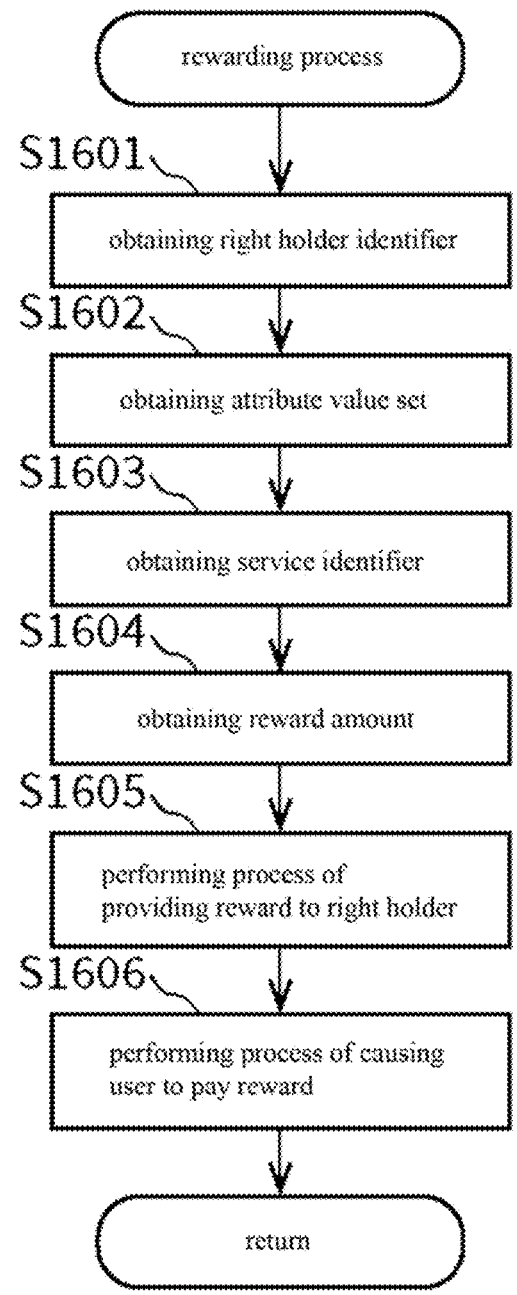
FIG. 16 is a flowchart for explaining an example of a rewarding process in the first embodiment.

In the flowchart in FIG. 16, it is possible to obtain the profit obtained by the managing company of the information processing device 1 and accumulates the profit.

Then, the operation example of the mobile terminal 2 will be explained using the flowchart in FIG. 17.

(Step S1701) The mobile processor 23 determines whether or not the start of movement is detected. When the start of movement is detected, the processing proceeds to Step S1702. When the start of movement is not detected, the processing proceeds to Step S1717. Note that the start of movement is detected when the engine of the movable body provided with the mobile terminal 2 is turned on or when the mobile terminal 2 is turned on, for example.

(Step S1702) The movement information obtainer 233 obtains the movement information. The movement information transmitter 241 transmits the movement information to the information processing device 1. Note that the movement information is stored in the mobile storage 21, for example.

(Step S1703) The image capturer 231 starts to capture the video.

(Step S1704) The image capturer 231 obtains the video.

(Step S1705) The mobile processor 23 obtains one, two or more video attribute values and associates the one or more video attribute values with the video obtained in Step S1704.

The mobile processor 23 obtains, for example, the positional information, the time information, the weather information, the temperature information and the season information. The mobile processor 23 obtains, for example, one, two or more movable body attribute values (e.g., CAN data).

(Step S1706) The tag obtainer 232 determines whether or not to obtain the movable body attribute value tag. When the movable body attribute value tag is obtained, the processing proceeds to Step S1707. When the movable body attribute value tag is not obtained, the processing proceeds to Step S1709. Note that whether or not to obtain the movable body attribute value is preliminarily determined.

(Step S1707) The tag obtainer 232 performs the process of obtaining the movable body attribute value tag. The process of the movable body attribute value tag is explained using the flowchart in FIG. 6. Note that the tag here may or may not be obtained.

(Step S1708) The tag obtainer 232 associates one or more tags with the video obtained in Step S1704 when one or more tags are obtained in Step S1707.

Note that the tag obtainer 232 here preferably accumulates one or more tags in the mobile storage 21 while being associated with the video. Consequently, the user of the mobile terminal 2 can search the video using the tag as a key, for example.

(Step S1709) The tag obtainer 232 determines whether or not to obtain the video tag. When the video tag is obtained, the processing proceeds to Step S1710. When the video tag is not obtained, the processing proceeds to Step S1712. Note that whether or not to obtain the video tag is preliminarily determined.

(Step S1710) The tag obtainer 232 performs the process of obtaining the video tag. The process of obtaining the video tag is explained using the flowchart in FIG. 7. Note that the tag here may or may not be obtained.

(Step S1711) The tag obtainer 232 associates one or more tags with the video obtained in Step S1704 when one or more tags are obtained in Step S1710.

Note that the tag obtainer 232 here preferably accumulates one or more tags in the mobile storage 21 while being associated with the video. Consequently, the user of the mobile terminal 2 can search the video using the tag as a key, for example.

(Step S1712) The mobile processor 23 determines whether or not the end of movement is detected. When the end of movement is detected, the processing proceeds to Step S1713. When the end of movement is not detected, the processing returns to Step S1704.

Note that the mobile processor 23 detects the end of movement when the engine is turned off, when the power of the mobile terminal 2 is turned off or the arrival to the destination, for example.

(Step S1713) The mobile processor 23 obtains the right holder identifier from the mobile storage 21.

(Step S1714) The mobile processor 23 generates the attribute value set including one or more movable body attribute values obtained in Step S1705, one or more tags obtained in Step S1707 and one or more tags obtained in Step S1710.

(Step S1715) The set transmitter 243 transmits the attribute value set generated in Step S1714 to the information processing device 1 while being associated with the right holder identifier.

(Step S1716) The mobile video transmitter 242 or the like performs the video transmission process. The processing returns to Step S1701. Note that the example of the video transmission process will be explained using the flowchart in FIG. 18. The video transmission process is the process of automatically transmitting the video satisfying a preservation condition.

(Step S1717) The mobile receiver 22 determines whether or not the inquiry is received from the information processing device 1. When the inquiry is received, the processing proceeds to Step S1718. When the inquiry is not received, the processing returns to Step S1701.

(Step S1718) The mobile processor 23 performs the terminal image obtaining process corresponding to the received inquiry in Step S1717. The example of the terminal image obtaining process will be explained using the flowchart in FIG. 19. The terminal image obtaining process is the process of obtaining the video corresponding to the inquiry in the videos stored in the mobile storage 21.

(Step S1719) The mobile processor 23 determines whether or not the image is obtained in Step S1718. When the image is obtained, the processing proceeds to Step S1720. When the image is not obtained, the processing proceeds to Step S1721.

(Step S1720) The mobile video transmitter 242 transmits the image and the like to the information processing device 1. The processing returns to Step S1701. Note that the image and the like is, for example, the image, the attribute value set and the right holder identifier. The image is, for example, a moving image (video), a still image and an around view image.

(Step S1721) The mobile video transmitter 242 transmits error information. Note that the error information is the information indicating that the video cannot be obtained.

Figure 17:
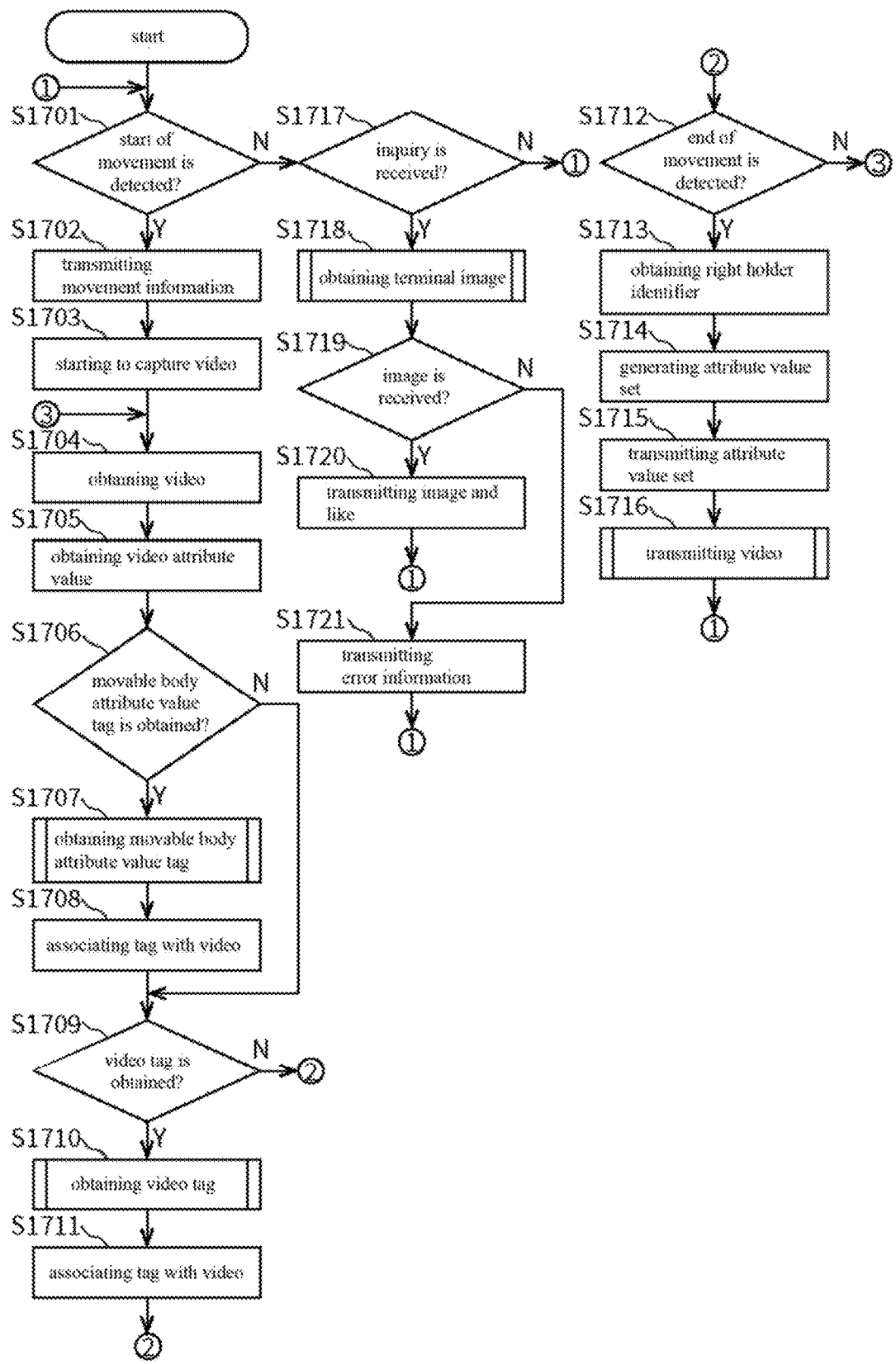
FIG. 17 is a flowchart for explaining an operation example of a mobile terminal 2 in the first embodiment.

In the flowchart in FIG. 17, it is preferable to transmit the set of the video attribute values which is a part or an entire of one or more video attribute values obtained in Step S1705, the rag obtained in Step S1707 and the tag obtained in Step S1710 to the information processing device 1 every time when the video is obtained, at predetermined intervals, or when a predetermined condition is satisfied (e.g., when the tag of "accident" or "traffic jam" is obtained).

In the flowchart in FIG. 17, the video transmission process (process in S1416) is performed after the end of the movement is detected. However, it is also possible to perform the video transmission process continuously. The operation of performing the video transmission process continuously is, for example, the operation of performing the video transmission process (S1416) immediately after S1711. Consequently, the video satisfying the preservation condition can be preserved even when the storage area for storing the video is small in the storage 11.

In the flowchart in FIG. 17, the process ends when the power is turned off or the instruction of ending process is interrupted.

Then, the example of the video transmission process in Step S1716 will be explained using the flowchart in FIG. 18.

(Step S1801) The mobile processor 23 obtains the attribute value set of the mobile storage 21.

(Step S1802) The mobile processor 23 substitutes 1 for the counter i.

(Step S1803) The mobile processor 23 determines whether or not the i-th unit of search exists. When the i-th unit of search exists, the processing proceeds to Step S1804. When the i-th unit of search does not exist, the processing returns to the upstream process.

(Step S1804) The mobile processor 23 obtains the set of the video attribute value of the i-th unit of search.

(Step S1805) The mobile processor 23 substitutes 1 for the counter j.

(Step S1806) The mobile processor 23 determines whether or not the j-th preservation condition exists. When the j-th preservation condition exists, the processing proceeds to Step S1807. When the j-th preservation condition does not exist, the processing proceeds to Step S1810.

(Step S1807) The mobile processor 23 determines whether or not the set of the video attribute value obtained in Step S1804 satisfies the j-th preservation condition. When the j-th preservation condition is satisfied, the processing proceeds to Step S1808. When the j-th preservation condition is not satisfied, the processing proceeds to Step S1811.

(Step S1808) The mobile processor 23 obtains the video and the like of the i-th unit of search. Note that video and the like of the i-th unit of search are, for example, the video of the i-th unit of search and the attribute value set corresponding to the video.

(Step S1809) The mobile video transmitter 242 transmits the video and the like obtained in Step S1808 to the information processing device 1.

(Step S1810) The mobile processor 23 increments the counter i by 1. The processing returns to Step S1803.

(Step S1811) The mobile processor 23 increments the counter j by 1. The processing returns to Step S1806.

Figure 19:
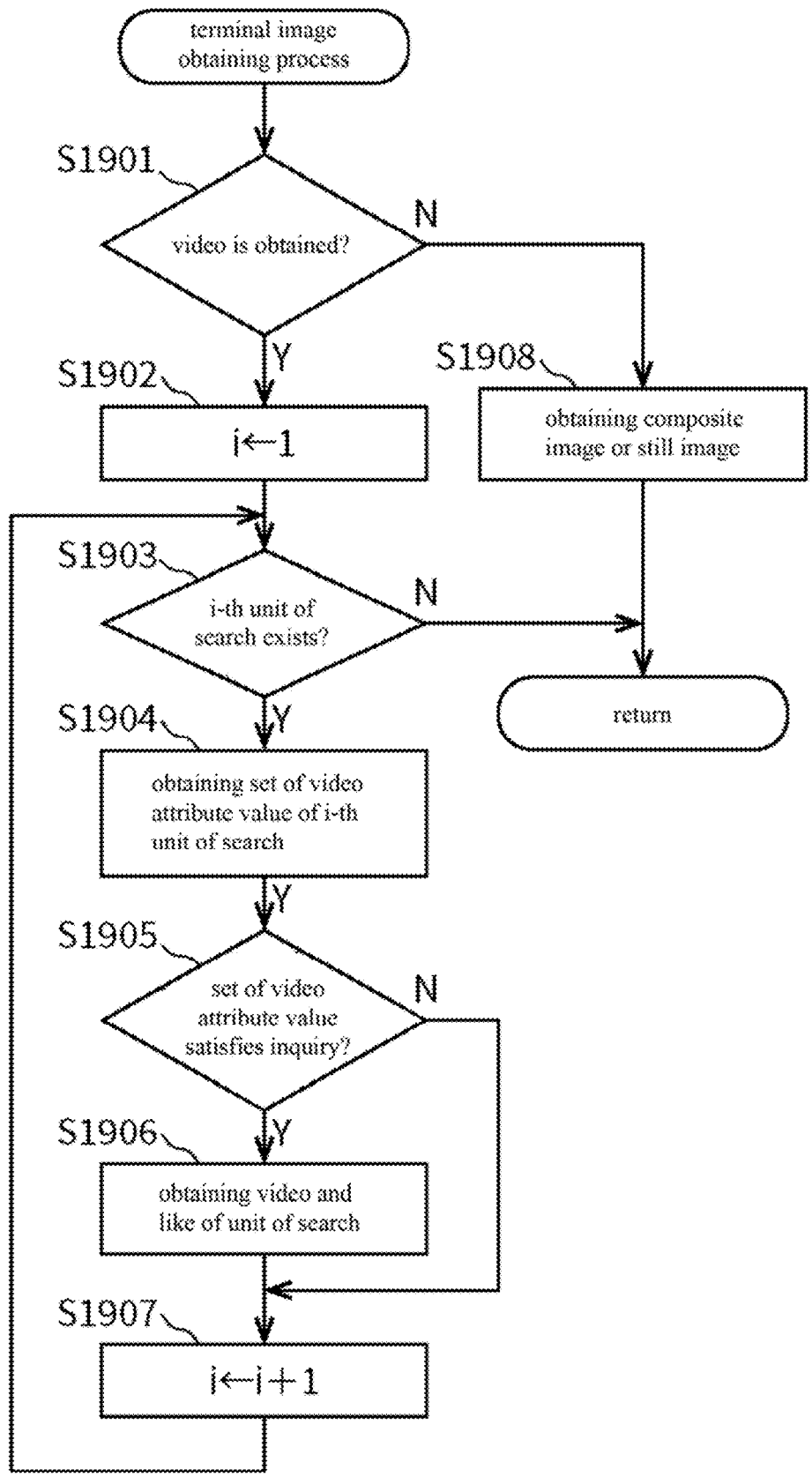
FIG. 19 is a flowchart for explaining an example of a terminal image obtaining process in the first embodiment.

Then, the example of the terminal image obtaining process in Step S1718 will be explained using the flowchart in FIG. 19.

(Step S1901) The mobile processor 23 determines whether or not to obtain the video using the received inquiry. When the video is obtained, the processing proceeds to Step S1902. When the video is not obtained, the processing proceeds to Step S1908.

Note that mobile processor 23 examines the type identifier (e.g., "moving image," "still image" and "around view image") included in the received inquiry and determines whether or not to obtain the video.

(Step S1902) The mobile processor 23 substitutes 1 for the counter i.

(Step S1903) The mobile processor 23 determines whether or not the i-th unit of search exists. When the i-th unit of search exists, the processing proceeds to Step S1904. When the i-th unit of search does not exist, the processing returns to the upstream process.

(Step S1904) The mobile processor 23 obtains the set of the video attribute value of the i-th unit of search.

(Step S1905) The mobile processor 23 determines whether or not the set of the video attribute value of the i-th unit of search satisfies the inquiry. When the set of the video attribute value satisfies the inquiry, the processing proceeds to Step S1906. When the set of the video attribute value does not satisfy the inquiry, the processing proceeds to Step S1907.

(Step S1906) The mobile processor 23 obtains the video and the like of the i-th unit of search. Note that the video and the like are, for example, the set of the video and the video attribute value.

(Step S1907) The mobile processor 23 increments the counter i by 1. The processing returns to Step S1903.

(Step S1908) The mobile processor 23 obtains the latest composite image or the latest still image. The processing returns to the upstream process.

Note that the composite image is the image formed by composing the still images captured by each of two or more cameras provided with the movable body. The composite image is, for example, the around view image. The still image is the image captured by one camera provided with the movable body. The detailed explanation of the technology of forming the around view image is omitted since the technology is a conventionally known technology.

Figure 20:
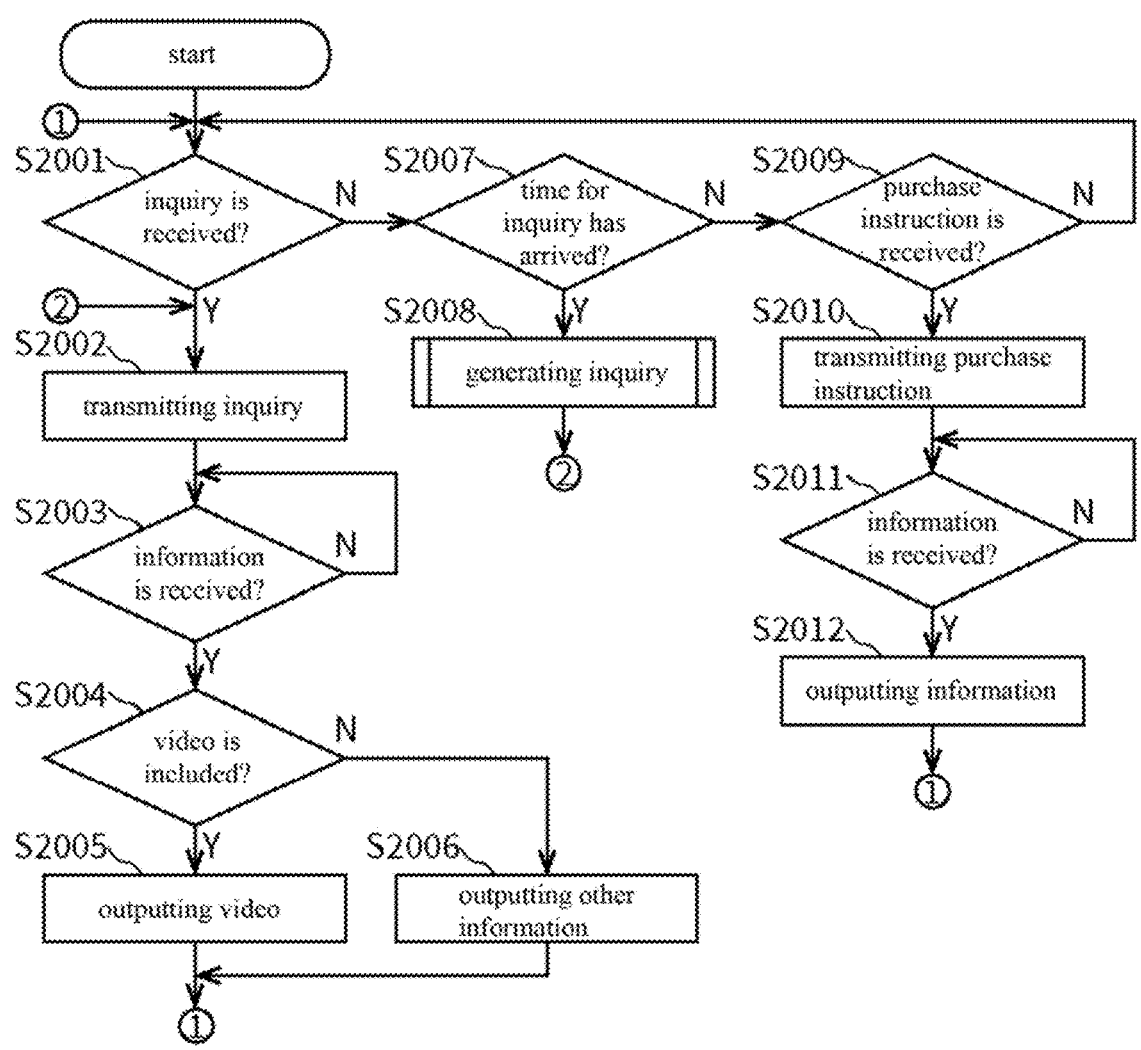
FIG. 20 is a flowchart for explaining an operation example of a user terminal 3 in the first embodiment.

The operation example of the user terminal 3 will be explained using the flowchart in FIG. 20.

(Step S2001) The user acceptor 32 determines whether or not the inquiry is received. When the inquiry is received, the processing proceeds to Step S2002. When the inquiry is not received, the processing proceeds to Step S2007.

Note that the reception of the inquiry is, for example, the reception of the input from the user, the reception of the positional information from the object terminal 4 and the reception of the destination or the route information from the navigation terminal 5.

(Step S2002) The user processor 33 generates the inquiry to be transmitted. Then, the user transmitter 34 transmits the inquiry to the information processing device 1 while being associated with the user identifier.

(Step S2003) The user receiver 35 determines whether or not the information is received from the information processing device 1. When the information is received, the processing proceeds to Step S2004. When the information is not received, the processing returns to Step S2003.

(Step S2004) The user processor 33 determines whether or not the video is included in the information received in Step S2003. When the video is included, the processing proceeds to Step S2005. When the video is not included, the processing proceeds to Step S2006.

(Step S2005) The user output unit 36 outputs the received video. The processing returns to Step S2001.

(Step S2006) The user output unit 36 outputs the other received information. The processing returns to Step S2001.

(Step S2007) The user processor 33 determines whether or not the time for the inquiry has arrived. When the time for the inquiry has arrived, the processing proceeds to Step S2008. When the time for the inquiry has not arrived, the processing proceeds to Step S2009.

The time for the inquiry is, for example, the time when the destination is set in the user terminal 3 serving as a navigation terminal or the time when the user terminal 3 installed in the automobile detects a traffic jam.

(Step S2008) The user processor 33 performs the inquiry generating process. The processing proceeds to Step S2002. The example of the inquiry generating process will be explained using the flowchart in FIG. 18.

(Step S2009) The user acceptor 32 determines whether or not the purchase instruction is received from the user. When the purchase instruction is received, the processing proceeds to Step S2010. When the purchase instruction is not received, the processing returns to Step S2001. Note that the purchase instruction includes, for example, the inquiry.

(Step S2010) The user processor 33 generates the purchase instruction to be transmitted. Then, the user transmitter 34 transmits the purchase instruction to the information processing device 1 while being associated with the user identifier.

(Step S2011) The user receiver 35 determines whether or not the information is received from the information processing device 1. When the information is received, the processing proceeds to Step S2012. When the information is not received, the processing returns to Step S2011. Note that the information is, for example, the video, the information indicating the completion of changing the right holder or the attribute value set of the video.

(Step S2012) The user processor 33 generates the information to be outputted using the received information. The user output unit 36 outputs the above described information. The processing returns to Step S2001.

In the flowchart in FIG. 17, the process ends when the power is turned off or the instruction of ending process is interrupted.

Figure 21:
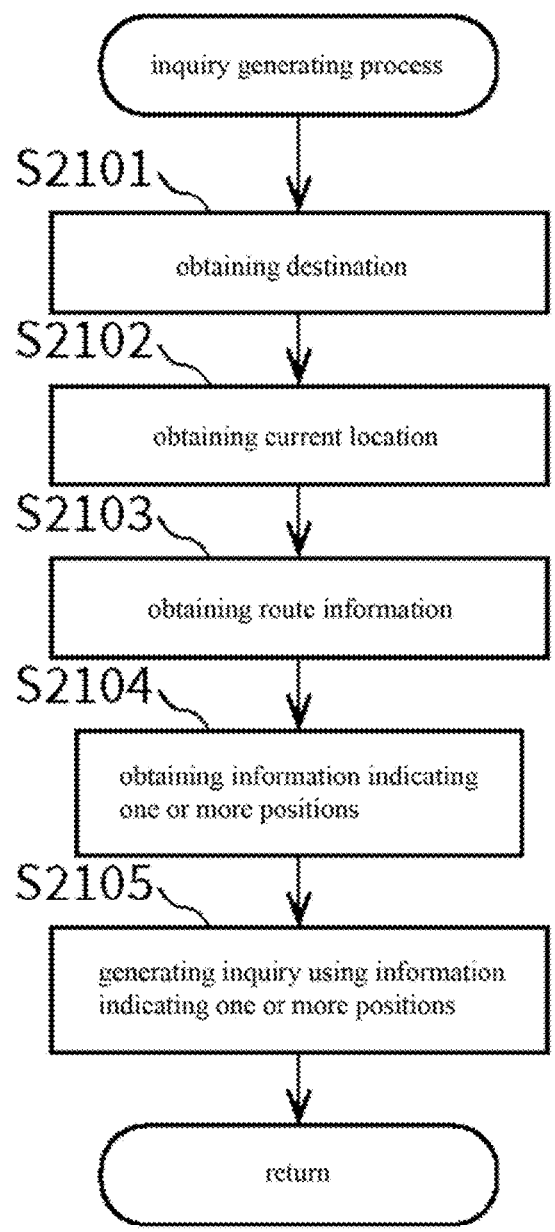
FIG. 21 is a flowchart for explaining an example of an inquiry generating process in the first embodiment.

Then, the example of the inquiry generating process in Step S2008 will be explained using the flowchart in FIG. 21.

(Step S2101) The user processor 33 obtains the destination.

(Step S2102) The user processor 33 obtains the current location.

(Step S2103) The user processor 33 searches for a route using the destination and the current location and obtains the route information.

(Step S2104) The user processor 33 obtains the information indicating one or more positions on the route identified by the route information obtained in Step S2103 and satisfying an extraction condition.

(Step S2105) The user processor 33 generates the inquiry using the information indicating one or more positions obtained in Step S2104. The processing returns to the upstream process. Note that the user processor 33 generates, for example, the inquiry for "searching the video captured within one hour from the present time, having the tag of "traffic jam" or "accident," and paired with the attribute value set including the information of any of one or more positions."

Figure 18:
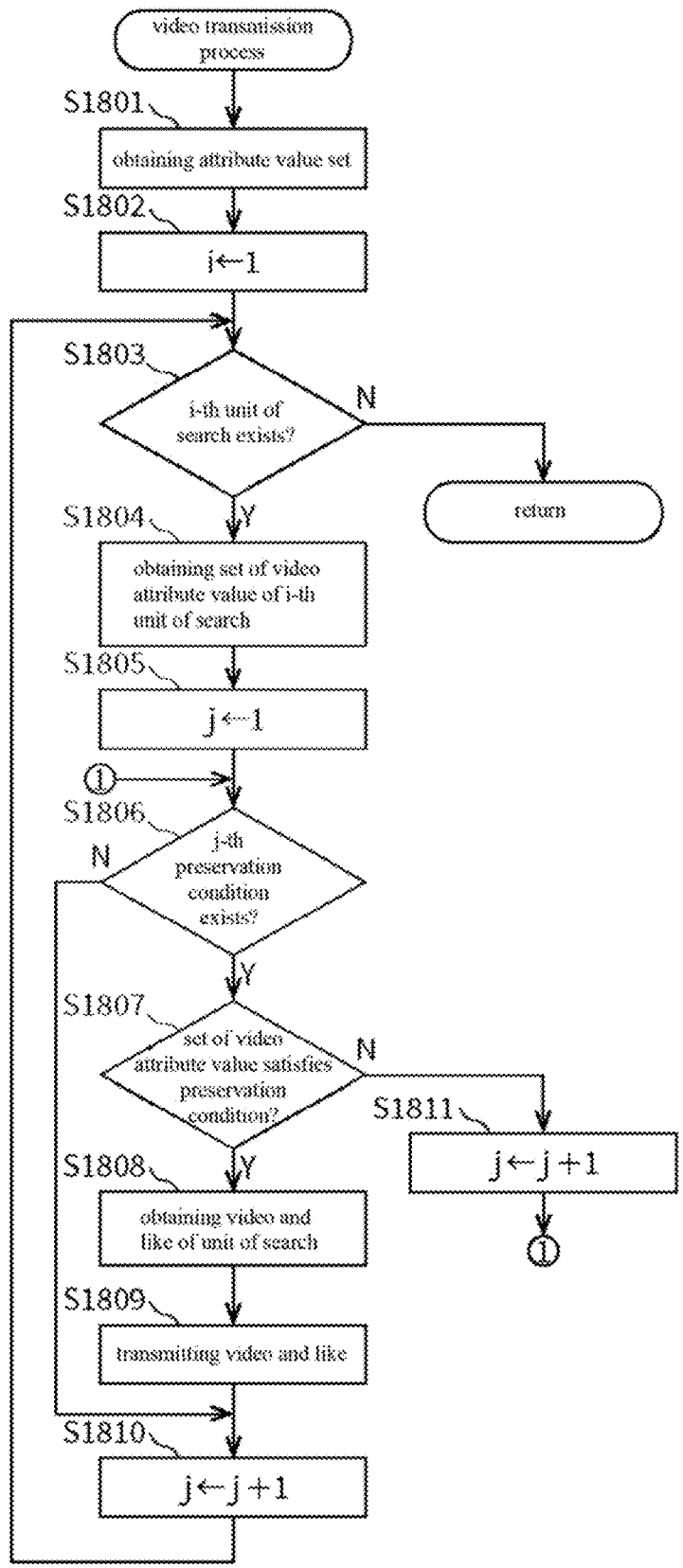
FIG. 18 is a flowchart for explaining an example of a video transmission process in the first embodiment.

Instead of performing the process of the flowchart in FIG. 18, the user processor 33 may obtain the current location and generate the inquiry including the current location. The above described inquiry is the request for transmitting the video corresponding to a predetermined tag (e.g., "accident" or "traffic jam") in the area surrounding the current location (e.g., at a distance within a threshold value).

Then, the operation of the object terminal 4 will be explained. The object terminal 4 obtains the positional information. Then, the object terminal 4 transmits the positional information to the information processing device 1 or the user terminal 3 registered in the object terminal 4. Note that the object terminal 4 obtains the positional information and transmits the positional information when the instruction is received from the holder (e.g. child as object person to be watched) of the object terminal 4. Note that the object terminal 4 includes, for example, a GPS receiver, and obtains the positional information by the GPS receiver. However, the method of obtaining the positional information is not limited. The user terminal 3 registered in the object terminal 4 is, for example, a guardian of the holder of the object terminal 4.

Then, the operation of the navigation terminal 5 will be explained. The navigation terminal 5 receives the destination from the user. Then, the navigation terminal 5 performs the inquiry generating process explained in FIG. 21. Then, the navigation terminal 5 performs the processes of S2002 to S2005 and S2006 in FIG. 20.

Hereafter, the specific operation example of the information system A in the present embodiment will be explained.

The set storage 111 of the information processing device 1 currently stores a terminal management table having the structure shown in FIG. 22. The terminal management table is the table for managing one, two or more terminal information. The terminal management table is the table for managing the mobile terminal 2 which transmits the video. Note that the mobile terminal 2 not managed in the terminal management table may transmit the video to the information processing device 1.

The terminal management table is the table for managing one or more records including "ID," "terminal identifier," "video information," "movement information," "registration flag" and "availability flag." The "video information" is the information relates to the captured video and the "video information" here includes "frame identifier" "environment information" and "tag." The "environment information" here includes "positional information," "time information," "weather information" and "temperature information." The "environment information" is the information of the surrounding environment of the mobile terminal 2 when the video is captured, for example. The "tag" here includes "accident," "traffic jam," and "dangerous driving." Namely, the video here is tagged with at least one of "accident," "traffic jam," and "dangerous driving."

The "ID" is the information for identifying the record. The "terminal identifier" is the identifier of the mobile terminal 2, and is the same as the right holder identifier for identifying the right holder when the video is transferred. The "frame identifier" is the ID of the frame included in the video. The frame may be referred to as a field or a still image. The "positional information" here is (latitude and longitude). The "time information" here is year, month, day, hour, minute and second. The "weather information" is, for example, "sunny," "rainy," "cloudy" and "snowy." The "temperature information" is the temperature (C) outside the movable body. The value of "1" for "accident" indicates that the tag indicating the occurrence of an accident is applied to the corresponding frame. The value of "1" for "traffic jam" indicates that the tag indicating the occurrence of a traffic jam is applied to the corresponding frame. The value of "1" for "dangerous driving" indicates that the tag indicating a dangerous driving of a preceding automobile or the like is applied to the corresponding frame. The "movement information=1" indicates that the video is currently transmittable from the mobile terminal 2. The "movement information tag=0" indicates that the video is currently not transmittable from the mobile terminal 2 because the power is turned off, for example. The "registration flag=1" indicates that the video has been registered and can be obtained from the device in which the video is registered (e.g., the storage 11 or another device). The value of "1" for "availability flag" indicates that the video is allowed to be viewed. The value of "2" for "availability flag" indicates that the video is allowed to be sold (transfer of right holder is allowed).

A registered video management table having the structure shown in FIG. 23 is stored on the blockchain. The registered video management table is the table for managing the registered video. The registered video management table is the table for managing the preservation information. The registered video is, for example, the video provided to the user in response to the inquiry from the user and the video satisfying the preservation condition. The registered video management table includes "ID," "video identifier," "access information," "right holder identifier," "right registered date," "video information" and "availability flag." It is assumed that the registered video is stored in the information processing device 1, another device or the blockchain. It is assumed that each record in the registered video management table is the preservation information shown here.

In the above described situation, five specific examples are explained below. Specific Example 1 to Specific Example 4 are the examples using the video in real time. Specific Example 5 is the example using the video captured in the past.

Specific Example 1 is the case where the combined video generated by combining the videos captured by the mobile terminals 2 provided on two or more moving bodies for watching the object person (e.g., child, aged wanderer) is transmitted to the user terminal 3 of the user (e.g., guardian) related to the object person.

Specific Example 2 is the case where the combined video generated by combining the videos captured by a plurality of mobile terminals 2 based on the inquiry using the route information corresponding to the destination set in the user terminal 3 or the navigation terminal 5 is outputted to the user terminal 3.

Specific Example 3 is the case where the user terminal 3 or the navigation terminal 5, which detected the traffic jam, obtains the video for realizing the reason of the traffic jam and outputs the video to the user terminal 3 or the navigation terminal 5.

Specific Example 4 is the case where the image for realizing the situation of the parking lot for helping the user to find vacant space in the parking lot is outputted.

Specific Example 5 is the case where the combined video generated by combining the registered videos using the route information for identifying the route (e.g., traveling route) traveled by the user in the past is outputted to the user terminal 3.

Specific Example 1

It is assumed that the management information including the user identifier (e.g., IP address of the user terminal 3) for transmitting the video to the user terminal 3 of a guardian P and the object person identifier "T001" for identifying the object terminal 4 of a child A of the guardian P are stored in the storage 11 of the information processing device 1.

Then, it is assumed that the child A turns on the power of the object terminal 4 for returning home from school. Then, it is assumed that the object terminal 4 periodically obtains the positional information and the inquiry (e.g., "operation transmitting instruction, object person identifier=T001, positional information (xt1, yt1)") including the positional information and the object person identifier "T001" to the information processing device 1. It is assumed that the object person identifier "T001" and the communication destination information (e.g., IP address) of the information processing device 1 for transmitting the information to the information processing device 1 are stored in the object terminal 4.

It is assumed that the receiver 12 of the information processing device 1 periodically receives the positional information for identifying the position of the mobile terminal 2 paired with the terminal identifier from each of two or more mobile terminals 2 and stores the positional information in the terminal management table (FIG. 22).

Then, the inquiry receiver 122 of the information processing device 1 receives the inquiry "operation transmitting instruction, object person identifier=T001, positional information (xt1, yt1)" from the object terminal 4 and temporarily stores the positional information (xt1, yt1) and the object person identifier "T001" in a not-illustrated buffer. It is assumed that the positional information is periodically received and the latest positional information is stored in a not-illustrated buffer.

Figure 11:
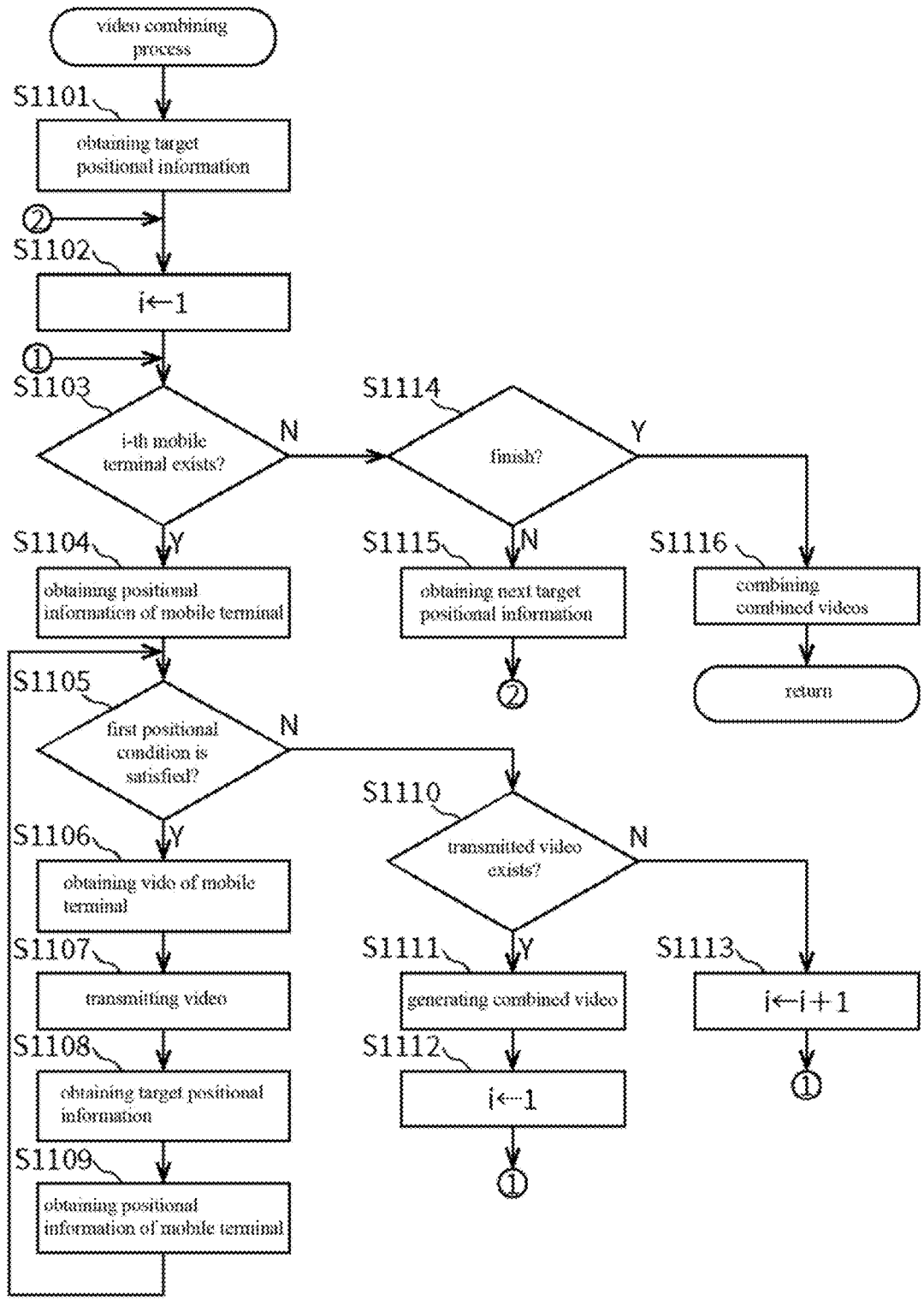
FIG. 11 is a flowchart for explaining an example of a video combining process in the first embodiment.

Then, in accordance with the operation explained in the flowchart shown in FIG. 11, it is assumed that the video obtainer 133 determines the first mobile terminal 2 (here, drive recorder mounted on automobile) corresponding to the positional information satisfying the first positional condition with respect to the position indicating the latest positional information of the object terminal 4. The video obtainer 133 receives the video from the first mobile terminal 2. Note that the child A is captured in the above described video. The more the first positional condition is satisfied between the positional information of the object terminal 4 of the child A and the positional information of the mobile terminal 2, the nearer two positions are located. The video is normally associated with the positional information and the first right holder identifier of the first mobile terminal 2. The received video is preferably the video transmitted immediately after the video is captured by the mobile terminal 2.

Then, the video transmitter 141 transmits the video received by the video obtainer 133 to the user terminal 3 of the guardian P identified by the user identifier paired with the object person identifier "T001."

The video obtainer 133 temporarily stores the video received from the first mobile terminal 2 in a not-illustrated buffer paired with the first right holder identifier of the first mobile terminal 2 and the positional information.

Note that the video obtainer 133 at least receives the video received from the first mobile terminal 2 and the video transmitter 141 transmits the video to the user terminal 3 of the guardian P while the first positional condition is satisfied between the positional information of the object terminal 4 of the child A and the positional information of the first mobile terminal 2.

Then, it is assumed that the video obtainer 133 determines that the first positional condition is not satisfied between the positional information of the object terminal 4 of the child A and the positional information of the first mobile terminal 2. This is because the first mobile terminal 2 is moved and the first mobile terminal 2 is not located within the position capturing the child A returning home on foot.

Then, the video obtainer 133 determines the latest positional information of the second mobile terminal 2 satisfying the first positional condition again referring to FIG. 22 with respect to the latest positional information of the object terminal 4. Not that the latest positional information transmitted from each of the mobile terminals 2 is stored in FIG. 22 while being paired with each of the terminal identifiers. The video obtainer 133 obtains the video from the second mobile terminal 2. Then, the video obtainer 133 temporarily stores the video in a not-illustrated buffer while being paired with the second right holder identifier of the second mobile terminal 2 and the positional information.

Then, the video transmitter 141 transmits the video received by the video obtainer 133 from the second mobile terminal 2 to the user terminal 3 of the guardian P.

With the lapse of time (e.g., 10 seconds), it is assumed that the video obtainer 133 determines that the first positional condition is not satisfied between the positional information of the object terminal 4 of the child A and the positional information of the second mobile terminal 2.

Then, it is assumed that the video obtainer 133 tries to determine the latest positional information of the third mobile terminal 2 satisfying the first positional condition again referring to FIG. 22 with respect to the latest positional information of the object terminal 4 and the positional information of the third mobile terminal 2 satisfying the first positional condition is not found. In the above described case, the video transmitter 141 may transmit the information indicating that the video capturing the child A cannot be transmitted to the user terminal 3 of the guardian P. Alternatively, transmitter 141 may stop the transmission of the video and the information to the user terminal 3.

By the above described transmission of the video, the user terminal 3 sequentially receives and outputs the video obtained by the first mobile terminal 2 and the video obtained by the mobile terminal of the second mobile terminal 2. Consequently, the guardian P can watch the state of the child A coming home.

With the lapse of time, it is assumed that the third mobile terminal 2 approaching to the child A exists, and the video obtainer 133 determines that the positional information of the third mobile terminal 2 satisfying the first positional condition referring to FIG. 22 with respect to the latest positional information of the object terminal 4. Then, the video obtainer 133 obtains the video from the third mobile terminal 2. Then, the video obtainer 133 temporarily stores the video in a not-illustrated buffer while being paired with the third right holder identifier of the third mobile terminal 2 and the positional information.

Then, the video transmitter 141 transmits the video received by the video obtainer 133 from the third mobile terminal 2 to the user terminal 3 of the guardian P identified by the user identifier paired with the object person identifier "T001."

Then, the user terminal 3 receives and outputs the video obtained by the third mobile terminal 2. Consequently, although the guardian P could not watch the state of the child A coming home for a while, the guardian P can watch the state of the child A coming home after the above described video appears.

The above described operation is repeated until the power of the object terminal 4 of the child A is turned off (until the child A comes home) and the guardian P can watch the state of the child A coming home.

The rewarding unit 1355 performs the above described rewarding process on the right holder identified by the right holder identifier of the first mobile terminal 2, the second mobile terminal 2 and the third mobile terminal 2 providing the video to the guardian P.

The video generator 134 combines the videos transmitted from each of two or more mobile terminals 2 in the order when the video is transmitted to generate the combined video.

The right holder processor 135 accumulates the combined video paired with the right holder identifier which is the identifier of the guardian P.

The right holder processor 135 accumulates the combined video while being associated with the attribute value set which is associated with each of one, two or more videos which are the source of the combined video.

Then, the fourth preserver 1354 obtains the access information for identifying the destination of accumulating the combined video. The fourth preserver 1354 obtains the attribute value set associated with the accumulated combined video. Then, the fourth preserver 1354 generates the preservation information including the obtained access information, the obtained attribute value set and the right holder identifier of the video. Then, the fourth preserver 1354 accumulates the generated preservation information.

As described above, in this specific example, the object person holding the object terminal 4 can be watched using the combined video. In addition, the reward can be provided to the right holder providing the video which is the source of the combined video for watching. Furthermore, the combined video can be properly managed.

Specific Example 2

It is assumed that the user inputs the destination in the user terminal 3 having the navigation function. Then, the user acceptor 32 of the user terminal 3 receives the destination. The user processor 33 obtains the current position. Then, the user processor 33 obtains the route information to the destination from the current position. It is assumed that the route information here includes two or more positional information.

Then, the user transmitter 34 of the user terminal 3 automatically transmits the inquiry including the route information to the information processing device 1 when the route information is obtained in the user processor 33.

Then, the inquiry receiver 122 of the information processing device 1 receives the inquiry. Then, the video obtainer 133 and the video generator 134 perform the video combining process as described below.

Namely, the video obtainer 133 first obtains the positional information (the first positional information) of the first intersection in the route identified by the route information in two or more positional information included in the route information. Namely, the video obtainer 133 preferably obtains the video using only a part of the positional information in the positional information included in the received route information. The video obtainer 133 preferably obtains the video using only a part of the positional information satisfying a predetermined condition in the positional information included in the received route information. Note that the predetermined condition is, for example, that the positional information is the information indicating the position of the intersection or that the distance from the previously used positional information is within a predetermined value.

Then, the video obtainer 133 determines the positional information of the first mobile terminal 2 satisfying the first positional condition with respect to the obtained positional information. The video obtainer 133 obtains the video from the determined first mobile terminal 2 and temporarily accumulates the video in a not-illustrated buffer while being paired with the first right holder identifier of the first mobile terminal 2 and the first positional information. Then, the video transmitter 141 transmits the obtained video to the user terminal 3.

Then, the video obtainer 133 obtains the second positional information of the next intersection nearer to the destination than the position indicated by the previously obtained first positional information of the intersection.

Then, the video obtainer 133 determines the positional information of the second mobile terminal 2 satisfying the first positional condition with respect to the second positional information. The video obtainer 133 obtains the video from the determined second mobile terminal 2 and temporarily accumulates the video in a not-illustrated buffer while being paired with the second right holder identifier of the second mobile terminal 2 and the second positional information. Then, the video transmitter 141 transmits the obtained video to the user terminal 3.

Then, the video obtainer 133 obtains the third positional information of the next destination nearer to the destination than the position indicated by the second positional information.

Then, the video obtainer 133 determines the positional information of the third mobile terminal 2 satisfying the first positional condition with respect to the third positional information. The video obtainer 133 obtains the video from the determined third mobile terminal 2 and temporarily accumulates the video in a not-illustrated buffer while being paired with the third right holder identifier of the third mobile terminal 2 and the third positional information. Then, the video transmitter 141 transmits the obtained video to the user terminal 3.

The information processing device 1 repeats the above described process until the video corresponding to the n-th positional information for identifying the destination is transmitted.

The user receiver 35 of the user terminal 3 sequentially receives the first video, the second video, the third video, - - - and the n-th video. The user output unit 36 sequentially outputs the first video, the second video, the third video, - - - and the n-th video.

The rewarding unit 1355 of the information processing device 1 performs the rewarding process for providing the reward to the provision of the video to the first right holder identified by the first right holder identifier, the second right holder, - - - and the n-th right holder.

The video generator 134 sequentially combines the videos transmitted from each of two or more mobile terminals 2 in the order when the video is transmitted to generate the combined video.

The right holder processor 135 accumulates the combined video while being paired with the right holder identifier which is the identifier of the user of the user terminal 3. Namely, the right holder of the combined video here is the corresponding user.

The right holder processor 135 accumulates the combined video while being associated with the attribute value set associated with each of one, two or more videos which are the source of the combined video.

Then, the fourth preserver 1354 obtains the access information for identifying the destination of accumulating the combined video. The fourth preserver 1354 obtains the attribute value set corresponding the accumulated combined video. Then, the fourth preserver 1354 generates the preservation information including the obtained access information, the obtained attribute value set and the right holder identifier of the video. Then, the fourth preserver 1354 accumulates the generated preservation information.

As described above, in this specific example, the state of the route to the destination can be confirmed in the order nearer to the current position using the videos transmitted from two or more mobile terminals 2 as a combined video combined in a time series manner at least in appearance. As a result, the moving body such as an automobile can be supported.

The reward can be provided to the right holder providing the video which is the source of the combined video. The combined video can be properly accumulated and managed.

Specific Example 3

It is assumed that the navigation terminal 5 detects, for example, the traffic jam on the route to the destination. Note that the function of detecting the traffic jam can be achieved by the conventionally known technology. Then, it is assumed that the navigation terminal 5 obtains the route information including one, two or more positional information for identifying the road of the traffic jam and transmits the inquiry including the route information and the user identifier stored in the navigation terminal 5 to the information processing device 1. Note that the user identifier is the identifier of the user terminal 3 receiving the video from the mobile terminal 2 located at the position of the jammed road. The user identifier is, for example, an IP address. It is assumed that the route information is the information for identifying one, two or more portions of the jammed road. The above described user terminal 3 is, for example, a terminal of a passenger on a passenger seat.

Then, the inquiry receiver 122 of the information processing device 1 receives the inquiry including the route information and the user identifier. Then, the video obtainer 133 and the video generator 134 perform the video combining process as described below.

First, the video obtainer 133 obtains the positional information located nearest to the current position in the positional information included in the route information. Then, the video obtainer 133 obtains the positional information which is continued from the above described positional information and is the last positional information located at the position within a threshold range from the neighboring positional information. The video obtainer 133 treats the above described positional information as target positional information used for obtaining the video.

Then, the video obtainer 133 determines the first mobile terminal 2 of the positional information satisfying the first positional condition with respect to the target positional information. Then, the video obtainer 133 obtains the video from the above described mobile terminal 2 and temporarily accumulates the video in a not-illustrated buffer while being paired with the first right holder identifier of the first mobile terminal 2 and the positional information.

The video obtainer 133 continues to receive the video from the first mobile terminal 2 and temporarily accumulate the video in a not-illustrated buffer until the latest positional information of the first mobile terminal 2 does not satisfy the first positional condition.

The video transmitter 141 sequentially transmits the obtained video to the user terminal 3.

After the mobile terminal 2 passes through the traffic jam, the video obtainer 133 determines that the latest positional information of the first mobile terminal 2 does not satisfy the first positional condition.

Then, the video obtainer 133 determines the second mobile terminal 2 of the positional information satisfying the first positional condition with respect to the target positional information. Then, the video obtainer 133 obtains the video from the second mobile terminal 2 and temporarily accumulates the video in a not-illustrated buffer while being paired with the second right holder identifier of the second mobile terminal 2 and the positional information.

The video obtainer 133 continues to receive the video from the second mobile terminal 2 and temporarily accumulate the video in a not-illustrated buffer until the latest positional information of the second mobile terminal 2 does not satisfy the first positional condition.

The video transmitter 141 sequentially transmits the obtained video to the user terminal 3.

The user terminal 3 receives the video from the information processing device 1 and outputs the video.

The above described operation is repeated. Thus, the user of the user terminal 3 can know the state of the traffic jam continuously.

When the route information includes the information identifying the traffic jam of two or more positions, the information processing device 1 performs the similar process using the route information identifying the second and subsequent positions. Consequently, the user terminal 3 can receive the video for grasping the state of the traffic jam of the second and subsequent positions and output the video. When two or more positions of the traffic jam exist, the user terminal 3 preferably switches the positions to receive and output the video automatically or by the instruction of the user.

In this specific example, the rewarding process, various preservation processes and the like may be performed although the explanation is omitted.

As described above, in this specific example, the state of the traffic jam on the route to the destination can be grasped by using the video transmitted from two or more mobile terminals 2.

Specific Example 4

It is assumed that the inquiry including the positional information of the user terminal 3 is transmitted from the user terminal 3 mounted on the automobile entered in a large parking lot to the information processing device 1 for grasping the state of the large parking lot. It is assumed that the above described inquiry includes "type identifier=around view image," the positional information (reference positional information) of the user terminal 3 and the around view image obtained by the user terminal 3.

Then, the inquiry receiver 122 of the information processing device 1 receives the above described inquiry. Then, the video obtainer 133 determines, from the received inquiry, that two or more videos are required to be merged in a spatial manner. Then, the video obtainer 133 and the video generator 134 perform the video merging process as described below.

Namely, the video obtainer 133 obtains the reference positional information included in the received inquiry. Then, the video obtainer 133 determines one, two or more mobile terminals 2 corresponding to the positional information satisfying the second positional condition with respect to the reference positional information. Then, the video obtainer 133 transmits the instruction of transmitting the current around view image to one, two or more mobile terminals 2. Note that the second positional condition here means that the position indicated by the positional information is located within the area of the parking lot including the reference positional information. It is assumed that each of one or more mobile terminals 2 continuously obtains the around view image.

The video obtainer 133 receives the around view image associated with the positional information of the mobile terminal 2 from each of one or more mobile terminals 2.

Then, the video generator 134 calculates the difference (distance) between the positional information paired with each of the received around view image and the reference positional information. Then, the video generator 134 sorts the around view images in ascending order using the above described difference as a key.

Then, the video generator 134 obtains the reference image. Note that the reference image is the around view image included in the inquiry.

Then, the video generator 134 performs the process explained using the flowchart in FIG. 10 and arranges each of the around view images received from the other mobile terminals 2 at an appropriate position with respect to the reference image in the sorted order using the positional information to generate the merged image. The video generator 134 generates the image where the position indicating the reference positional information (the position of the user terminal 3 transmitting the inquiry) is clearly shown on the finally generated merged image. Note that the above described image is also the merged image.

Then, the video transmitter 141 transmits the generated merged image to the user terminal 3.

Then, the user terminal 3 receives the above described merged image and output the merged image.

As described above, in this specific example, the images transmitted from one or more other mobile terminals 2 are merged. This helps to find an empty space in the parking lot.

In this specific example, the information processing device 1 merges the around view images. However, it is also possible for the information processing device 1 to merge two or more images obtained by two or more ordinary cameras or omnidirectional cameras using the positional information associated with each image for generating the merged image and transmit the merged image to the user terminal 3.

Specific Example 5

It is assumed that the user B travels a drive course on a rainy day. It is assumed that the route information for identifying the route traveled by the automobile is accumulated in the user terminal 3.

Then, it is assumed that the user B inputs the inquiry including the route information accumulated in the user terminal 3 and the environment information "weather information=sunny" in the user terminal 3 after returning home. Then, the user terminal 3 receives the above described inquiry and transmits the inquiry to the information processing device 1. Note that the above described inquiry is the video of the drive course traveled by the user on sunny day and the inquiry for obtaining the video of the sunny day.

Then, the inquiry receiver 122 of the information processing device 1 receives the above described inquiry. Then, the video obtainer 133 determines that the received inquiry is not the video retrieval in real time. Then, the video obtainer 133 or the like performs the registered video search process as described below.

Namely, the video obtainer 133 obtains the first positional information included in the route information in the received inquiry.

Then, the video obtainer 133 obtains all preservation information from the registered video management table (FIG. 23). Namely, the video obtainer 133 obtains the preservation information existing on the blockchain, for example.

Then, the video obtainer 133 determines the preservation information including "1" as the availability flag, the obtained positional information satisfying the first positional condition and "weather information=sunny" in the obtained preservation information. It is assumed that the video obtainer 133 determines, for example, the preservation information of "ID=1" in FIG. 23.

Then, the video obtainer 133 obtains the access information "address 01" paired with the determined preservation information. Then, the video obtainer 133 obtains the video using the access information "address 01." Then, the video obtainer 133 cuts out the video within the range that the second and subsequent positional information included in the route information included in the received inquiry satisfies (same or near) the first positional condition with respect to the positional information of the preservation information from the video corresponding to the access information "address 01." Namely, the video obtainer 133 cuts out and obtains the video from the video corresponding to the access information "address 01" within the range that the positional information is not deviated from the route of the drive course traveled by the user.

Then, the video obtainer 133 obtains the second positional information which is the positional information when the video corresponding to the access information "address 01" is deviated from the drive course and is the route information included in the received inquiry.

The video obtainer 133 determines the preservation information including "1" as the availability flag, the obtained second positional information satisfying the first positional condition and "weather information=sunny" in the obtained preservation information.

Then, the video obtainer 133 obtains the access information (e.g., "address X") paired with the determined preservation information. Then, it is assumed that the video obtainer 133 obtains the second video using the access information "address X." Then, the video obtainer 133 cuts out the video within the range that the positional information after the second positional information included in the route information included in the received inquiry satisfies the positional information of the preservation information from the second video corresponding to the access information "address X." Namely, the video obtainer 133 cuts out and obtains the video from the video corresponding to the access information "address X" within the range that the positional information is not deviated from the route of the drive course traveled by the user.

The video obtainer 133 repeats the above described process until the final positional information included in the route information in the received inquiry is used.

Then, the video generator 134 combines two or more videos obtained by the video obtainer 133 in the order of obtaining the video (order of the route) to generate the combined video.

Then, the video transmitter 141 transmits the above described combined video to the user terminal 3 of the user B.

Then, the user terminal 3 receives the above described combined video and outputs the combined video.

The rewarding unit 1355 of the information processing device 1 obtains the right holder identifier (e.g., "U001") of each of the two or more original videos used for the combined video and performs the rewarding process for providing the reward to the right holder identified by each of the two or more right holder identifiers.

The right holder processor 135 performs the above described various the preservation processes on the generated combined video.

As described above, in this specific example, the combined video can be generated and outputted by combining two or more videos captured in the route in the past using the route information of the route traveled by the user.

As described above, in the present embodiment, an effective video can be generated and provided using the videos captured by each of two or more mobile terminals 2.

In the present embodiment, an effective video combined in a time series manner can be generated and provided using the videos captured by each of two or more mobile terminals 2.

In the present embodiment, an effective video combined in a time series manner can be generated and provided using two or more videos corresponding to each of two or more positional information transmitted from the object terminal 4. Consequently, the object person holding the object terminal 4 can be watched, for example.

In the present embodiment, an effective video combined in a time series manner can be generated and provided using two or more videos corresponding to the destination set in the navigation terminal 5.

In the present embodiment, an effective video combined in the order of the route can be generated and provided using the video corresponding to each of two or more positional information included in the route information.

In the present embodiment, an effective video combined in the order of the route and the order of the time can be generated and provided using the videos corresponding to each of two or more positional information included in the route information.

In the present embodiment, an effective video can be generated and provided by merging videos captured by each of two or more mobile terminals in a spatial manner.

In the present embodiment, the state of the empty space in the parking lot can be grasped.

In the present embodiment, an appropriate process related to the right holder of the video can be performed. For example, the reward can be provided to the right holder of the video captured by the mobile terminal 2.

In the present embodiment, the right holder of one video generated from two or more images can be an appropriate right holder. For example, the right holder of one video generated from two or more images can be set to a person requiring the video.

In the present embodiment, the management information of the video requiring the preservation can be preserved.

In the present embodiment, although the mobile terminal 2 obtains and accumulates the video and the sound information, the video is transmitted and the sound information is not transmitted. This contributes to the provision of the video while protecting the privacy of the right holder of the moving body.

The processes in the present embodiment may be implemented with software. The software may be distributed by, for example, downloading the software. The software may be recorded in a recording medium such as a compact disk read-only memory (CD-ROM) for distribution. The same applies to another embodiment herein. The software for implementing the information processing device 1 according to the present embodiment is a program described below. Namely, this program causes the computer to function as: a video obtainer configured to obtain two or more videos captured by each of two or more mobile terminals and transmitted from each of the two or more mobile terminals, each of the two or more videos being associated with an attribute value set including one or more environment information which includes a positional information for identifying a capturing position or a time information for identifying a capturing time; a video generator configured to generate a combined video by combining the two or more videos associated with different time information from each other in a time series manner among the two or more videos obtained by the video obtainer or combining a part of the two or more videos associated with different positional information from each other in a spatial manner among the two or more videos obtained by the video obtainer; and a video transmitter configured to transmit the combined video generated by the video generator.

Figure 24:
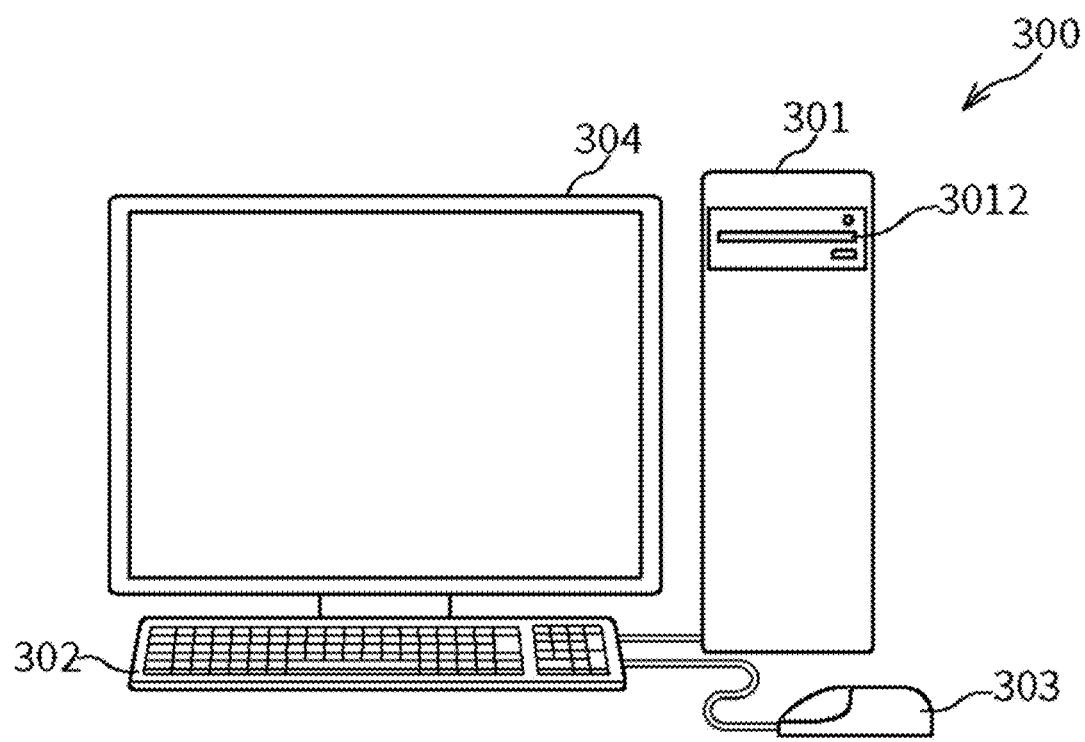
FIG. 24 is a schematic external view of a computer system in the first embodiment.
Figure 25:
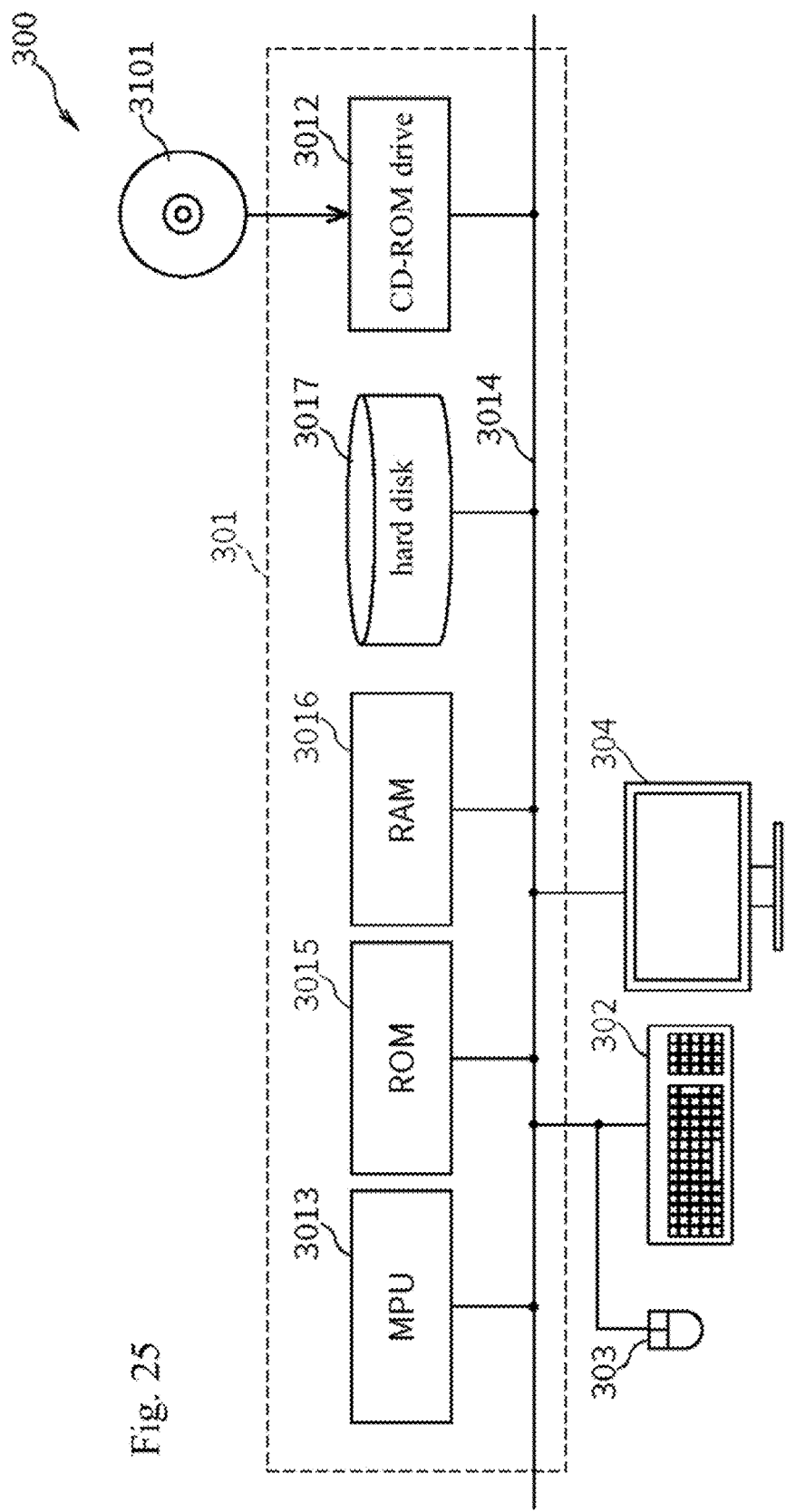
FIG. 25 is a block diagram of the computer system.

FIG. 24 shows the external appearance of a computer that executes the program described in this specification and achieves the information processing device 1 according to the various embodiments described above. The above described embodiments can be implemented with computer hardware and a computer program executed on the computer hardware. FIG. 24 is a schematic diagram of a computer system 300 and FIG. 25 is a block diagram of the system 300. The mobile terminal 2 is normally provided with a camera. The mobile terminal 2 may be provided with a microphone.

In FIG. 24, the computer system 300 includes a computer 301 including a CD-ROM drive, a keyboard 302, a mouse 303 and a monitor 304.

In FIG. 25, the computer 301 includes a CD-ROM drive 3012, a microprocessor unit (MPU) 3013, a bus 3014 connected to the CD-ROM drive 3012 or the like, a read-only memory (ROM) 3015 storing programs such as a boot-up program, a random access memory (RAM) 3016 connected to the MPU 3013, temporary storing a command from an application program, and providing a temporarily storing space, and a hard disk 3017 storing an application program, a system program and data. Although not shown in the figure, the computer 301 may include a network card that allows connection to a local area network (LAN).

A program that causes the computer system 300 to function as, for example, the information processing device 1 according to the above described embodiment may be stored in a CD-ROM 3101, inserted into the CD-ROM drive 3012 and transferred to the hard disk 3017. Alternatively, the program may be transmitted to the computer 301 through a not-illustrated network and stored in the hard disk 3017. The program is loaded on the RAM 3016 when the program is executed. The program may be directly loaded from the CD-ROM 3101 or the network.

It is not necessary for the programs to include, for example, a third party program or an operation system (OS) that causes the computer 301 to function as, for example, the information processing device according to the above described embodiment. The programs may be any program that includes a command to call an appropriate function (module) in a controlled manner and obtain an intended result. The manner in which the computer system 300 operates is conventionally known. Thus, the detailed explanation is omitted.

The steps in the above described program, such as transmitting or receiving information, do not include processing performed by hardware, or for example, processing performed by a modem or an interface card in the transmission step (processing performed by hardware alone).

One or more computers may execute the above described program. Namely, either integrated processing or distributed processing may be performed.

In each of the above described embodiments, two or more communicators included in a single device may be implemented by a single physical medium.

In each of the embodiments, each process may be performed by a single device through integrated processing or by multiple devices through distributed processing.

The present invention is not limited to the above embodiments, but may be modified variously within the scope of the present invention.

INDUSTRIAL APPLICABILITY

As described above, the information processing device 1 of the present invention has the effect capable of generating and providing an effective video using the videos captured by each of two or more mobile terminals 2 and is effective as a server or the like.

The invention claimed is:

1. An information processing device comprising:
a video obtainer configured to determine two or more mobile terminals which can transmit two or more videos currently captured by each of the two or more mobile terminals and associated with a positional information satisfying a first positional condition and sequentially obtain the two or more videos which are currently captured by each of the two or more mobile terminals and associated with the positional information satisfying the first positional condition in real time, the first positional condition being a condition that the positional information associated with the two or more videos identifies the position having an approximate relationship with the position identified by a target positional information, each of the two or more videos being associated with an attribute value set including one or more environmental information which includes a positional information for identifying a capturing position or a time information for identifying a capturing time;
a video generator configured to generate a combined video by combining the two or more videos obtained by the video obtainer and associated with different time information from each other in a time series manner or generate a merged video by merging a part of the two or more videos obtained by the obtainer and associated with different positional information from each other in a spatial manner; and
a video transmitter configured to transmit the combined video or the merged video generated by the video generator, wherein
the video generator is configured to generate the combined video or the merged video by combining the two or more videos obtained by the video obtainer in an order of a time associated with the two or more videos.

2. The information processing device according to claim 1, further comprising:
an inquiry receiver configured to receive an inquiry including the positional information from a user terminal, wherein
the video obtainer is configured to obtain the two or more videos associated with the positional information satisfying the first positional condition using the positional information received by the inquiry receiver.

3. The information processing device according to claim 1, further comprising:
an inquiry receiver configured to sequentially receive two or more positional information transmitted from each of the two or more mobile terminals, each of the two or more positional information being the positional information, wherein
the video obtainer is configured to sequentially obtain the two or more videos associated with the two or more positional information satisfying the first positional condition sequentially using the positional information received by the inquiry receiver.

4. The information processing device according to claim 1, further comprising:
an inquiry receiver configured to receive an inquiry including the positional information for identifying a destination set in a navigation terminal, and
the video obtainer is configured to sequentially obtain the two or more videos associated with the positional information satisfying the first positional condition using the positional information received by the inquiry receiver.

5. An information processing method used in an information processing device including a video obtainer, a video generator and a video transmitter, the method comprising:

determining, by the video obtainer, two or more mobile terminals which can transmit two or more videos currently captured by each of the two or more mobile terminals and associated with a positional information satisfying a first positional condition, the first positional condition being a condition that the positional information associated with the two or more videos identifies the position having an approximate relationship with the position identified by a target positional information, each of the two or more videos being associated with an attribute value set including one or more environmental information which includes a positional information for identifying a capturing position or a time information for identifying a capturing time;

sequentially obtaining, by the video obtainer, the two or more videos which are currently captured by each of the two or more mobile terminals in real time;

generating, by the video generator, a combined video by combining the two or more videos obtained by the video obtainer and associated with different time information from each other in a time series manner or generate a merged video by merging a part of the two or more videos obtained by the obtainer and associated with different positional information from each other in a spatial manner; and transmitting, by the video transmitter, the combined video or the merged video generated by the video generator, wherein the video generator is configured to generate the combined video or the merged video by combining the two or more videos obtained by the video obtainer in an order of a time associated with the two or more videos.

* * * * *